(12) United States Patent
Maeno et al.

(10) Patent No.: US 8,684,122 B2
(45) Date of Patent: Apr. 1, 2014

(54) POWER ASSISTED BICYCLE WITH REGENERATIVE FUNCTION

(75) Inventors: Eiji Maeno, Iwata (JP); Kiyohiro Ito, Iwata (JP)

(73) Assignee: NTN Corporation, Osaka (JP)

( * ) Notice: Subject to any disclaimer, the term of this patent is extended or adjusted under 35 U.S.C. 154(b) by 34 days.

(21) Appl. No.: 13/266,581

(22) PCT Filed: Apr. 27, 2010

(86) PCT No.: PCT/JP2010/057453
§ 371 (c)(1),
(2), (4) Date: Nov. 14, 2010

(87) PCT Pub. No.: WO2010/126039
PCT Pub. Date: Nov. 4, 2010

(65) Prior Publication Data
US 2012/0097467 A1    Apr. 26, 2012

(30) Foreign Application Priority Data

| Apr. 30, 2009 | (JP) | 2009-110425 |
| May 12, 2009 | (JP) | 2009-115588 |
| May 22, 2009 | (JP) | 2009-124163 |
| Jul. 24, 2009 | (JP) | 2009-172984 |
| Oct. 13, 2009 | (JP) | 2009-236245 |
| Nov. 5, 2009 | (JP) | 2009-253960 |
| Nov. 16, 2009 | (JP) | 2009-260729 |

(51) Int. Cl.
*F16D 11/00* (2006.01)

(52) U.S. Cl.
USPC .................. 180/206.7; 180/206.1; 180/205.1; 180/205.2

(58) Field of Classification Search
USPC ....................... 180/206.7, 206.1, 205.1, 205.2
See application file for complete search history.

(56) References Cited

U.S. PATENT DOCUMENTS

| 3,995,503 A | 12/1976 | Schulz |
| 5,141,476 A | 8/1992 | Chang |

(Continued)

FOREIGN PATENT DOCUMENTS

| AT | 306 536 | 4/1973 |
| JP | 8-140212 | 5/1996 |

(Continued)

OTHER PUBLICATIONS

International Search Report issued Jun. 8, 2010 in International (PCT) Application No. PCT/JP2010/057453.
Supplementary European Search Report issued Nov. 6, 2012 in EP 10 76 9737, which is a foreign counterpart to the present application.

*Primary Examiner* — Kevin Hurley
*Assistant Examiner* — Michael Stabley
(74) *Attorney, Agent, or Firm* — Wenderoth, Lind & Ponack, L.L.P.

(57) ABSTRACT

A center motor power-assisted bicycle includes an internal transmission and has a regenerative function. A transmission comprises, in a drive wheel hub, a planetary gear, a one-way clutch for reverse input, a clutch switching device, and, a sun gear and transmits driving force from a sprocket to the drive wheel. A transmission control mechanism selectively rotationally fixes the sun gear to the axle to change speed when driving force is applied. The clutch is disposed between the sun gear and the axle, and selectively rotationally fixes the sun gear to the axle by the operation of the clutch switching device when reverse input is applied. While the bicycle is driven, the clutch switching device moves the clutch to the rotatable state, to transmit driving force. While the bicycle is traveling without being driven, the clutch is locked, so that reverse input is transmitted to the sprocket.

27 Claims, 27 Drawing Sheets

(56) References Cited

U.S. PATENT DOCUMENTS

| | | | |
|---|---|---|---|
| 6,276,479 B1 * | 8/2001 | Suzuki et al. | 180/206.8 |
| 6,296,072 B1 * | 10/2001 | Turner | 180/220 |
| 6,629,574 B2 * | 10/2003 | Turner | 180/206.4 |
| 7,314,109 B2 * | 1/2008 | Holland | 180/206.7 |
| 2004/0084272 A1 | 5/2004 | Yoshiie et al. | |
| 2004/0231905 A1 | 11/2004 | Kurita | |

FOREIGN PATENT DOCUMENTS

| | | |
|---|---|---|
| JP | 10-250673 | 9/1998 |
| JP | 2001-213383 | 8/2001 |
| JP | 2002-005200 | 1/2002 |
| JP | 2003-166563 | 6/2003 |
| JP | 2004-268843 | 9/2004 |
| JP | 2004-270877 | 9/2004 |

* cited by examiner

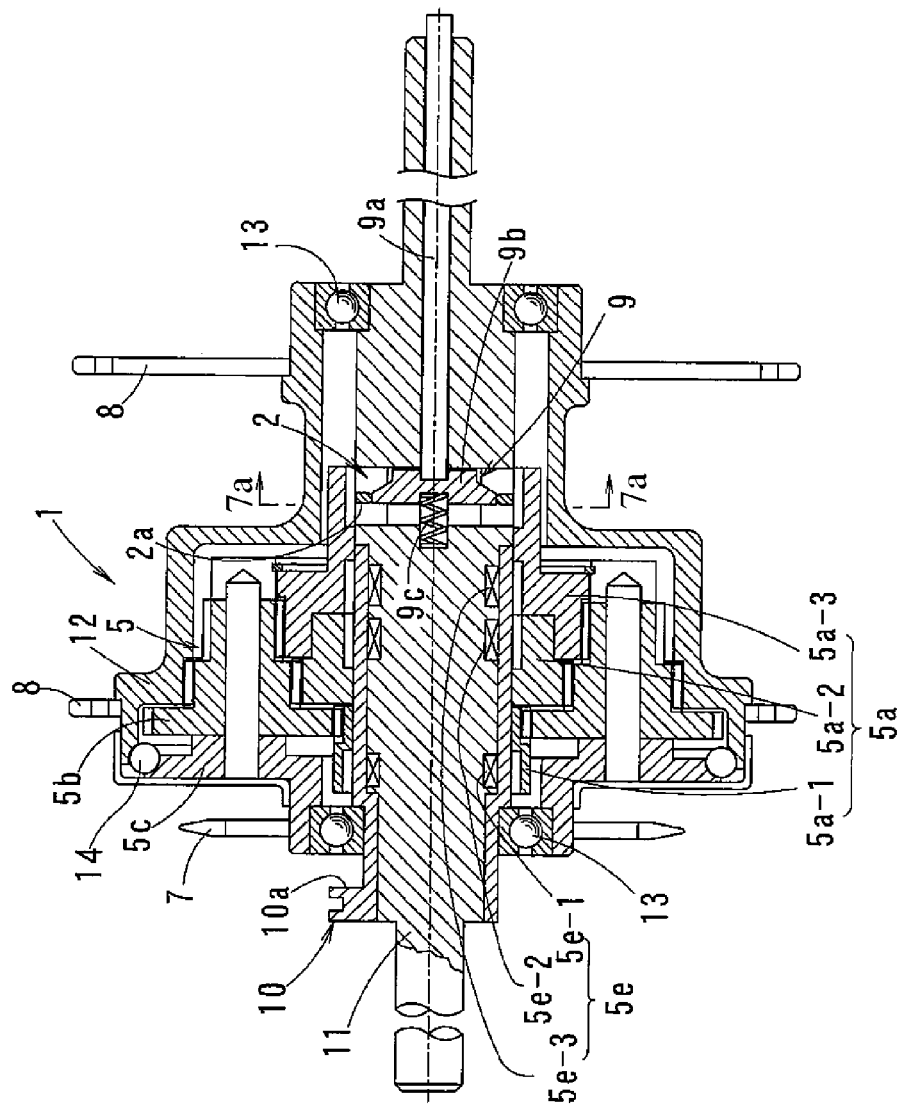

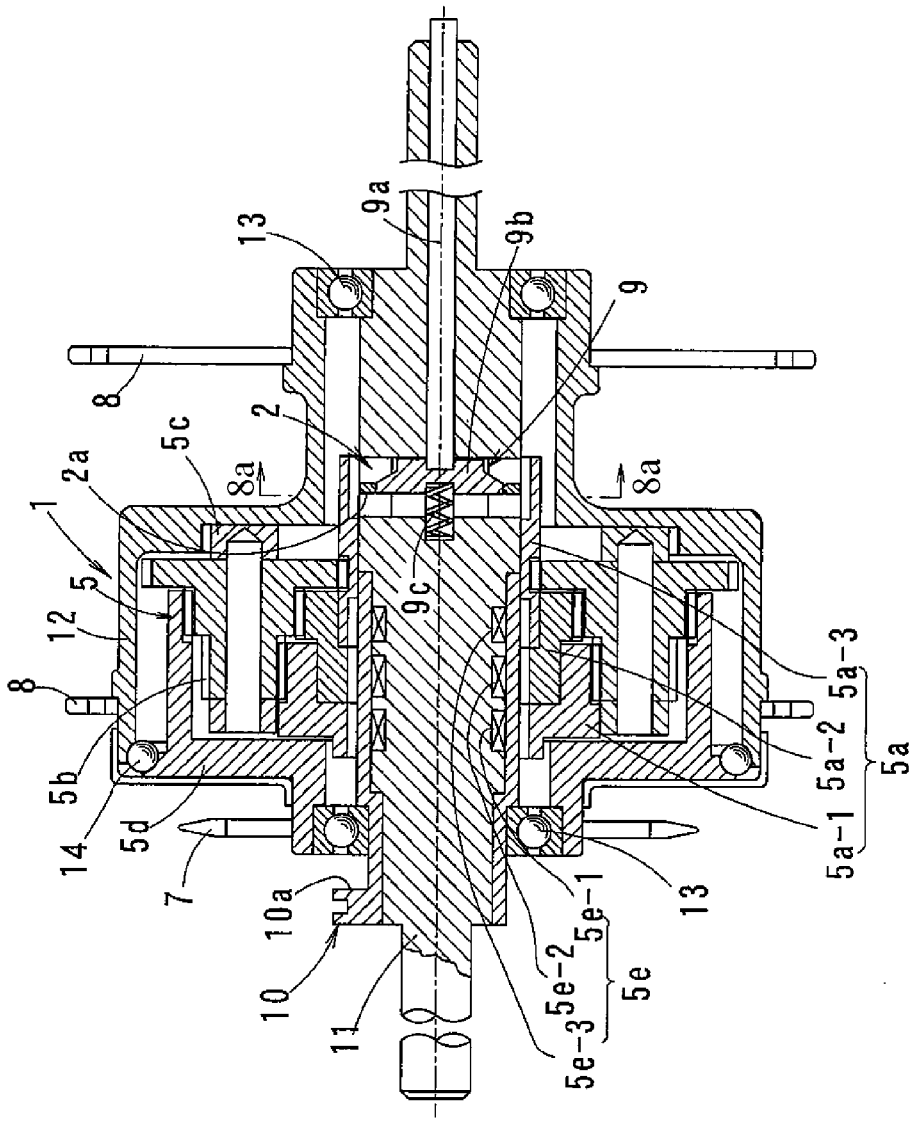
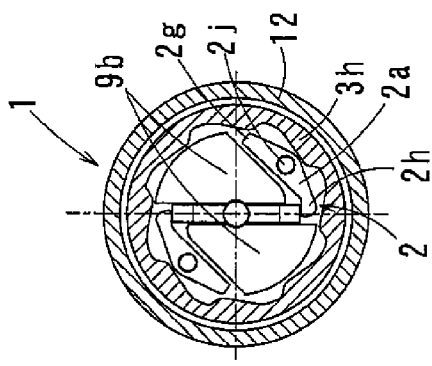
Fig. 8(a)
Fig. 8(b)

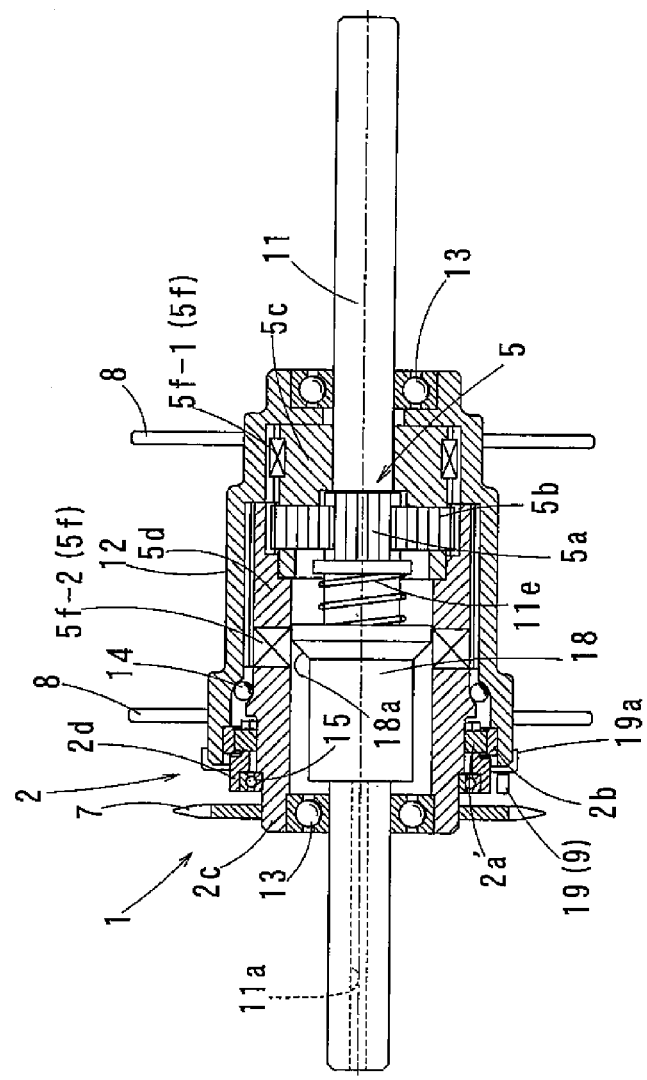
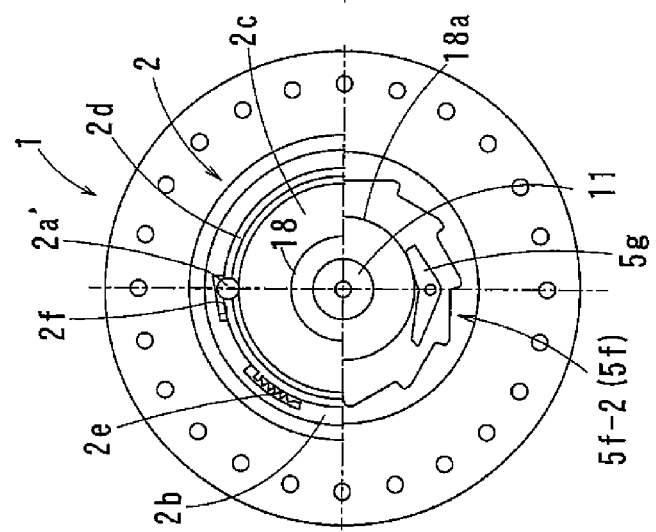

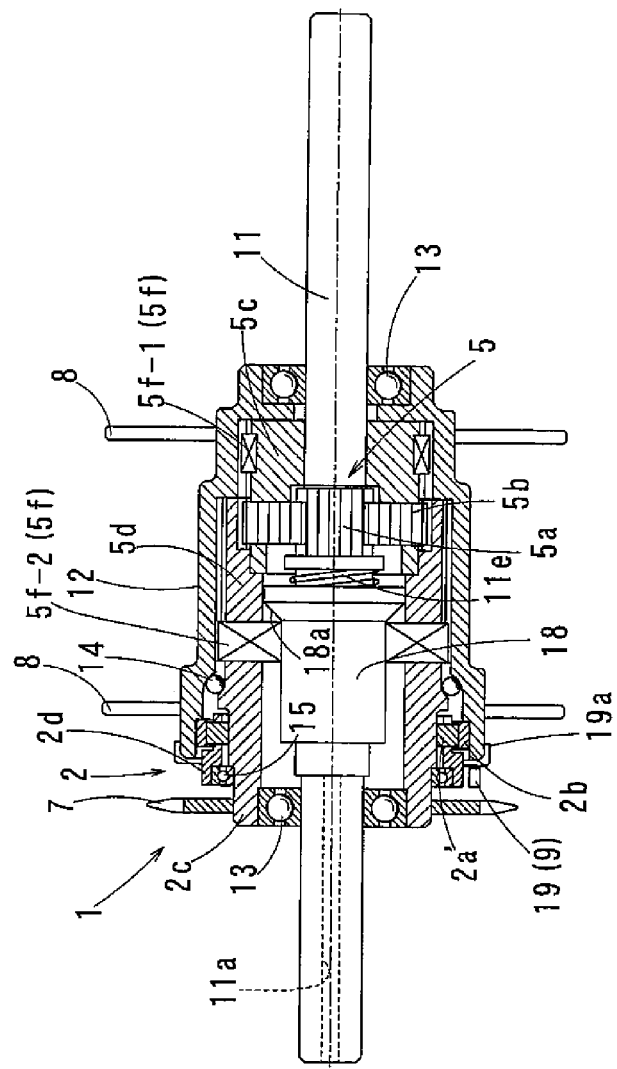
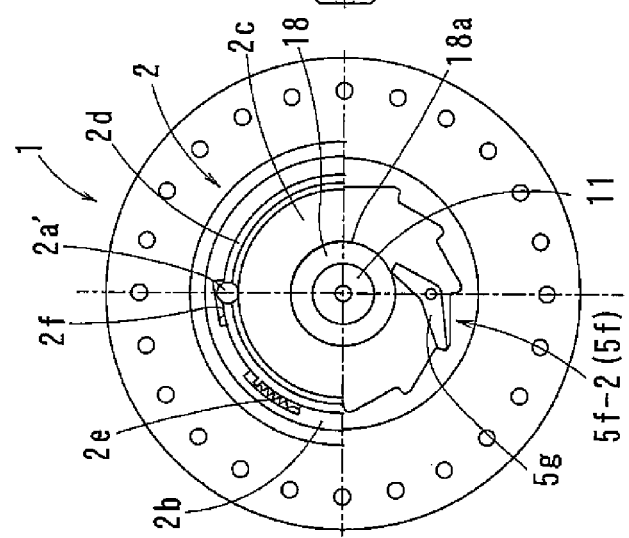

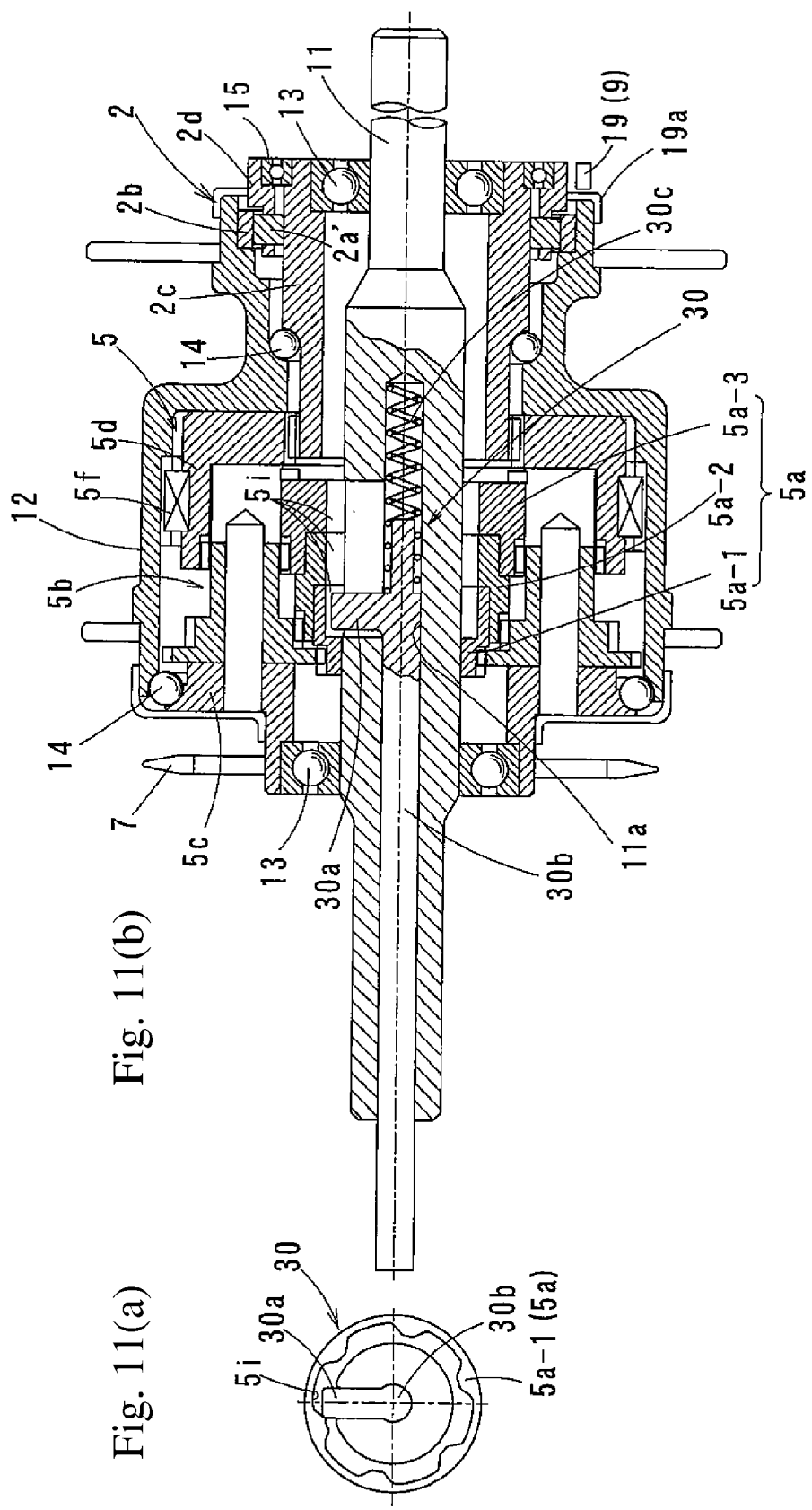

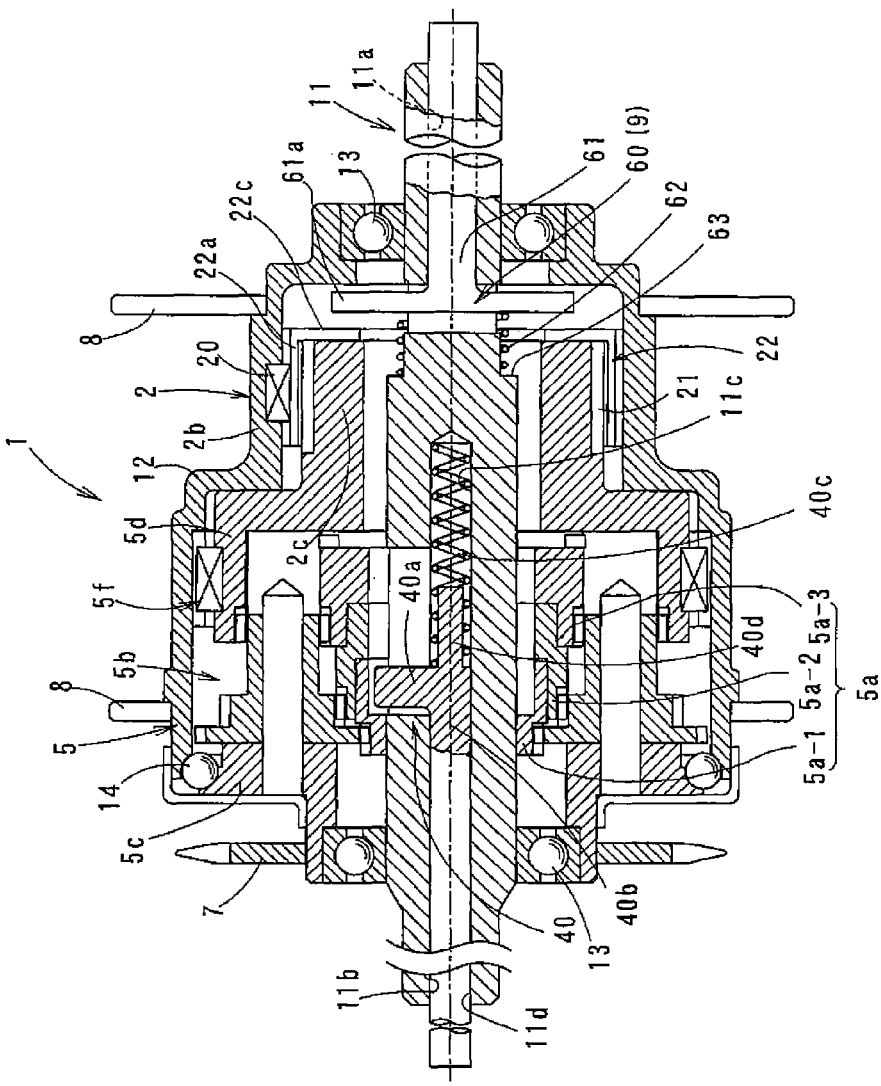
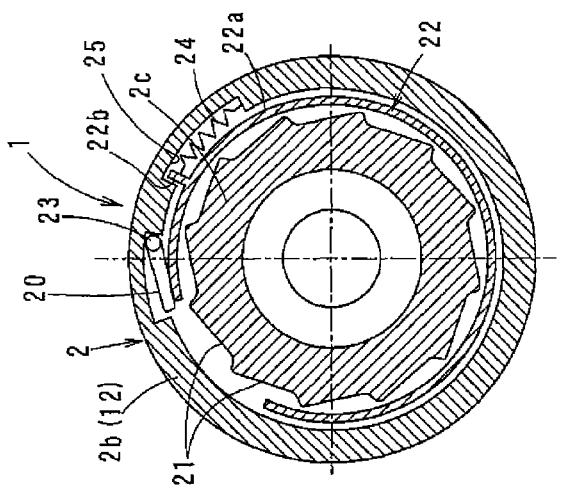
Fig. 19(a)
Fig. 19(b)

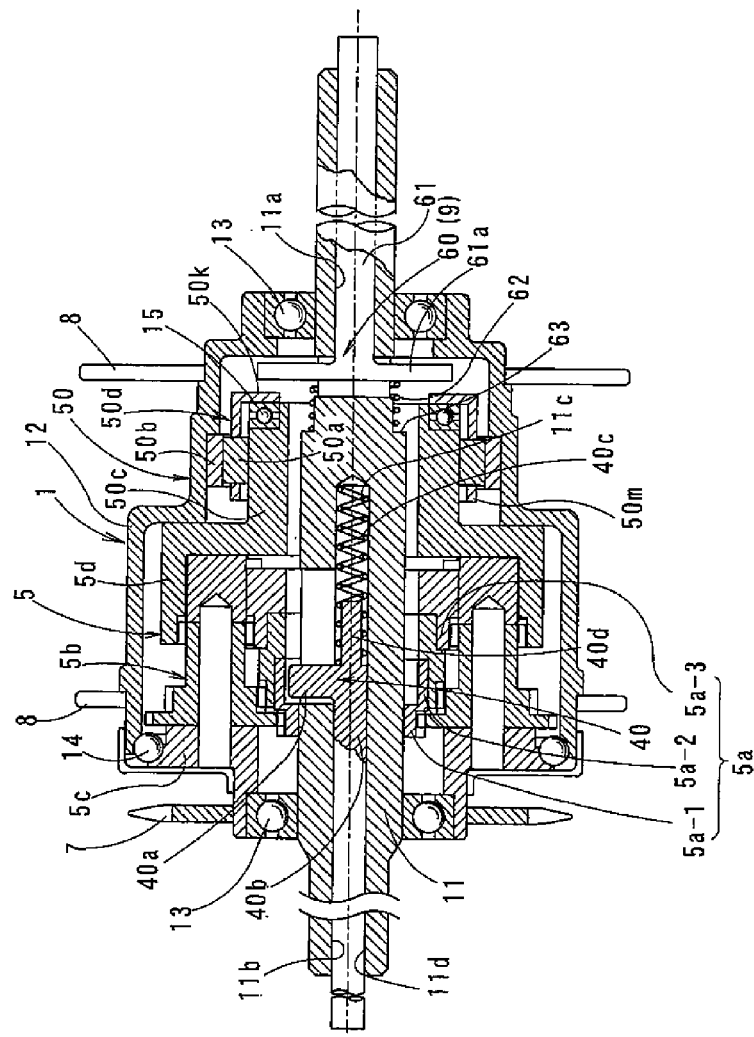
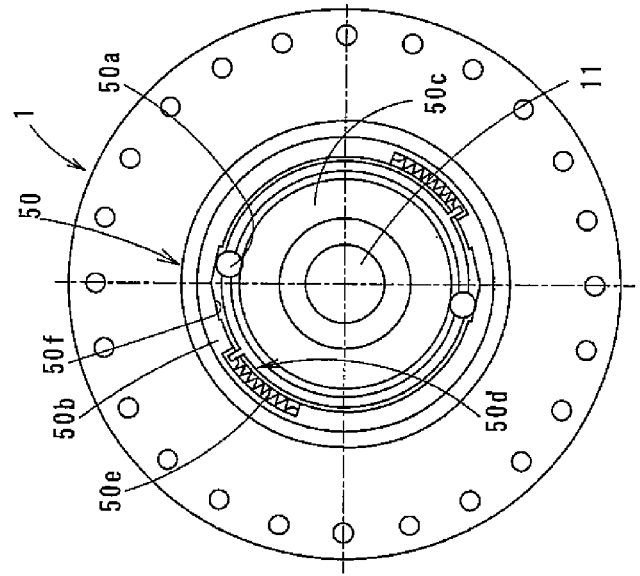
Fig. 22(a)
Fig. 22(b)

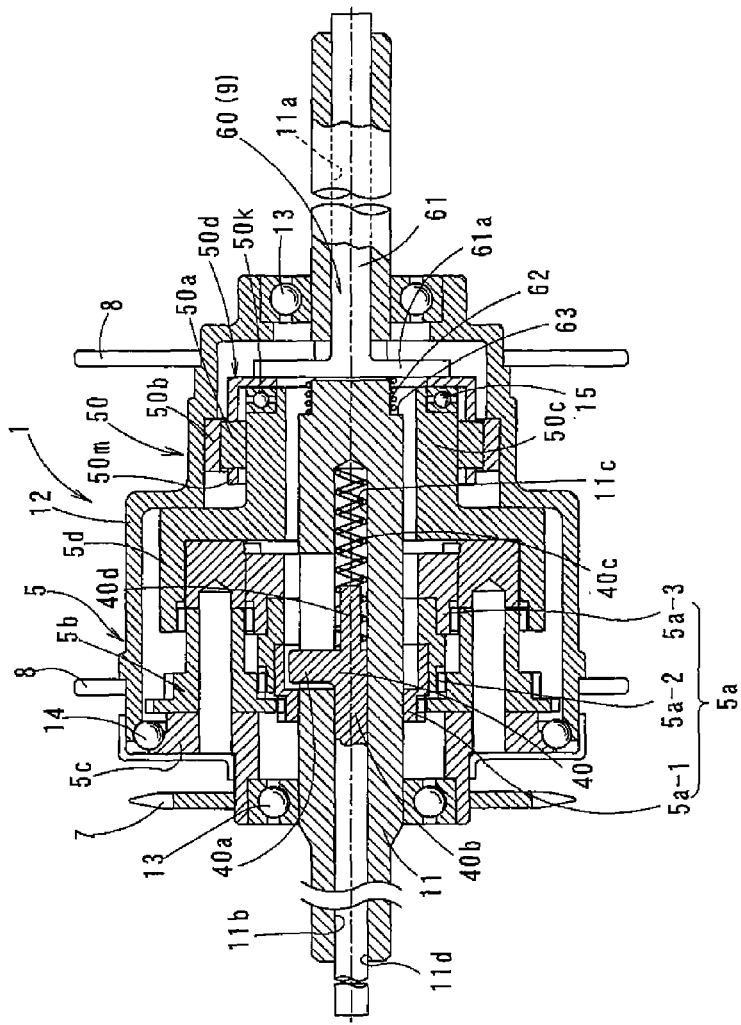
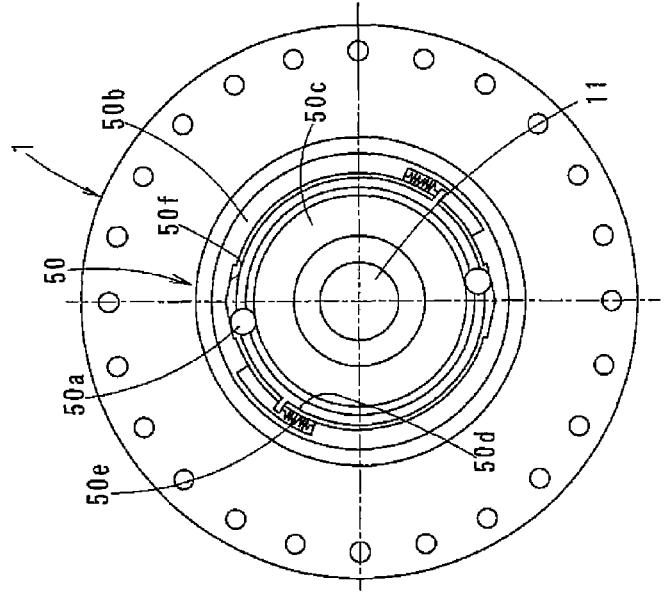
Fig. 23(b)
Fig. 23(a)

POWER ASSISTED BICYCLE WITH REGENERATIVE FUNCTION

BACKGROUND OF THE INVENTION

1. Technical Field

This invention relates to a power-assisted bicycle including an electric motor that adds electrical driving force to the manual driving force.

2. Background Art

Such a power-assisted bicycle carries a battery that supplies electricity to the electric motor for producing the additional electrical driving force. Since it is desired that the bicycle can travel as long a period of time as possible between charges of the battery, a power-assisted bicycle is now known which is capable of using energy generated while the bicycle is traveling for regeneration of the battery.

JP Patent Publication 8-140212A discloses a regeneration device for regenerating the battery including a control device for detecting the operation of the brake bars and controlling the regeneration device to regenerate the battery.

In the case of a power-assisted bicycle including a motor and a transmission mounted around the axle (hub-motor type), regeneration of the battery is realized simply by directly connecting the axle to the rotor of the motor (see e.g. JP Patent Publication 2003-166563A).

But such a hub-motor type bicycle has a problem in that the distance between the motor and the secondary battery is long and thus it is necessary to connect them thorough a long wire. Further, if the motor is mounted on the front axle, steering becomes difficult. Also, it is difficult to mount both the motor and the transmission on the rear axle.

Thus, a power-assisted bicycle with a regenerative function preferably includes a center motor unit comprising a manual drive unit including a crankshaft and its bearing, a power drive unit including a motor and a mechanism for supplying the motor power to the crankshaft, and a single housing in which both the manual drive unit and the power drive unit are mounted (see JP Patent Publication 10-250673A). Such a bicycle is easy to operate and simple in structure.

A center-motor type power-assisted bicycle with a regenerative function is disclosed e.g. in JP Patent Publication 2001-213383A.

This power-assisted bicycle includes a first one-way clutch disposed between the motor output shaft and the drive sprocket, a second one-way clutch disposed between the pedal crankshaft, to which manual force is applied, and the drive sprocket, and a directly coupling means for locking the first one-way clutch when the brakes are operated to regenerate the battery during braking. The rear hub is directly coupled to the rear sprocket so that reverse input torque from the wheel can be transmitted to the motor for regeneration.

JP Patent Publication 2004-268843A also discloses a similar power-assisted bicycle with a regenerative function.

This power-assisted bicycle includes a two-way clutch mounted in the center-motor unit and connected to the motor output shaft, and adapted to be selectively locked in either direction when the brakes are operated, thereby regenerating the battery during braking.

In particular, while the bicycle is being driven both by the manual force and the motor power, the two-way clutch is locked in the forward direction, thereby transmitting the motor output to the axle. When the brakes are applied, the two-way clutch is locked in the reverse rotational direction, so that reverse input torque (in the forward rotational direction) is transmitted to the motor for regeneration. In this arrangement, since it is necessary to transmit reverse input torque from the axle to the motor for regeneration, the rear hub is directly coupled to the rear sprocket.

As described above, power-assisted bicycles are roughly classified into the center-motor type, in which the motor is located near the crankshaft, and the hub motor type, in which the motor is mounted in the front hub or the rear hub.

The hub motor type has a problem in that besides a motor, a speed reducer has to be mounted in the rear hub too, so that it is difficult to use a speed reducer which is large enough to provide high speed reduction ratios, which in turn makes it impossible to produce large torque. Also, since heavy objects are mounted at locations apart from the center of gravity of the bicycle, steerability of the bicycle is not good. Further, since the distance between the motor and the battery is long, it is necessary to connect them thorough a long wire. Still further, since shock from the wheel is directly transmitted to the speed reducer and the motor, they tend to malfunction. Thus, an increasing number of today's power-assisted bicycles are of the center-motor type.

In the bicycles disclosed in JP Patent Publication 2001-213383A and JP Patent Publication 2004-268843A, which are center-motor type bicycles having a regenerative function, the rear hub and the rear sprocket are directly coupled together so that reverse input torque from the wheel can be transmitted to the motor shaft.

On the other hand, transmissions of ordinary bicycles are classified into the externally mounted type, which comprises a multi-stage sprocket assembly coaxially mounted on at least one of the crankshaft and the rear axle, and a derailer for moving the chain across the sprocket assembly to engage the chain with any selected one of the sprockets, and the internally mounted, which comprises gears mounted in the rear hub and used selectively to transmit torque. A one-way clutch is ordinarily mounted in such an internally mounted transmission so that reverse input from the wheel is not transmitted through the rear hub to the rear sprocket.

An externally mounted transmission is simple in structure and lightweight, but its sprockets and chain tend to quickly become worn and its chain can easily separate. The internally mounted transmission is dustproof and waterproof and is free of maintenance. Thus the internally mounted transmission is frequently used in a city bicycle. Most power-assisted bicycles of today are city bicycles and their transmissions are mostly internally mounted transmissions.

But the conventional internally mounted transmissions cannot transmit reverse input from the wheel to the rear sprocket through the rear hub, and thus cannot turn the center motor for regeneration.

One way to transmit reverse input would be to connect the axle to the crankshaft and the axle to the motor shaft through two separate power transmission means. But the two separate power transmission means would markedly lower the value of the bicycle from the viewpoint of layout and cost.

SUMMARY OF THE INVENTION

An object of the present invention is to provide a power-assisted bicycle of the center motor type including an internally mounted transmission and having a regenerative function with the least complexity of the structure.

In order to achieve the above object, the present invention provides a power-assisted bicycle comprising a front wheel, a rear wheel, one of the front and rear wheels being a drive wheel, a frame connecting the front and rear wheels, a secondary battery and a motor that are mounted on the frame, a crankshaft to which a manual force is applied, wherein driving force due to manual force applied to the crankshaft and/or the output of the motor can be transmitted to the drive wheel through a sprocket, and wherein reverse input from the drive wheel while the bicycle is traveling in the forward direction without being driven can be transmitted to an output shaft of the motor, and a regenerative mechanism for converting the reverse input applied to the output shaft of the motor to electric power and storing the electric power in the secondary battery, characterized in that the drive wheel has a hub carrying a transmission, a one-way clutch for reverse input, and a clutch switching device, that the transmission comprises a planetary gear mechanism including at least one sun gear and is capable of transmitting the driving force from the sprocket to the drive wheel, the bicycle further comprising a speed change mechanism for selectively rotationally fixing the sun gear to an axle or uncoupling the sun gear from the axle, thereby transmitting the driving force from the sprocket to the drive wheel in different speed ratios, and that the one-way clutch for reverse input is disposed between the sun gear and the axle, the clutch switching device being configured to switch over the one-way clutch, while the reverse input is being applied from the drive wheel, between a first position in which the sun gear is rotationally fixed to the axle through the one-way clutch and a second position in which the sun gear is not rotationally fixed to the axle through the one-way clutch, whereby while the bicycle is being driven, the driving force from the sprocket is transmitted to the drive wheel through the transmission, and while the bicycle is traveling in the forward direction without being driven, the reverse input from the drive wheel is transmitted to the sprocket when the one-way clutch for reverse input is in the first position.

With this arrangement, while the bicycle is being driven, driving force is transmitted from the sprocket of the drive wheel to the hub through the transmission, so that the bicycle travels in the forward direction. While the bicycle is traveling in the forward direction without being driven, reverse input from the hub of the drive wheel is transmitted to the sprocket through the one-way clutch for reverse input. Torque from the sprocket is thus transmitted to the motor driving sprocket through a power transmission member, and used for regeneration. While the driving force is being applied, the one-way clutch for reverse input always idles, irrespective of the position of the clutch switching device.

Since the one-way clutch is disposed between the sun gear and the axle, driving force and reverse input can be transmitted with a simple structure in a center-motor type power-assisted bicycle.

The one-way clutch for reverse input may be any known one-way clutch, such as a ratchet clutch.

The clutch switching device may include a rod-shaped operating member extending through the axle and having an end protruding from the axle, whereby by acting on the end of the operating member from outside, the operating member can be axially moved, thereby switching over the one-way clutch for reverse input between the first and second positions.

Alternatively, the clutch switching device may include a rotary member rotatably mounted around the axle and having a portion protruding from the hub case, whereby by acting on the portion of the rotary member protruding from the hub case, the rotary member can be rotated around the axle, thereby switching over the one-way clutch for reverse input between the first and second positions.

The one-way clutch for reverse input used for these arrangements may be any known one-way clutch, such as a roller clutch which includes engaging elements in the form of rollers, or a sprag clutch which includes engaging elements in the form of sprags.

In another arrangement, the one-way clutch for reverse input is an engaging element clutch including engaging elements and a retainer retaining the engaging elements, and the clutch switching device includes a rotary member rotatably mounted around the axle and having a first end protruding from the hub case and a second end coupled to the retainer of the one-way clutch for reverse input, whereby by acting on the first end of the rotary member, he rotary member can be rotated around the axle, thereby switching over the one-way clutch for reverse input between the first and second positions.

In any of the above arrangements, the one-way clutch for reverse input may be switched over between the first and second positions by the clutch switching device when brakes of the bicycle are operated.

By directly connecting the motor output shaft and the motor driving sprocket in the center motor unit, it is possible to transmit both the driving force and the reverse input. A center one-way clutch may be mounted between the crankshaft and the crank sprocket (manually driven sprocket) which is configured to lock up when driving force is applied thereto that tends to drive the drive wheel and get unlocked when reverse input is applied from the drive wheel, thereby preventing the pedals from being rotated by the reverse input.

The center one-way clutch may comprise e.g. a roller clutch, a sprag clutch or a ratchet clutch.

The present invention also provides a power-assisted bicycle comprising a front wheel, a rear wheel, one of the front and rear wheels being a drive wheel, a frame connecting the front and rear wheels, a secondary battery and a motor that are mounted on the frame, a crankshaft to which a manual force is applied, wherein driving force due to manual force applied to the crankshaft and/or the output of the motor can be transmitted to the drive wheel through a sprocket, and wherein reverse input from the drive wheel while the bicycle is not being driven can be transmitted to an output shaft of the motor, and a regenerative mechanism for converting the reverse input applied to the output shaft of the motor to electric power and storing the electric power in the secondary battery, characterized in that the drive wheel has a hub in which a transmission and a one-way clutch for reverse input are mounted, that the transmission is capable of transmitting the driving force from the sprocket to the drive wheel, and that the one-way clutch for reverse input is configured to idle while the drive wheel is being driven by manual force applied to the crankshaft and/or the output of the motor and is capable of transmitting reverse input from the drive wheel to the sprocket while the bicycle is not being driven.

With this arrangement, while the bicycle is being driven, driving force is transmitted from the sprocket of the drive wheel to the hub, so that the bicycle travels forward. While the bicycle is traveling in the forward direction without being driven, by locking the one-way clutch for reverse input, reverse input from the hub is transmitted to the sprocket. Torque from the sprocket is thus transmitted to the motor driving sprocket through a power transmission member, and used for regeneration.

In this arrangement, the transmission may be a two-speed planetary gear speed reduction mechanism comprising a sun gear mounted around an axle of the drive wheel, planetary gears meshing with the sun gear, a planetary carrier retaining the planetary gears, and an outer gear ring meshing with the planetary gears, wherein the sun gear is fixed, and outer ring gear and the planetary carrier are used as input and output members, respectively, to provide a reduced speed ratio, and the outer ring gear is used as both input and output members to provide a one-to-one speed ratio.

The transmission may be switched over using known means which can change gears of the input and output members that mesh with each other. For example, a slide member may be used which is axially movable relative to the axle and configured to switch over the speed ratio of the transmission by axially moving relative to the axle. With this arrangement, the slide member can be pulled out of the axle, so that it is possible to change the speed ratio from outside through the slide member.

The transmission may comprise a speed reduction transmission, wherein there are a plurality of the sun gears each having teeth of which the number differs from the numbers of teeth of the other sun gears, wherein the bicycle further comprises a transmission control mechanism capable of fixing any of the sun gears, and wherein one of the sun gears is selectively fixed, and the outer ring gear and the planetary carrier are used as input and output members, respectively, thereby selecting a speed reduction ratio.

Alternatively, the transmission is may be a speed increasing transmission, wherein there are a plurality of the sun gears each having teeth of which the number differs from the numbers of teeth of the other sun gears, wherein the bicycle further comprises a transmission control mechanism capable of fixing any of the sun gears, and wherein one of the sun gears is selectively fixed, and the planetary carrier and the outer ring gear are used as input and output members, respectively, thereby selecting a speed increase ratio.

Either of the above transmission control mechanisms may have the function of rotationally fixing any one of the sun gears to the axle while either the driving force or the reverse input is being applied, thereby changing the speed ratio.

The transmission control mechanism may include a snap key which can be axially moved relative to the axle from outside through means in the axle, the snap key being configured to mesh with and rotationally fix any one of the sun gears to the axle by axially moving, while either the driving force or the reverse input is being applied, thereby switching over the transmission.

The one-way clutch for reverse input may be configured to engage and disengage when brakes of the bicycle are operated. The one-way clutch for reverse input may be configured not to lock up so that reverse input is not transmitted while the bicycle is traveling backward without being driven, in the same manner as while the bicycle is being driven in the forward direction.

The one-way clutch for reverse input may be any known one-way clutch such as a roller clutch or a sprag clutch.

By directly connecting the motor output shaft and the motor driving sprocket in the center motor unit, it is possible to transmit both the driving force and the reverse input.

A center one-way clutch may be mounted between the crankshaft and the crank sprocket (manually driven sprocket) which is configured to lock up when driving force is applied thereto that tends to drive the drive wheel and get unlocked when reverse input is applied from the drive wheel, thereby preventing the pedals from being rotated by the reverse input.

The center one-way clutch may be any known one-way clutch such as a roller clutch, a sprag clutch or a ratchet clutch.

The present invention further provides a power-assisted bicycle comprising a front wheel, a rear wheel, one of the front and rear wheels being a drive wheel, a frame connecting the front and rear wheels, a secondary battery and a motor that are mounted on the frame, a crankshaft to which a manual force is applied, wherein driving force due to manual force applied to the crankshaft and/or the output of the motor can be transmitted to the drive wheel through a sprocket, and wherein reverse input from the drive wheel while the bicycle is not being driven can be transmitted to an output shaft of the motor, and a regenerative mechanism for converting the reverse input applied to the output shaft of the motor to electric power and storing the electric power in the secondary battery, characterized in that the drive wheel has a hub in which a transmission, a one-way clutch for reverse input, and a rotational resistance imparting means are mounted, the rotational resistance imparting means serving as a clutch switching device, that the transmission comprises a planetary gear mechanism including sun gears, and a transmission control mechanism capable of rotationally fixing any one of the sun gears to an axle, while keeping the other sun gears rotatable relative to the axle, while either the driving force or the reverse input is being applied, thereby providing two or more speed ratios, whereby the transmission is capable of transmitting the driving force applied to the sprocket due to the manual force and/or the output of the motor to the drive wheel, that the one-way clutch for reverse input is configured to idle while the drive wheel is being driven by the manual force and/or the output of the motor, and is capable of transmitting the reverse input from the drive wheel to the sprocket while the drive wheel is not being driven, and that the rotational resistance imparting means is capable of applying rotational resistance to an engaging element retaining means of the one-way clutch for reverse input that is large enough to move engaging elements of the one-way clutch for reverse input to an engageable position, and thereby engage the one-way clutch.

With this arrangement, while the bicycle is being driven in the forward direction, driving force is transmitted from the sprocket of the drive wheel to the hub. While the bicycle is traveling in the forward direction without being driven, by locking the one-way clutch for reverse input, reverse input from the hub is transmitted to the sprocket. Torque from the sprocket is thus transmitted to the motor driving sprocket through a power transmission member, and used for regeneration.

The one-way clutch for transmitting reverse input, which is disposed between the sprocket and the hub, engages or disengages by applying rotational resistance to its engaging element retaining means from the rotational resistance imparting means, which is provided in the hub. Thus, all the component parts are mounted in the hub, i.e. in the hub case, so that it is possible to prevent corrosion of the engaging element retaining means of the one-way clutch due to water and mud from outside, or damage to or deformation of the retaining means due to unnecessary external force.

In this arrangement, the rotational resistance may be applied to the engaging element retaining means from the rotational resistance imparting means when brakes of the bicycle are applied. Since regeneration is necessary mainly while the bicycle is not being driven, regeneration can be effectively carried out by applying rotational resistance to the engaging element retaining means when the brakes are applied, because the brakes are applied mainly while the bicycle is not being driven.

It is also possible to apply rotational resistance to the engaging element retaining means from the rotational resistance imparting means other than when the brakes of the bicycle are operated. For example, the rotational resistance imparting means may be configured such that as soon as it is detected that the manual force on the pedals and the output from the motor both stop, rotational resistance is automatically applied to the engaging element retaining means, while not applying such rotational resistance while the driving force is being applied to the pedals or the motor is producing output.

In these arrangements, the rotational resistance imparting means may comprise an operating member axially movable relative to the axle and a friction portion axially movable together with the operating member, wherein the friction portion is configured to contact the engaging element retaining means, thereby producing the rotational resistance, when the operating member moves axially in one direction relative to the axle together with the friction portion.

Various configurations are possible for the rotational resistance imparting means, which is mounted in the hub. But it is not easy to reliably and selectively apply rotational resistance because the hub rotates while the bicycle is traveling.

By providing an operating portion extending in the axial direction of the axle so as to be axially movable relative to the axle, it is possible to locate the operating portion outside the hub together with the axle, so that it is possible to stably apply rotational resistance to engaging element retaining means while preventing entry of water and mud into the hub and also preventing damage to and deformation of the engaging element retaining means.

The operating member may be a tubular member mounted around the axle so as to be coaxial with the axle. Otherwise, the operating member may be inserted in an axial hole formed in the axle so as to be coaxial with the axle. With the latter arrangement, since the operating member is located inside the axle, its damage is prevented even when the bicycle encounters an accident.

The friction portion may be a flange-shaped member protruding radially outwardly from the outer periphery of the axle. Since the engaging element retaining means is located radially outwardly from the axle, the friction portion has to be located so as to be capable of contacting the engaging element retaining means, i.e. so as to axially face the abutment surface of the engaging element retaining means. Thus, the above-mentioned flange-shaped member is ideal. Such a flange-shaped member can be made thin in the axial direction and thus serves to reduce the weight and size of the device.

But the friction portion is not limited to such a flange-shaped member, provided there is no problem regarding weight and size. For example, the friction portion may comprise a protrusion or a bulge radially outwardly protruding from one axial end of the operating portion so as axially face the abutment surface of the engaging element retaining means.

In any of the above arrangements, the one-way clutch for reverse input may be a roller clutch comprising rollers as the engaging elements, and an annular retainer as the engaging element retaining means, the annular retainer circumferentially retaining the rollers.

Alternatively, in any of the above arrangements, the one-way clutch for reverse input may be a sprag clutch comprising sprags as the engaging elements, and an annular retainer as the engaging element retaining means, the annular retainer circumferentially retaining the sprags.

Further alternatively, the one-way clutch for reverse input may be a ratchet clutch including a clutch pawl (ratchet pawl) as the engaging element, and a ratchet groove in which the ratchet pawl is engageable, in which the engaging element retaining means is a shutter which is movable into and out of between the ratchet pawl and the ratchet groove.

In any of these arrangements, the retainer may comprise an annular portion having a plurality of circumferentially spaced apart pockets in which the engaging elements are received, respectively, and an end plate radially extending from the annular portion, in which the friction portion is configured to contact the end plate.

Since the retainer is ordinarily formed from a radially thin member, it is difficult to ensure a sufficiently large contact surface with the friction portion of the rotational resistance imparting means for applying rotational resistance to the retainer.

But by providing the end plate, which radially extends from the annular portion, it is possible to increase the contact surface in the radial direction, thereby reliably producing frictional resistance therebetween. The end plate may extend radially outwardly. But by providing a radially inwardly extending end plate, since the abutment surface with the friction portion is located closer to the axis of the axle, it is possible to minimize the size of each member as well as the entire device.

Needless to say, the friction portion may be brought into contact with an axial end of the annular portion of the retainer, provided sufficient rotational resistance is produced between the friction portion and the retainer. In this case, the end plate may be omitted.

In this arrangement, the one-way clutch for reverse input may include an inner ring, and a bearing may be disposed between the inner ring and the end plate of the retainer of the one-way clutch for reverse input to support the inner ring and the retainer so as to be rotatable relative to each other.

Since the end plate extends radially from the annular portion, when the friction portion of the rotational resistance imparting means abuts the end plate, axial force acts on the end plate. Thus, the bearing between the end plate and the inner ring serves as a thrust bearing for receiving the axial force applied from the friction portion to the end plate, thus serves to minimize the size of the retainer.

In the arrangement in which the one-way clutch for reverse input includes the shutter, the shutter may comprise a circumferentially extending portion which can be moved into and out of between the ratchet pawl and the ratchet groove, and an end plate radially extending from the circumferentially extending portion, in which the friction portion is configured to contact the end plate. This end plate provides the same advantages as the end plate of the retainer.

In the arrangement in which the shutter has the end plate, a bearing may be disposed between the inner ring and the end plate of the shutter of the one-way clutch for reverse input to support the inner ring and the shutter so as to be rotatable relative to each other.

In any of the above arrangements, the transmission control mechanism may include a snap key which can be axially moved relative to the axle from outside through means in the axle, the snap key being configured to mesh with and rotationally fix any one of the sun gears to the axle by axially moving, while either the driving force or the reverse input is being applied, thereby switching over the transmission.

In the center motor unit, it is possible to transmit both driving force and reverse input by directly connecting the motor output shaft to the motor driving sprocket. By mounting a center one-way clutch configured to transmit driving force only and idle when inverse input is applied between the crankshaft and the crank sprocket (manually driven sprocket), it is possible to prevent the pedals from being rotated by reverse input.

The center one-way clutch may be a roller clutch, a sprag clutch or a ratchet clutch.

From another aspect, the present invention provides a power-assisted bicycle comprising a front wheel, a rear wheel, one of the front and rear wheels being a drive wheel, a frame connecting the front and rear wheels, a secondary battery and a motor that are mounted on the frame, a crankshaft to which a manual force is applied, wherein driving force due to manual force applied to the crankshaft and/or the output of the motor can be transmitted to the drive wheel through a sprocket, and wherein reverse input from the drive wheel while the bicycle is not being driven can be transmitted to an output shaft of the motor, and a regenerative mechanism for converting the reverse input applied to the output shaft of the motor to electric power and storing the electric power in the secondary battery, characterized in that the drive wheel has a hub carrying a transmission, a two-way clutch including engaging elements and a retainer circumferentially retaining the engaging elements, and a rotational resistance imparting means, that the transmission comprises a planetary gear mechanism including sun gears, and a transmission control mechanism capable of rotationally fixing any one of the sun gears to an axle, while keeping the other sun gears rotatable relative to the axle, while either the driving force or the reverse input is being applied, thereby providing two or more speed ratios, whereby the transmission is capable of transmitting the driving force applied to the sprocket due to the manual force and/or the output of the motor to the drive wheel, that the two-way clutch is configured to engage and transmit the driving force due to manual force and/or the output of the motor to the drive wheel, and is capable of transmitting the reverse input from the drive wheel to the sprocket while the drive wheel is not being driven, and that the rotational resistance imparting means is capable of applying rotational resistance to the retainer of the two-way clutch that is large enough to engage the two-way clutch.

With this arrangement, while the bicycle is being driven in the forward direction, driving force is transmitted from the sprocket of the drive wheel to the hub through the two-way clutch, so that the bicycle moves forward. While the bicycle is traveling forward without being driven, reverse input is transmitted from the hub of the drive wheel to the sprocket through the two-way clutch, and then transmitted to the motor driving sprocket through a power transmission member, thereby regenerating the battery.

By using the two-way clutch, this single clutch can transmit both driving force and reverse input. This simplifies its structure.

In this arrangement, the rotational resistance may be applied to the retainer from the rotational resistance imparting means when brakes of the bicycle are applied. Since regeneration is necessary mainly while the bicycle is not being driven, regeneration can be effectively carried out by applying rotational resistance to the retainer when the brakes are applied, because the brakes are applied mainly while the bicycle is not being driven.

It is also possible to apply rotational resistance to the retainer from the rotational resistance imparting means other than when the brakes of the bicycle are operated. For example, the rotational resistance imparting means may be configured such that as soon as it is detected that the manual force on the pedals and the output from the motor both stop, rotational resistance is automatically applied to the retainer, while not applying such rotational resistance while the driving force is being applied to the pedals or the motor is producing output.

In these arrangements, the rotational resistance imparting means may comprises an operating member axially movable relative to the axle and a friction portion axially movable together with the operating member, in which the friction portion is configured to contact the retainer, thereby producing the rotational resistance, when the operating member moves axially in one direction relative to the axle together with the friction portion.

The rotational resistance imparting means may be of one of various structures provided inside or outside the hub.

For example, if the retainer of the two-way clutch protrudes from the hub case, by bringing a suitable member into contact with the protruding portion of the retainer, it is possible to relatively easily apply rotational resistance to the retainer. This suitable member may be any member provided outside the hub case so as to be movable in the axial or radial direction relative to the axle.

But if the retainer is mounted in the hub, it is not easy to reliably and selectively apply rotational resistance because the hub rotates while the bicycle is traveling.

Thus if the retainer is mounted in the hub, by providing an operating portion extending in the axial direction of the axle so as to be axially movable relative to the axle, it is possible to locate the operating portion outside the hub together with the axle, so that it is possible to stably apply rotational resistance to the retainer while preventing entry of water and mud into the hub and also preventing damage to and deformation of the engaging element retaining means. In the arrangement in which the operating member protrudes from the hub case too, the operating member may be arranged to be axially movable relative to the axle.

The operating member may be a tubular member mounted around the axle so as to be coaxial with the axle. Otherwise, the operating member may be inserted in an axial hole formed in the axle so as to be coaxial with the axle. With the latter arrangement, since the operating member is located inside the axle, its damage is prevented even when the bicycle encounters an accident.

The friction portion may be a flange-shaped member protruding radially outwardly from the outer periphery of the axle. Since the engaging element retaining means is located radially outwardly from the axle, the friction portion has to be located so as to be capable of contacting the engaging element retaining means, i.e. so as to axially face the abutment surface of the engaging element retaining means. Thus, the above-mentioned flange-shaped member is ideal. Such a flange-shaped member can be made thin in the axial direction and thus serves to reduce the weight and size of the device. This arrangement is especially advantageous if the retainer is mounted in the hub case.

But the friction portion is not limited to such a flange-shaped member, provided there is no problem regarding weight and size. For example, the friction portion may comprise a protrusion or a bulge radially outwardly protruding from one axial end of the operating portion so as axially face the abutment surface of the engaging element retaining means.

In the arrangements including the above operating member, the retainer may comprise an annular portion having a plurality of circumferentially spaced apart pockets in which the engaging elements are received, respectively, and an end plate radially extending from the annular portion, in which the friction portion is configured to contact the end plate.

Since the retainer is ordinarily formed from a radially thin member, it is difficult to ensure a sufficiently large contact surface with the friction portion of the rotational resistance imparting means for applying rotational resistance to the retainer.

But by providing the end plate, which radially extends from the annular portion, it is possible to increase the contact surface in the radial direction, thereby reliably producing frictional resistance therebetween. The end plate may extend radially outwardly. But by providing a radially inwardly extending end plate, since the abutment surface with the friction portion is located closer to the axis of the axle, it is possible to minimize the size of each member as well as the entire device.

Needless to say, the friction portion may be brought into contact with an axial end of the annular portion of the retainer, provided sufficient rotational resistance is produced between the friction portion and the retainer. In this case, the end plate may be omitted.

In this arrangement, the two-way clutch may include an inner ring, and a bearing may be disposed between the inner ring and the end plate of the retainer of the two-way clutch to support the inner ring and the retainer so as to be rotatable relative to each other.

Since the end plate extends radially from the annular portion, when the friction portion of the rotational resistance imparting means abuts the end plate, axial force acts on the end plate. Thus, the bearing between the end plate and the inner ring serves as a thrust bearing for receiving the axial force applied from the friction portion to the end plate, thus serves to minimize the size of the retainer.

The two-way clutch may be a roller clutch of which the engaging elements are rollers, and the retainer is an annular retainer circumferentially retaining the rollers.

Alternatively, the two-way clutch may be a sprag clutch of which the engaging elements are sprags, and the retainer is an annular retainer circumferentially retaining the sprags.

In these arrangements, the transmission control mechanism may include a snap key which can be axially moved relative to the axle from outside through means in the axle, the snap key being configured to mesh with and rotationally fix any one of the sun gears to the axle by axially moving, while either the driving force or the reverse input is being applied, thereby switching over the transmission.

By directly connecting the motor output shaft and the motor driving sprocket in the center motor unit, it is possible to transmit both the driving force and the reverse input. A center one-way clutch may be mounted between the crankshaft and the crank sprocket (manually driven sprocket) which is configured to lock up when driving force is applied thereto that tends to drive the drive wheel and get unlocked when reverse input is applied from the drive wheel, thereby preventing the pedals from being rotated by the reverse input.

The center one-way clutch may comprise e.g. a roller clutch, a sprag clutch or a ratchet clutch.

The present invention makes it possible to store regenerated energy in the secondary battery, thus markedly increasing the distance the bicycle can travel between charges, compared to the case in which no regeneration is carried out. Conventional power-assisted bicycles with a regenerative function carry a heavyweight motor in the front or rear hub. In contrast, since the motor is mounted at a location close to the crankshaft and thus close to the center of gravity of the bicycle, steerability of the bicycle improves. Since the bicycle according to the present invention has a transmission, the bicycle can be started with a smaller manual force. The driver can thus control the bicycle in a balanced manner. It is also possible to save assisting power, thus further increasing the travel distance between charges.

Since the transmission is mounted in the hub, it is durable and free of maintenance. Since the one-way clutch for reverse input is disposed between the sun gears and the axle, it is possible to mount this one-way clutch on the axle, which is fixed to the frame.

Thus, by disposing the one-way clutch for reverse input between the sun gears and the axle, it is possible to transmit both driving force and reverse input without complicating the structure of the power-assisted bicycle of the center motor type including an internally mounted transmission.

By actuating the one-way clutch for reverse input when the brakes are applied, it is possible to increase the braking force.

By applying rotational resistance to the engaging element retaining means of the one-way clutch for reverse input for transmitting reverse input between the sprocket and the hub from the rotational resistance imparting means, which is mounted in the hub, the one-way clutch for reverse input can be selectively engaged and disengaged. Thus, all of the components are mounted in the hub, which prevents corrosion of the engaging element retaining means due to water and mud from outside, and also prevents damage to and deformation of the engaging element retaining means due to unnecessary external influence.

By using the two-way clutch, which is capable of transmitting both reverse input and driving force, the single clutch can transmit both driving force and reverse input, which further simplifies the structure.

BRIEF DESCRIPTION OF THE DRAWINGS

FIGS. 1(a) and 1(b) show a first embodiment, of which FIG. 1(a) is a sectional view taken along line 1a-1a of FIG. 1(b), and FIG. 1(b) is a front view.

FIGS. 2(a) and 2(b) show the first embodiment showing the state in which reverse input torque can be transmitted, of which FIG. 2(a) is a sectional view taken along line 2a-2a of FIG. 2(b), and FIG. 2(b) is a front view.

FIGS. 3(a) and 3(b) show a second embodiment, of which FIG. 3(a) is a sectional view taken along line 3a-3a of FIG. 3(b), and FIG. 3(b) is a front view.

FIGS. 4(a) and 4(b) show the second embodiment showing the state in which reverse input torque can be transmitted, of which FIG. 4(a) is a sectional view taken along line 4a-4a of FIG. 4(b), and FIG. 4(b) is a front view.

FIGS. 5(a) and 5(b) show a third embodiment, of which FIG. 5(a) is a sectional view taken along line 5a-5a of FIG. 5(b), and FIG. 5(b) is a front view.

FIGS. 6(a) and 6(b) show the third embodiment showing the state in which reverse input torque can be transmitted, of which FIG. 6(a) is a sectional view taken along line 6a-6a of FIG. 6(b), and FIG. 6(b) is a front view.

FIGS. 7(a) and 7(b) show a fourth embodiment, of which FIG. 7(a) is a sectional view taken along line 7a-7a of FIG. 7(b), and FIG. 7(b) is a front view.

FIGS. 8(a) and 8(b) show a fifth embodiment, of which FIG. 8(a) is a sectional view taken along line 8a-8a of FIG. 8(b), and FIG. 8(b) is a front view.

FIGS. 9(a) and 9(b) show a sixth embodiment in a one-to-one speed ratio, of which FIG. 9(a) is a sectional front view, and FIG. 9(b) is a side view.

FIGS. 10(a) and 10(b) show the sixth embodiment in a reduced speed ratio, of which FIG. 10(a) is a sectional front view, and FIG. 10(b) is a side view.

FIGS. 11(a) and 11(b) show a seventh embodiment in a one-to-one speed ratio, of which FIG. 11(a) is a sectional front view, and FIG. 11(b) is a side view.

FIGS. 12(a) and 12(b) show the seventh embodiment in a reduced speed ratio, of which FIG. 12(a) is a sectional front view, and FIG. 12(b) is a side view.

FIGS. 16(a) and 16(b) show an 11th embodiment, of which FIG. 16(a) is a side view, and FIG. 16(b) is a front view.

FIGS. 17(a) and 17(b) show the 11th embodiment in which rotational resistance is being applied to a retainer, of which FIG. 17(a) is a side view, and FIG. 17(b) is a front view.

FIGS. 19(a) and 19(b) show a 12th embodiment, of which FIG. 19(a) is a side view, and FIG. 19(b) is a front view.

FIGS. 22(a) and 22(b) are a side view and a front view, respectively, of a 14th embodiment.

FIGS. 23(a) and 23(b) are a side view and a front view, respectively, of the 14th embodiment, showing the state in which rotational resistance is applied to the retainer.

DETAILED DESCRIPTION OF THE INVENTION

First Embodiment

Figure 1B:
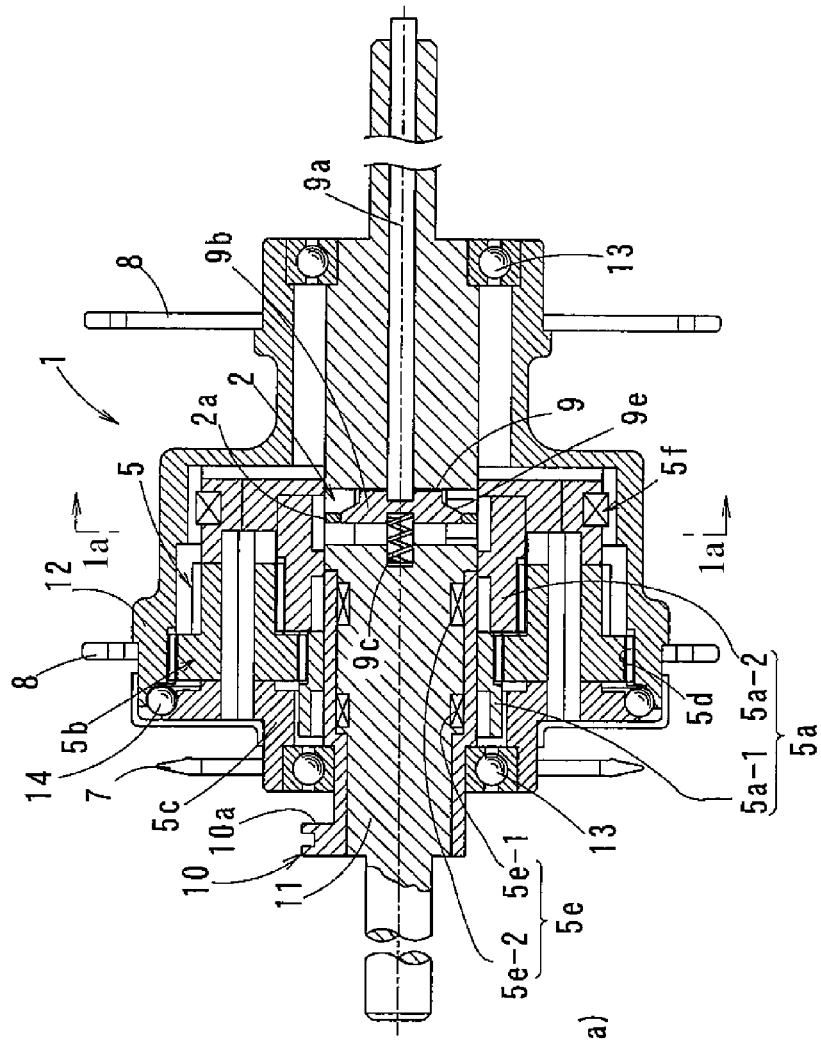
Figure 1A:
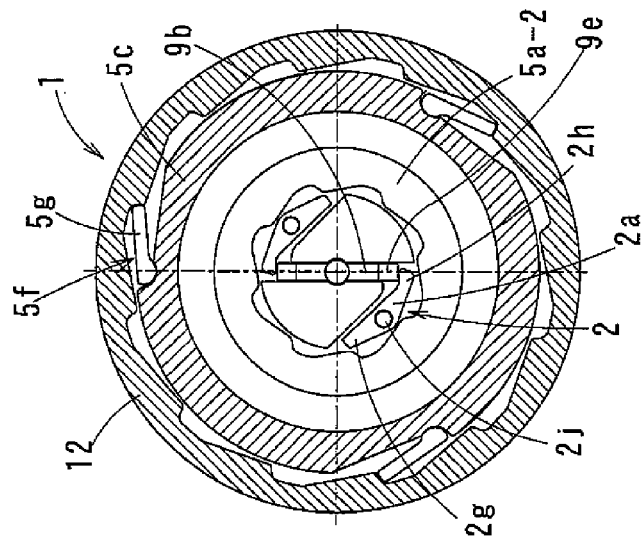
Figures 2A, 2B:
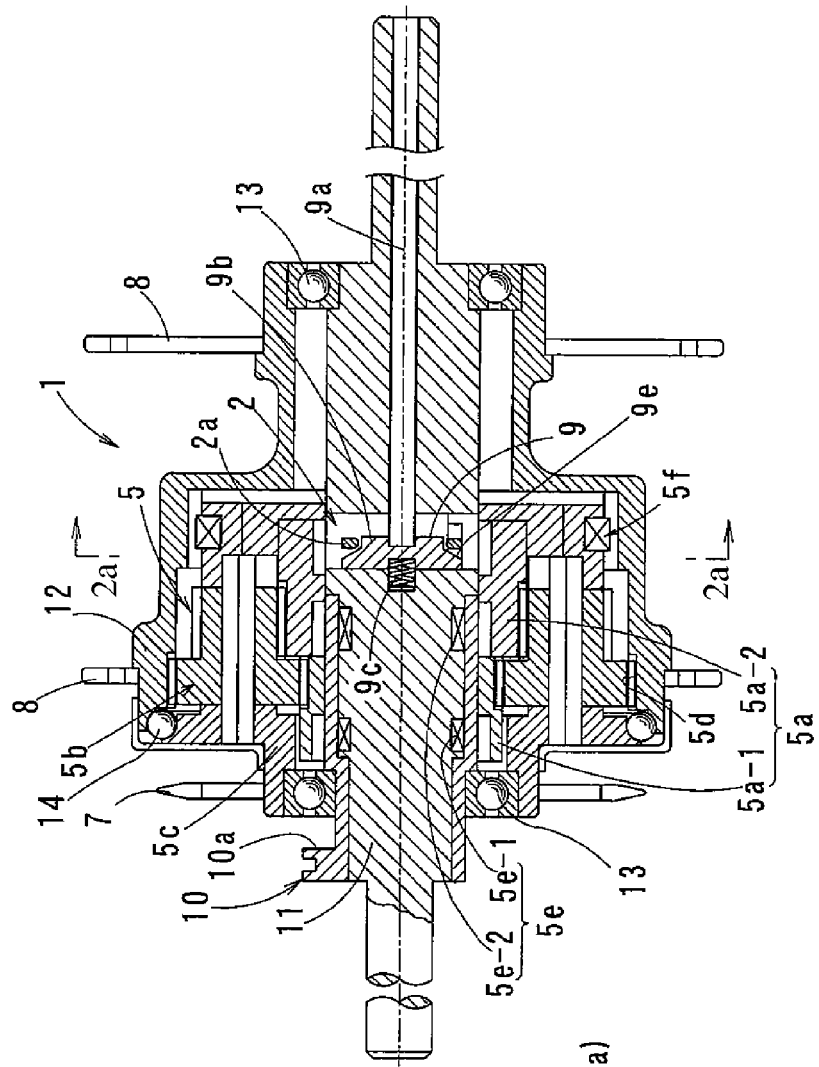

FIGS. 1 and 2 show the first embodiment of the present invention. The power-assisted bicycle of this embodiment is of the center-motor type in which a secondary battery and a drive-assisting motor (center motor unit C) are mounted on a frame connecting the front and rear wheels together at around the center between the front and rear wheels.

Figure 27:
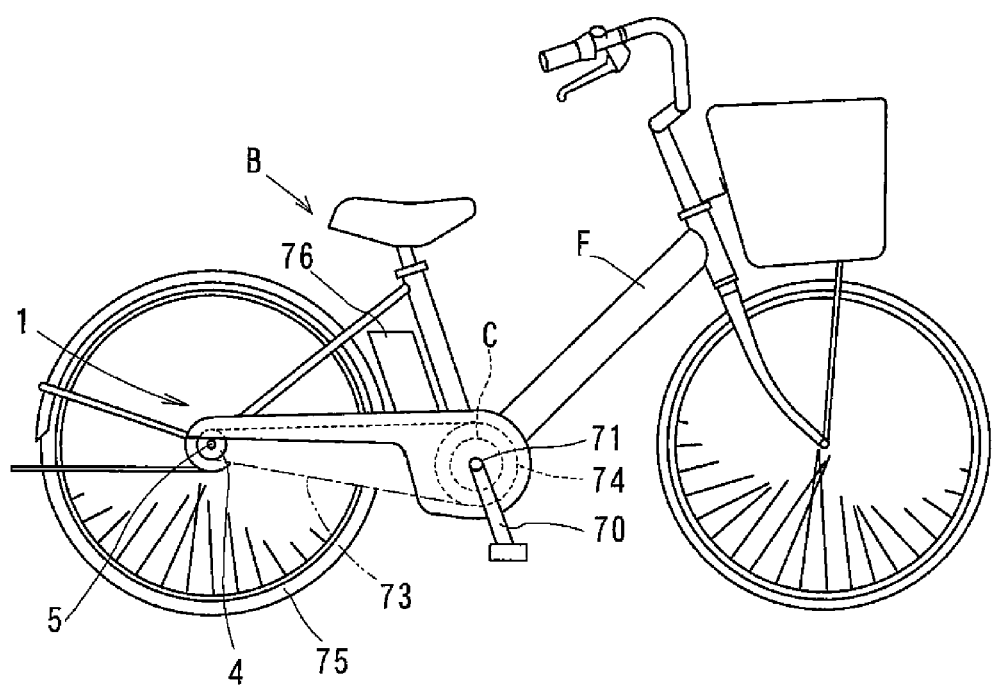
FIG. 27 shows an entire power-assisted bicycle of the center-motor type, in which a secondary battery and a drive-assisting motor (center motor unit) are mounted on a frame connecting the front and rear wheels together.

FIG. 27 is a side view of a typical power-assisted bicycle B that represents each of this and the following embodiments. With this bicycle, manual force applied to the pedals 70 is transmitted to the axle 11 of the rear wheel through a driving force transmission mechanism comprising a crankshaft 71, front sprocket 74, chain 73 and rear sprocket 7. The output of the motor is also added to the driving force transmission mechanism, thereby assisting in driving the bicycle.

Typically, as shown in FIG. 27, the center motor unit C is mounted near the crankshaft 71 with its battery 76 for driving the motor mounted in juxtaposition with the upright pipe.

Manual force applied through the pedals 70 and the crankshaft 71, or this manual force and the output of the motor are transmitted to the rear wheel 75 through the chain 73 connecting the crank sprocket of the center motor unit C (i.e. the front sprocket 74) and the (rear) sprocket 7 of the rear wheel 75 as the drive wheel.

The center motor unit C carries therein a regenerative mechanism for returning regenerated power generated by reverse input applied to the output shaft of the motor from a (rear) hub 1 of the rear wheel 75 to the secondary battery in the center motor unit C.

As shown in FIG. 1(b), the rear hub 1 includes a hub case 12 arranged coaxially with the axle 11 of the rear wheel, and a transmission 5 and a one-way clutch 2 for transmitting reverse input that are mounted in the hub case 12.

The transmission 5 comprises a planetary gear mechanism which provides three speed ratios, i.e. a speed ratio with direct connection and two higher speed ratios.

This planetary gear mechanism includes two sun gears 5a mounted around the axle 11 (which are hereinafter individually referred to as "first sun gear 5a-1" and "second sun gear 5a-2"), and first and second one-way clutches 5e-1 and 5e-2 through which the respective sun gears 5a-1 and 5a-2 can be connected to the axle 11.

In this embodiment, the first and second one-way clutches 5e-1 and 5e-2 are ratchet clutches. But they may be any other type of one-way clutches, such as roller clutches or sprag clutches.

The transmission 5 further includes planetary gears 5b each having two rows of teeth, each row meshing with one of the first and second sun gears 5a-1 and 5a-2, a planetary carrier 5c supporting the planetary gears 5b, an outer ring gear 5d meshing with the planetary gears 5b, and a speed changing one-way clutch 5f disposed between the planetary carrier 5c and the hub case 12. In this embodiment, the outer ring gear 5d is integral with the hub case 12.

In this embodiment, as shown in FIG. 1(a), the speed changing one-way clutch 5f is a ratchet clutch having clutch pawls (ratchet pawls) 5g configured to engage between the outer periphery of the planetary carrier 5c and the inner periphery of the hub case 12 when the planetary carrier 5c and the hub case 12 rotate relative to each other in one direction, and configured to disengage when the planetary carrier 5c and the hub case 12 rotate relative to each other in the opposite direction. The speed changing one-way clutch 5f may be any other type of one-way clutch such as a roller clutch or a sprag clutch.

Bearings 13 are provided between the planetary carrier 5c and the axle 11 and between the hub case 12 and the axle 11, respectively, so that the planetary carrier 5c and the axle 11, as well as the hub case 12 and the axle 11 can rotate relative to each other.

Another bearing 14 is provided between the planetary carrier 5c and the hub case 12 so that the planetary carrier 5c and the hub case 12 can rotate relative to each other.

By operating a transmission control mechanism 10, either of the first and second sun gears 5a-1 and 5a-2 can be selectively fixed to the axle 11 through the corresponding one of the first and second one-way clutches 5e-1 and 5e-2, or both sun gears 5a-1 and 5a-2 can be disengaged from the axle 11.

When driving force is transmitted from the rear sprocket 7 with both sun gears 5a-1 and 5a-2 disengaged from the axle 11, the driving force is directly transmitted to the hub case 12 through the planetary carrier 5c and the speed changing one-way clutch 5f with the planetary gear mechanism not serving to increase the speed ratio (direct connection). Thus in this state, the rear sprocket 7 and the hub case 12 rotate at the same speed.

When the first sun gear 5a-1 is fixed to the axle 11, the speed increasing ratio is given by:

$$(a+d)/d$$

where a is the number of teeth of the first sun gear 5a-1, and d is the number of teeth of the outer ring gear 5d.

In this state, the second sun gear 5a-2 is idling and is not involved in the transmission of torque.

When the second sun gear 5a-2 is fixed to the axle 11, the speed increasing ratio is given by:

$$[(a \times b)/(c \times d)]+1$$

where a is the number of teeth of the second sun gear 5a-2, b is the number of teeth of each planetary gear 5b meshing with the first sun gear 5a-1, c is the number of teeth of each planetary gear 5b meshing with the second sun gear 5a-2, and d is the number of teeth of the outer ring gear 5d.

In this state, the first sun gear 5a-1 is idling and is not involved in the transmission of torque.

Thus, by disengaging both sun gears 5*a*-1 and 5*a*-2, which have different numbers of teeth, or by fixing either one of these sun gears to the axle 11, it is possible to change the speed increasing ratio.

The one-way clutch 2 for reverse input is a ratchet clutch disposed between the second sun gear 5*a*-2 and the axle 11.

The one-way clutch 2 for reverse input includes clutch pawls 2*a* pivotally supported around clutch pawl shafts 2*j* and biased by elastic members (not shown) in a direction to pivot about the shafts 2*j* from the position shown in FIG. 1(*a*) toward the position shown in FIG. 2(*a*) with one end 2*g* thereof moved radially outwardly.

Normally, as shown in FIG. 1(*a*), a drive member 9*b* of a clutch switching device 9 engages the other ends 2*h* of the clutch pawls 2*a*, thereby keeping the clutch paws 2*a* in the position of FIG. 1(*a*). The drive member 9*b* is biased in one axial direction (rightwardly in FIG. 1(*a*)) by an elastic member 9*c*. A shaft-shaped operating member 9*a* is connected to the drive member 9*b* and extends in the one axial direction. The operating member 9*a* extends through a hollow space of the axle 11 and protrudes from the end of the axle 11. But the operating member 9*a* is not limited to this structure, provided it protrudes from the end of the axle 11. For example, the operating member 9*a* may extend along the outer periphery of the axle 11 and protrude from its end.

As shown in FIG. 2(*b*), when the operating member 9*a* is pushed in the other axial direction (leftwardly in the figure), the drive member 9*b* moves in the same direction. Thus, the clutch pawls 2*a* of the one-way clutch for reverse input pivot counterclockwise about the clutch pawl shafts 2*j* and along a tapered surface 9*e* of the drive member 9*b* under the force of the elastic members (not shown).

When reverse input torque is transmitted from the hub case 12 in this state, the second sun gear 5*a*-2 is fixed to the axle 11. Thus, by controlling the clutch switching device 9, it is possible to selectively engage the one-way clutch 2 for reverse input, thereby rotationally fixing the second sun gear 5*a*-2 to the axle 11, and selectively disengage the one-way clutch 2, thereby allowing free rotation of the second sun gear 5*a*-2 about the axle 11.

When the one-way clutch 2 for reverse rotation is locked while the bicycle is traveling forward without being driven, the reverse input torque from the wheel is transmitted to the rear sprocket 7 through the hub case 12, planetary gears 5*b* and planetary carrier 5*c*.

In this state, since the second sun gear 5*a*-2 is fixed, the reverse input torque is reduced in speed by a fixed ratio of $$[(a \times b)/(c \times d)]+1$$

irrespective of which one of the three speed ratios is selected in the transmission 5.

The operating member 9*a* may be configured to be moved axially when the brakes are applied and released.

In this case, when the brakes are applied, the drive member 9*b* is configured to be moved in the other axial direction (leftwardly in the figures), so that the second sun gear 5*a*-2 is fixed to the axle 11 by the reverse input torque from the wheel through the one-way clutch 2 for reverse input, and the reverse input torque is transmitted to the rear sprocket 7.

When the brakes are released, the drive member 9*b* tends to move back to the original position under the biasing force of the elastic member 9*c*.

But while the reverse input torque is being applied, the driven member 9*b* cannot move in the one axial direction because the tapered surface 9*e* of the drive member 9*b* is in contact with the clutch pawls 2*a* of the one-way clutch 2 for reverse input. Thus, in this state, the one-way clutch 2 for reverse input remains engaged.

When the reverse input torque disappears, the clutch pawls 2*a* are pushed radially outwardly by the tapered surface 9*e* of the drive member 9*b* under the biasing force of the elastic member 9*c* against the force that tends to push the clutch pawls 2*a* radially inwardly. The drive member 9*b* is thus allowed to move in the one axial direction to the original position, so that the clutch 2 disengages.

With this arrangement, driving force from the rear sprocket 7 is transmitted to the wheel with the one-to-one speed ratio or with one of the higher speed ratios. On the other hand, reverse input torque from the wheel is decelerated and transmitted to the motor shaft through the rear sprocket 7 and a power transmission element such as a chain, and thus used for regeneration.

One of the first sun gear 5*a*-1 and the second sun gear 5*a*-1, which mesh with the planetary gears 5*b*, can be selectively fixed by a transmission control mechanism 10. The transmission control mechanism 10 of this embodiment comprises a rotary member 10*a* rotatably mounted around the axle 11 and configured to selectively fix one of the first and second sun gears 5*a*-1 and 5*a*-2 to the axle 11 by rotating around the axle. Alternatively, the transmission control mechanism 10 may include a rod-shaped operating member similar to the operating member of the clutch switching device 9 which extends through the axle 11 and protrudes from the axle so that by axially moving the operating member from outside, one of the sun gears 5*a* can be fixed to the axle through the corresponding one of the first and second one-way clutches 5*e*-1 and 5*e*-2.

In this embodiment, the one-way clutch 2 for reverse input is disposed between the second sun gear 5*a*-2 and the axle 11. But instead, this one-way clutch 2 may be disposed between the first sun gear 5*a*-1 and the axle 11. In this embodiment, the planetary gears 5*b* have teeth in two rows, but may have teeth in a single row or in three or more rows.

While not shown, a center one-way clutch is provided between the crankshaft and the crank sprocket which is configured to engage when driving force is applied from the crankshaft and disengage and idle when reverse input is applied from the crank sprocket. Thus, reverse input is not transmitted to the crankshaft and pedals. The center one-way clutch may be any known one-way clutch including a roller clutch, a sprag clutch or a ratchet clutch.

While the bicycle is being moved backward with the driver dismounted from the bicycle, the rear sprocket 7 and the hub case 12 rotate, relative to the ground, in the direction opposite to the direction in which they rotate while the bicycle is being driven forward, but their rotational directions relative to each other are the same as while the bicycle is being driven forward.

Second Embodiment

FIGS. 3 and 4 show the second embodiment of this invention. While the one-way clutch 2 for reverse input of this embodiment comprises a ratchet clutch as in the first embodiment, the clutch switching device 9 comprises a rotary member 9*d* extending along the axle 11. Otherwise, this embodiment is basically identical in structure to the first embodiment.

The rotary member 9*d* of this embodiment is a tubular member extending along the outer periphery of the axle 11 so as to be rotatable about the axle 11 relative to the axle 11. The rotary member 9*d* has circumferentially spaced apart slits 9*f*.

Figures 3A, 3B:
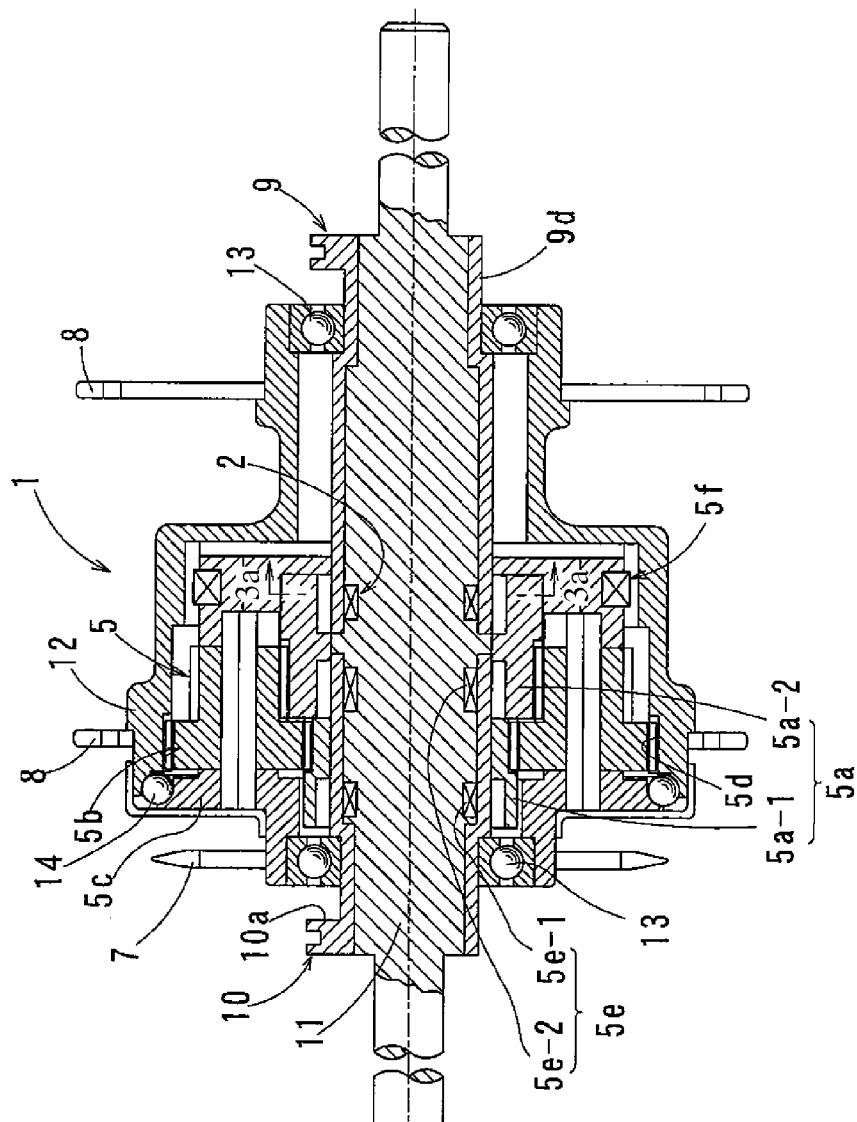

In the normal state, as shown in FIG. 3(a), the clutch pawls 2a of the one-way clutch 2 for reverse input are pivoted radially inwardly by the rotary member 9d.

When the rotary member 9d is rotated relative to the axle 11 until the slits 9f are radially aligned with the respective clutch pawls 2a, the clutch pawls 2a disengage.

Figures 4A, 4B:
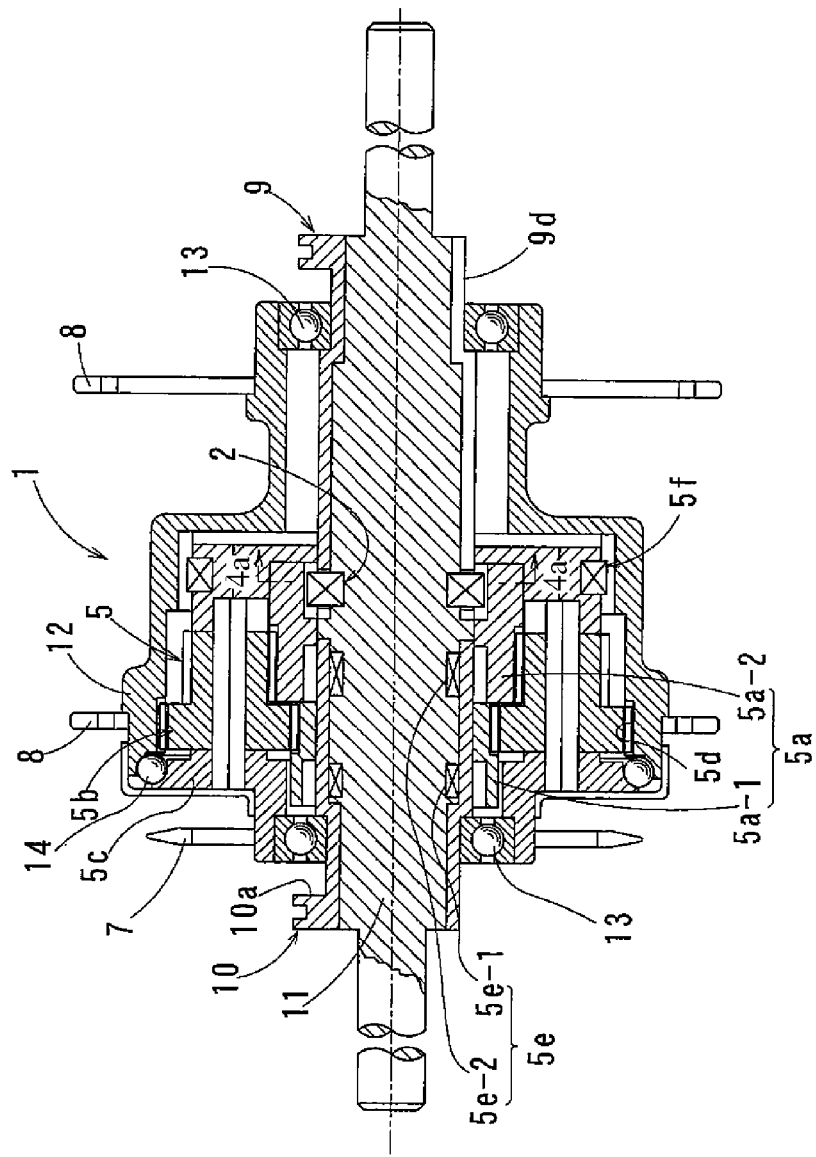

When the clutch pawls 2a disengage, as shown in FIG. 4(a), they are allowed to pivot radially outwardly under the biasing force of elastic members (not shown).

In this state, when reverse input torque is transmitted from the hub case 12, the reverse input torque serves to fix the second sun gear 5a-2 to the axle. Thus, when the one-way clutch 2 for reverse input is locked with the bicycle traveling forward without being driven, reverse input torque from the wheel is transmitted to the rear sprocket 7 through the hub case 12, planetary gears 5b and planetary carrier 5c.

As with the first embodiment, the rotary member 9d may be configured to be rotated when the brakes are applied.

In this case, when the brakes are applied and the rotary member 9d rotates, the one-way clutch 2 for reverse input is locked. When the brakes are released, the rotary member 9d tends to return to the original position under the biasing force of an elastic member (not shown) biasing the rotary member 9d so as to rotate the rotary member 9d in the opposite direction.

But while the reverse input torque is being applied, the rotary member 9d cannot rotate because the clutch pawls 2a of the one-way clutch 2 for reverse input mesh with the recesses and protrusions on the inner periphery of the second sun gear 5a-2 and the rotary member 9d is kept in contact with the clutch pawls 2a. Thus, the clutch 2 never disengages. When the reverse input torque disappears, the rotary member 9d is allowed to rotate back to its original position and the clutch 2 disengages.

With this arrangement, driving force from the rear sprocket 7 is transmitted to the wheel with the one-to-one speed ratio or with one of the higher speed ratios. On the other hand, reverse input torque from the wheel is decelerated and transmitted to the motor shaft through the rear sprocket 7 and a power transmission element such as a chain, and thus used for regeneration.

In this embodiment, the one-way clutch 2 for reverse input is disposed between the second sun gear 5a-2 and the axle 11. But instead, as in the first embodiment, the one-way clutch 2 may be disposed between the first sun gear 5a-1 and the axle 11. In this embodiment, the planetary gears 5b have teeth in two rows, but may have teeth in a single row or in three or more rows.

Third Embodiment

Figures 5A, 5B:
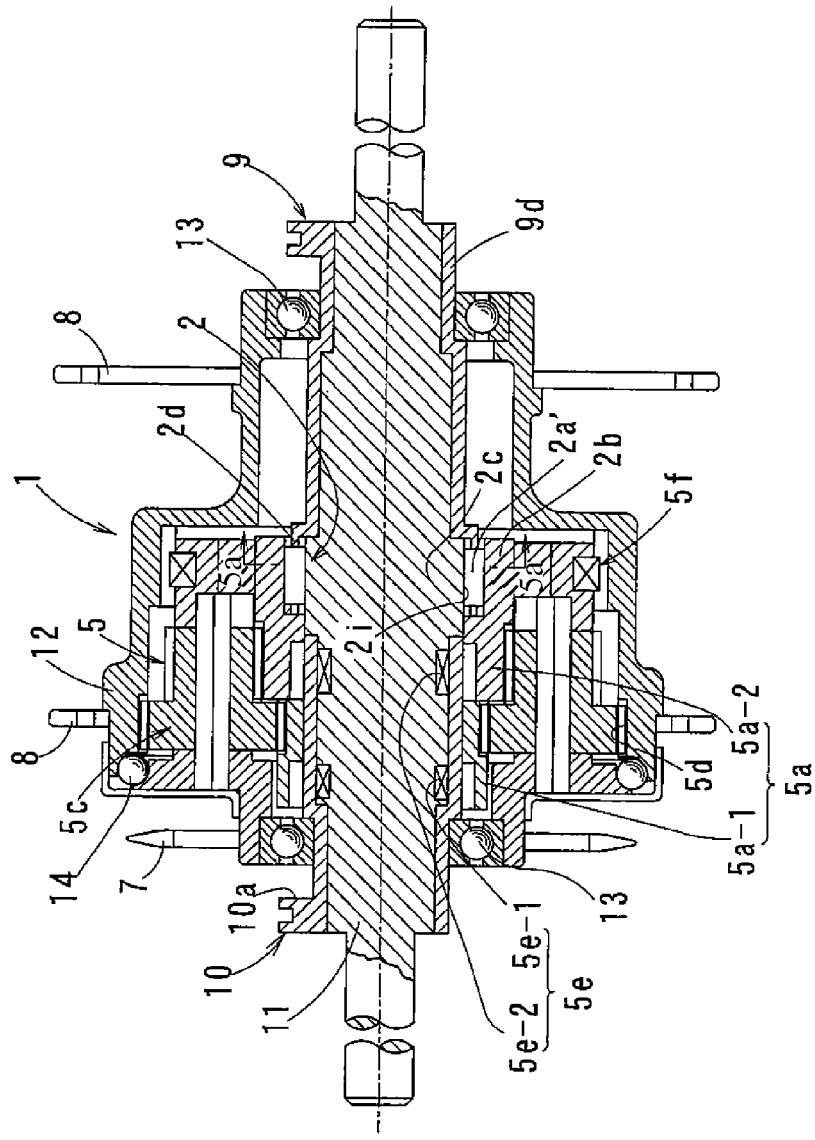
Figure 6B:
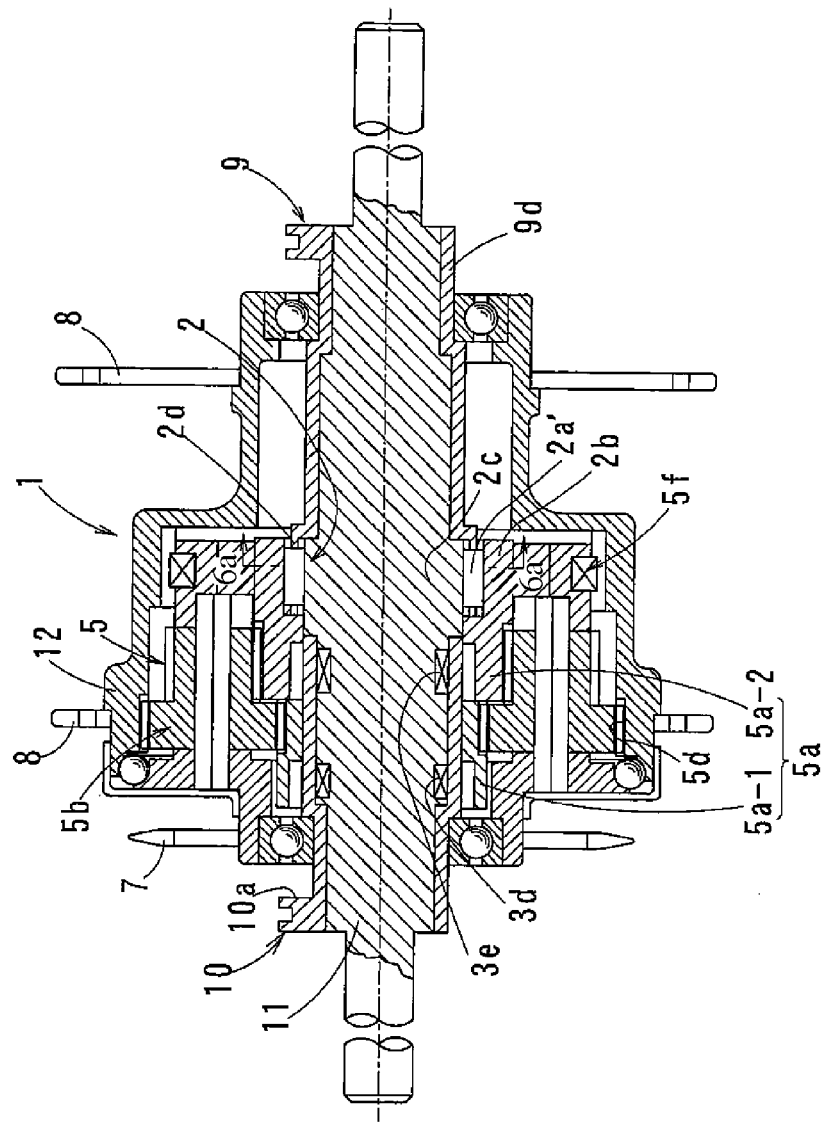

FIGS. 5 and 6 show the third embodiment of the present invention. The one-way clutch 2 for reverse input of this embodiment comprises a roller clutch. Otherwise, this embodiment is basically of the same structure as the second embodiment.

As shown in FIG. 5, the one-way clutch 2 for reverse input of this embodiment comprises an outer ring 2d, an inner ring 2c, which is the axle 11, and rollers 2a' configured to engage cam surfaces 2i formed on the axle 11 as the inner ring 2c.

The one-way clutch 2 further includes a retainer 2d for the rollers 2c which is directly coupled to the rotary member 9d of the clutch switching device 9.

The retainer 2d is coupled to the rotary member 9d such that in the normal state, each roller 2a' is located in the widest area of a wedge-shaped space defined between the inner peripheral surface of the outer ring 2b and one of the cam surfaces 2i of the inner ring 2c (circumferential central portion of each of the cam surfaces 2i shown in FIG. 5(a)).

In this state, the one-way clutch 2 for reverse input idles both when driving force is applied from the rear sprocket 7 and when reverse input is applied from the hub case 12.

Figure 6A:
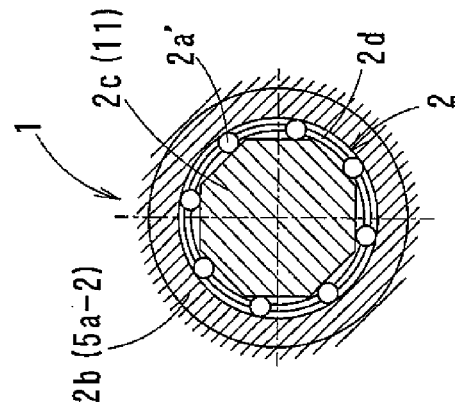

With the bicycle traveling forward without being driven, when the retainer 2d is rotated relative to the axle 11 by the rotary member 9d and the rollers 2a' move from the position shown in FIG. 5(a) to the position shown in FIG. 6(a), the rollers 2a' wedge into the narrow portions of the respective wedge-shaped spaces. Thus when reverse input is applied in this state, the second sun gear 5a-2 is locked, and the reverse input torque is transmitted from the hub case 12 to the rear sprocket 7.

As with the first and second embodiments, the rotary member 9d may be configured to be rotated when the brakes are applied.

In this case, when the brakes are applied and the rotary member 9d rotates, the rollers 2a' move to the narrow portions of the respective wedge-shaped spaces, thus locking the one-way clutch 2 for reverse input. When the brakes are released, the rotary member 9d tends to return to the original position under the biasing force of an elastic member (not shown) biasing the rotary member 9d so as to rotate the rotary member 9d in the opposite direction.

But while the reverse input torque is being applied, the one-way clutch 2 for reverse input never disengages because its rollers 2a' are wedged into the wedge-shaped spaces. When the reverse input torque disappears, the rotary member 9d is allowed to rotate back to its original position under the biasing force of the elastic member and the clutch 2 disengages.

With this arrangement, driving force from the rear sprocket 7 is transmitted to the wheel with the one-to-one speed ratio or with one of the higher speed ratios. On the other hand, reverse input torque from the wheel is decelerated and transmitted to the motor shaft through the rear sprocket 7 and a power transmission element such as a chain, and thus used for regeneration.

In this embodiment, the one-way clutch 2 for reverse input is disposed between the second sun gear 5a-2 and the axle 11. But instead, the one-way clutch 2 may be disposed between the first sun gear 5a-1 and the axle 11. In this embodiment, the planetary gears 5b have teeth in two rows, but may have teeth in a single row or in three or more rows. Also, the one-way clutch 2 for reverse input may be a sprag clutch instead of the roller clutch.

Fourth Embodiment

FIG. 7 shows the fourth embodiment of the present invention. The planetary gears 5b of the transmission 5 of this embodiment have teeth arranged in three rows, thus providing three increased speed ratios. This embodiment has no speed changing one-way clutch 5f disposed between the planetary carrier 5vc and the hub case 12 in the previous embodiments.

The transmission 5 of this embodiment includes three sun gears 5a (first sun gear 5a-1, second sun gear 5a-2 and third sun gear 5a-3) which can be selectively connected to the axle 11 through first to third one-way clutches 5e-1, 5e-2 and 5e-3, respectively.

In this embodiment, the first to third one-way clutches 5e-1, 5e-2 and 5e-3 are ratchet clutches. But they may be roller clutches or sprag clutches.

The three rows of teeth of the planetary gears 5b of the transmission 5 mesh with the first to third sun gears 5a-1, 5a-2 and 5a-3, respectively. The planetary carrier 5c of the transmission 5 retains the planetary gears 5b. The transmission 5 further includes an outer ring gear 5d meshing with the planetary gears 5b. The planetary carrier 5c is rotationally fixed to the rear sprocket 7. Like the previous embodiments, the outer ring gear 5d is integral with the hub case 12.

With this arrangement, driving force from the rear sprocket 7 is increased with one of three increased speed ratios by selectively locking one of the first to third one-way clutches 5e-1, 5e-2 and 5e-3, thereby fixing the corresponding one of the first to third sun gears 5a-1, 5a-2 and 5a-3 to the axle. This transmission 5 has no one-to-one speed ratio in which the first to third one-way clutches 5e-1, 5e-2 and 5e-3 are all disengaged. The speed increasing mechanism of the transmission 5 of this embodiment is the same as the first to third embodiments.

In this embodiment, the one-way clutch 2 for reverse input is disposed between the third sun gear 5a-3 and the axle 11. But instead, the one-way clutch 2 may be disposed between the first sun gear 5a-1 and the axle 11 or between the second sun gear 5a-2 and the axle 11.

In this embodiment, the one-way clutch 2 for reverse input is controlled by the mechanism including the operating member 9a and the drive member 9b as used in the first embodiment. But instead, the one-way clutch 2 may be controlled by the mechanism including the rotary member 9d as used in the second and third embodiments.

In this embodiment, the planetary gears 5b have teeth in three rows but may have teeth in two rows or four or more rows.

Fifth Embodiment

FIG. 8 shows the fifth embodiment of the present invention. The transmission 5 of this embodiment includes planetary gears 5b having teeth in three rows and provides three speed reduction ratios.

The transmission 5 further includes first to third sun gears 5a-1, 5a-2 and 5a-3 which mesh with the respective three rows of teeth of the planetary gears 5b, a planetary carrier 5c retaining the planetary gears 5b, and an outer ring gear 5d meshing with the planetary gears 5b. The outer ring gear 5d is rotationally fixed to the rear sprocket 7.

The rotational direction in which the one-way clutch 2 for reverse input of this embodiment is locked is opposite to the rotational direction in which the one-way clutch 2 of any of the first to fourth embodiments is locked (see FIG. 8(a)).

As with the fourth embodiment, the transmission has no one-to-one speed ratio in which the first to third one-way clutches 5e-1, 5e-2 and 5e-3 are all disengaged.

By operating the transmission control mechanism 10, one of the first to third sun gears 5a-1, 5a-2 and 5a-3 can be selectively fixed to the axle 11 through the corresponding one of the first to third one-way clutches 5e-1, 5e-2 and 5e-3.

By selectively fixing one of the sun gears 5a-1, 5a-2 and 5a-3 to the axle 11 through the corresponding one of the first to third one-way clutches 5e-1, 5e-2 and 5e-3. it is possible to select one of the three speed reduction ratios. The sun gears 5a that are not fixed to the axle idle as with the previous embodiments.

In this embodiment, the planetary carrier 5c is rotationally fixed to the hub case 12 through e.g. splines. But instead, they may be formed as an integral body.

In this embodiment, the one-way clutch 2 for reverse input is disposed between the third sun gear 5a-3 and the axle 11. But instead, the one-way clutch 2 may be disposed between the first sun gear 5a-1 or the second sun gear 5a-2 and the axle 11.

In this embodiment, the one-way clutch 2 for reverse input is controlled by the mechanism including the operating member 9a and the drive member 9b as used in the first embodiment. But instead, the one-way clutch 2 may be controlled by the mechanism including the rotary member 9d as used in the second and third embodiments. In this embodiment, the planetary gears have teeth in three rows but may have teeth in two rows or four or more rows.

Sixth Embodiment

FIGS. 9(a)-10(b) show the sixth embodiment of the present invention. The power-assisted bicycle of this embodiment is of the center-motor type in which a secondary battery and a drive-assisting motor (center motor unit) are mounted on a frame connecting the front and rear wheels together at around the center between the front and rear wheels.

Manual force applied through the pedals and the crankshaft, or this manual force and the output of the motor are transmitted to the rear wheel through the chain connecting the crank sprocket (not shown) of the center motor unit and the (rear) sprocket 7 of the rear wheel as the drive wheel. The center motor unit carries therein a regenerative mechanism for returning regenerated power generated by reverse input applied to the output shaft of the motor from a rear hub 1 of the rear wheel to the secondary battery of the center motor unit.

As shown in FIGS. 9(a) and 9(b), the rear hub 1 includes a hub case 12 arranged coaxially with the axle 11 of the rear wheel, and a transmission 5 and a one-way clutch 2 for transmitting reverse input that are mounted in the hub case 12.

As shown in FIG. 9(a), the one-way clutch 2 for reverse input comprises an inner ring 2c and an outer ring 2b that are coaxial with each other and rotatable about the axis relative to each other, rollers 2a' each disposed in one of circumferentially extending wedge-shaped spaces defined between the outer peripheral surface of the inner ring 2c and grooves 2f formed in the outer ring 2b. The rollers 2a' are circumferentially held in position by an annular retainer 2d and biased by an elastic member 2e through the retainer 2d toward the wide portion of the corresponding wedge-shaped space. A bearing 15 is disposed between the retainer 2d and the inner ring 2c, supporting the retainer and the inner ring so as to be rotatable relative to each other.

The inner ring 2c is rotationally fixed to the rear sprocket 7. The outer ring 2b is rotationally fixed to the hub case 12.

Bearings 13 are disposed between the inner ring 2c and the axle 11 and between the hub case 12 and the axle 11, respectively, thereby rotatably supporting the inner ring and the hub case relative to the axle. A bearing 14 is disposed between the inner ring 2c and the hub case 12, thereby supporting the inner ring and the hub case so as to be rotatable relative to each other.

When the rear sprocket 7 and thus the inner ring 2c of the one-way clutch 2 for reverse input rotate in the reverse direction relative to the outer ring 2b, the rollers 2a' move in the respective grooves 2f toward the narrow ends of the wedge-shaped spaces, thereby coupling the inner ring 2c and the outer ring 2b together. The one-way clutch 2 thus engages. When the rear sprocket 7 and the inner ring 2c rotate in the forward direction relative to the outer ring 2b, the one-way clutch 2 is configured to remain disengaged.

Thus, the one-way clutch 2 does not transmit torque in the forward direction applied to the rear sprocket 7 and transmits torque in the reverse direction (including reverse input torque while the bicycle is not being driven).

But in a normal state (in which no external force is being applied to the retainer 2d), torque in either direction cannot lock the two-way clutch 2 because the elastic member 2e keeps biasing the rollers 2a' toward the wide ends of the respective wedge-shaped spaces through the retainer 2d. However, when the retainer 2d rotates in the reverse direction relative to the outer ring 2b against the force of the elastic member 2e under an external force applied to the retainer 2d, the rollers 2a' move toward the narrow ends of the wedge-shaped spaces. When reverse input is applied from the wheel in this stand-by state, the rollers 2a' are wedged between the inner ring 2c and the grooves 2f of the outer ring 2b, thereby coupling the inner and outer rings 2c and 2b of the one-way clutch 2 together.

Thus, while the bicycle is being driven in the forward direction, the one-way clutch 2 for reverse input idles, and can transmit reverse input torque from the wheel to the rear sprocket 7 while the bicycle is traveling forward without being driven.

The transmission 5 comprises a sun gear 5a rotationally fixed to the axle 11, planetary gears 5b meshing with the sun gear 5a, a planetary carrier 5c supporting the planetary gears 5b, and an outer ring gear 5d meshing with the planetary gears 5b.

The transmission 5 further includes a speed changing one-way clutch 5f (hereinafter referred to as "first speed changing one-way clutch 5f-1") disposed between the outer ring gear 5d and the hub case 12, and another speed changing one-way clutch 5f (hereinafter "second speed changing one-way clutch 5f-2") disposed between the inner ring 2c and the outer ring gear 5d. In this embodiment, the first and second speed changing one-way clutches 5f-1 and 5f-2 are ratchet clutches, but they may be any other type of one-way clutches such as roller clutches or sprag clutches.

By including the first and second speed changing one-way clutches 5f-1 and 5f-2, the transmission 5 transmits torque in the forward direction applied to the sprocket 7 to the wheel through the second speed changing one-way clutch 5f-2 but does not transmit torque in the reverse direction to the wheel.

The operation of the transmission 5 is now described. By axially moving (sliding) a slide member 18 provided on the axle 11, the transmission 5 can be switched over between a reduced speed ratio and a one-to-one speed ratio. The slide member 18 can be moved in the axial direction of the axle by means of an operating member (not shown) inserted in a bore 11a formed in the axle 12 through an opening of the bore 11a.

When the slide member 18 is pushed in from the position shown in FIG. 9(b) to the position shown in FIG. 10(b) by the operating member, clutch pawls (ratchet pawls) 5g of the second speed changing one-way clutch 5f-2, which are supported by the inner ring 2c, pivot from the position shown in FIG. 9(a) to the position shown in FIG. 10(a), and engage in grooves formed in the inner periphery of the hub case 12, thus rotationally fixing the rear sprocket 7 and the inner ring 2c to the hub case 12 so that torque can be transmitted therebetween (one-to-one speed ratio).

In this state, torque is also being transmitted to the planetary gears 5b and the planetary carrier 5c through the outer ring gear 5d because the outer ring gear 5d is rotationally fixed to the rear sprocket 7 and the inner ring 2c. But in this state, since the hub case 12 is rotating faster than the planetary carrier 5c, the first speed changing one-way clutch 5f-1 idles, torque is not transmitted from the planetary carrier 5c to the hub case 12.

When the operating member is released in this state, the slide member 18 is pushed back from the position shown in FIG. 10(b) to the position shown in FIG. 9(b) under the force of a compression spring 11a.

When the slide member 18 is pushed back, the clutch pawls 5g of the second speed changing one-way clutch 5f-2 are pressed by a tapered portion 18a of the slide member 18 and pivot from the position shown in FIG. 10(a) to the position shown in FIG. 9(a). The clutch pawls 5g thus disengage from the grooves formed in the inner periphery of the case 12, allowing the second speed changing one-way clutch 5f-2 to idle.

In this state, torque applied to the rear sprocket 7 is transmitted to the planetary gears 5b and the planetary carrier 5c through the inner ring 2c and the outer ring gear 5d, thus locking the first speed changing one-way clutch 5f-1. The torque transmitted to the carrier 5c is therefore transmitted to the hub case 12 through the one-way clutch 5f-1. At this time, the planetary carrier 5c is rotated at a slower speed than the outer ring gear 5d (reduced speed ratio).

Thus, the transmission 5 of this embodiment provides two speed ratios, i.e. a reduced speed ratio in which the sun gear 5a is fixed, and the outer ring gear 5d and the planetary carrier 5c are used as input and output members, respectively; and a one-to-one speed ratio in which the outer ring gear 5d is used as both input and output members.

More specifically, while the bicycle is being driven forward with the reduced speed ratio (see FIGS. 9(a) and 9(b)), driving torque in the forward direction applied to the rear sprocket 7 rotates the inner ring 2c, which is integral with the rear sprocket 7, and the outer ring gear 5d. Since the sun gear 5a is fixed to the axle 11, when the outer ring gear 5d rotates in the forward direction, the planetary gears 5b revolve around the axle 11 while rotating about their own axes. The planetary carrier 5c, which guides the planetary gears 5b, thus rotates at the same speed as the revolving speed of the planetary gears 5b.

The speed reduction rate of the transmission at this time is given by:

$$(a+d)/d$$

where a is the number of teeth of the sun gear 5a; and d is the number of teeth of the outer ring gear 5d.

The thus reduced rotation of the planetary carrier 5c is transmitted to the hub case 12 through the first speed changing one-way clutch 5f-1, which is disposed between the planetary carrier 5c and the hub case 12.

On the other hand, in the normal state, the one-way clutch 2 for reverse input, which is disposed between the inner ring 2c and the hub case 12, is idling because the elastic member 2e biases the retainer 2d so as to push the rollers 2a' into the deep portions of the grooves 2f (wide portions of the wedge-shaped spaces).

The one-way clutch 2 for reverse input is switched over between positions in which the sun gear 5a is rotationally fixed to the axle 11 and rotatable relative to the axle 11, when reverse input is applied from the drive wheel, by a clutch switching means 9, which comprises a friction member 19 configured to be selectively brought into and out of contact with the retainer 2d.

When the brakes are applied by the driver, the retainer 2d rotates in the reverse direction relative to the outer ring 2b against the biasing force of the elastic member 2e under the force applied to the retainer 2d from the friction member 19.

This moves the rollers 2a' to the stand-by state at the shallow portions of the respective grooves 2f of the outer ring 2b. But as long as the inner ring 2c is rotating faster than the outer ring 2b (the above-described reduced speed ratio), the rollers 2a' do not wedge into the narrow portions of the respective wedge-shaped spaces defined between the inner ring 2c and the respective grooves 2f of the outer ring 2b. Thus, the one-way clutch 2 for reverse input does not engage in this state.

While the bicycle is being driven in the forward direction with the one-to-one speed ratio (see FIGS. 10(a) and 10(b)), driving torque in the forward direction applied from the rear sprocket 7 is directly transmitted to the hub case 12 through the second speed changing one-way clutch 5f-2, which is retained by the inner ring 2c, which is fixed to the rear sprocket 7.

In this state, since the elastic member 2e is biasing the rollers 2a' toward the deep portions of the respective grooves 2f through the retainer 2d, the one-way clutch 2 for reverse input, which is disposed between the inner ring 2c and the hub case 12, does not engage.

If the brakes are applied by the driver in this state, the retainer 2d rotates in the reverse direction relative to the outer ring 2b against the biasing force of the elastic member 2e under the force applied to the retainer 2d from the friction member 19.

This moves the rollers 2a' to the stand-by state at the shallow portions of the respective grooves 2f of the outer ring. But since the inner ring 2c is rotating at the same speed as the outer ring 2b (one-to-one speed ratio) in this state, the rollers 2a' do not wedge into the narrow portions of the respective wedge-shaped spaces defined between the inner ring 2c and the respective grooves 2f of the outer ring 2b. Thus, the one-way clutch 2 for reverse input does not engage in this state.

While the bicycle is traveling in the forward direction without being driven (e.g. while the bicycle is going down a slope with no force applied to the pedals), reverse input torque is applied to the rear hub 1 from the wheel. Since the first and second speed changing one-way clutches 5f-1 and 5f-2 idle in this state, the reverse input torque is transmitted through neither of the first and second speed changing one-way clutches 5f-1 and 5f-2.

In this state, since the elastic member 2e is biasing the rollers 2a' toward the deep portions of the grooves 2f (wide portions of the wedge-shaped spaces) through the retainer 2d, the one-way clutch 2 for reverse rotation is idling in the normal state (while no external force is applied to the retainer 2d).

But when the brakes are applied by the driver in this state and an external force is applied to the retainer 2d from the friction member 19, the retainer 2d rotates in the reverse direction relative to the outer ring 2b against the biasing force of the elastic member 2e.

This moves the rollers 2a' to the stand-by state at the shallow portions of the respective grooves 2f of the outer ring. Since the outer ring 2b is rotating faster than the inner ring 2c in this state, the rollers 2a' are wedged into the wedge-shaped spaces defined between the inner ring 2c and the grooves 2f of the outer ring 2b, thus locking up the one-way clutch 2 for reverse input. The hub case 12 is thus directly coupled to the rear sprocket 7.

As a result, the reverse input torque from the rear drive wheel is transmitted to the motor shaft through the rear sprocket 7 and power transmission member such as chain and used for regeneration.

While not shown, a center one-way clutch is provided between the crankshaft and the crank sprocket which is configured to engage when driving force is applied from the crankshaft and disengage and idle when reverse input is applied from the crank sprocket. Thus, reverse input is not transmitted to the crankshaft and pedals. The center one-way clutch may be any known one-way clutch including a roller clutch, a sprag clutch or a ratchet clutch.

In this embodiment, the external force applied to the retainer 2d is the force applied from the friction member 19 when the driver applies brakes. But a different external force may be applied the retainer 2d.

While the bicycle is being moved backward with the driver dismounted from the bicycle, the rear sprocket 7 and the hub case 12 rotate, relative to the ground, in the direction opposite to the direction in which they rotate while the bicycle is being driven forward, but their rotational directions relative to each other are the same as while the bicycle is being driven forward.

Thus, according to the axial position of the slide member 18, the first speed changing one-way clutch 5f-1 locks up during the reduced speed ratio, and the second speed changing one-way clutch 5f-2 locks up during the one-to-one speed ratio. The one-way clutch for reverse input is always idling.

The speed reduction mechanism 5 thus transmits the manual force applied to the pedal or the output of the motor to the hub case 12, i.e. the rear drive wheel through the rear sprocket 7. The one-way clutch 2 for reverse input idles while the rear wheel is being driven by the manual force or the output of the motor, and transmits the reverse input from the rear wheel to the rear sprocket 7 while the rear wheel is not being driven.

Seventh Embodiment

FIGS. 11 and 12 show the seventh embodiment of this invention, which differs from the sixth embodiment in that the speed reduction mechanism 5 comprises a planetary gear mechanism having three high speed ratios.

The one-way clutch 2 for reverse of this embodiment comprises a roller clutch disposed between the inner ring 2c, which meshes with the outer ring gear 5d, and the hub case 12.

The speed reduction mechanism 5 includes three sun gears 5a-1, 5a-2 and 5a-3 which are rotatably and coaxially mounted around the axle 11. The speed reduction mechanism 5 further includes planetary gears 5b each comprising three stepped portions meshing with the respective sun gears 5a-1, 5a-2 and 5a-3, a planetary carrier 5c supporting the planetary gears 5b, and the outer ring gear 5d, which meshes with the planetary gears 5b.

A speed changing one-way clutch 5f is mounted between the outer ring gear 5d and the hub case 12. The inner ring 2c and the outer ring gear 5d are rotationally fixed to each other by means of e.g. splinesis.

A speed ratio control device 30 selectively rotationally fixes one of the sun gears 5a-1, 5a-2 and 5a-3 to the axle 11. By selectively rotationally fixing one of the sun gears 5a-1, 5a-2 and 5a-3 to the axle 11, it is possible to change the speed ratio of the transmission 5.

For example, when the third sun gear 5a-3 is rotationally fixed to the axle 11, the rotation of the planetary carrier 5c is transmitted to the outer ring gear 5d with the speed increase ratio of:

$$(a+d)/d$$

where a is the number of teeth of the third sun gear 5a-3 and d is the number of teeth of the outer ring gear 5d.

While the sun gear 5a-3 is fixed to the axle 11, the first and second sun gears 5a-1 and 5a-2 are idling and do not involve in the transmission of torque.

The sun gears 5a-1, 5a-2 and 5a-3 have different numbers of teeth from each other, so that by changing the sun gear that is fixed to the axle, it is possible to change the speed increase ratio.

The one-way clutch 2 for reverse input, which is mounted between the inner ring 2c and the hub case 12, is idling in a normal state, because, as in the sixth embodiment (see FIGS. 9(a) and 10(a)), the elastic member 2e is biasing the rollers 2a toward the deep portions of the grooves 2f (wide portions of the wedge-shaped spaces) through the retainer 2d.

While the bicycle is being driven forward with a driving force applied to the rear sprocket 7 (see FIGS. 11(a) and 11(b)), torque is transmitted to the hub case 12 through the planetary carrier 5c, planetary gears 5e, outer ring gear 5d and speed changing one-way clutch 5f.

In this state, the one-way clutch 2 for reverse input is idling. In other words, in the normal state (i.e. the state in which no external force is applied to the retainer 2d), since the elastic member 2e is biasing the rollers 2a' toward the deep portions of the grooves 2f (wide portions of the wedge-shaped spaces) through the retainer 2d, the one-way clutch 2 for reverse input never locks when input in either rotational direction is applied to the sprocket 7.

Figures 12A, 12B:
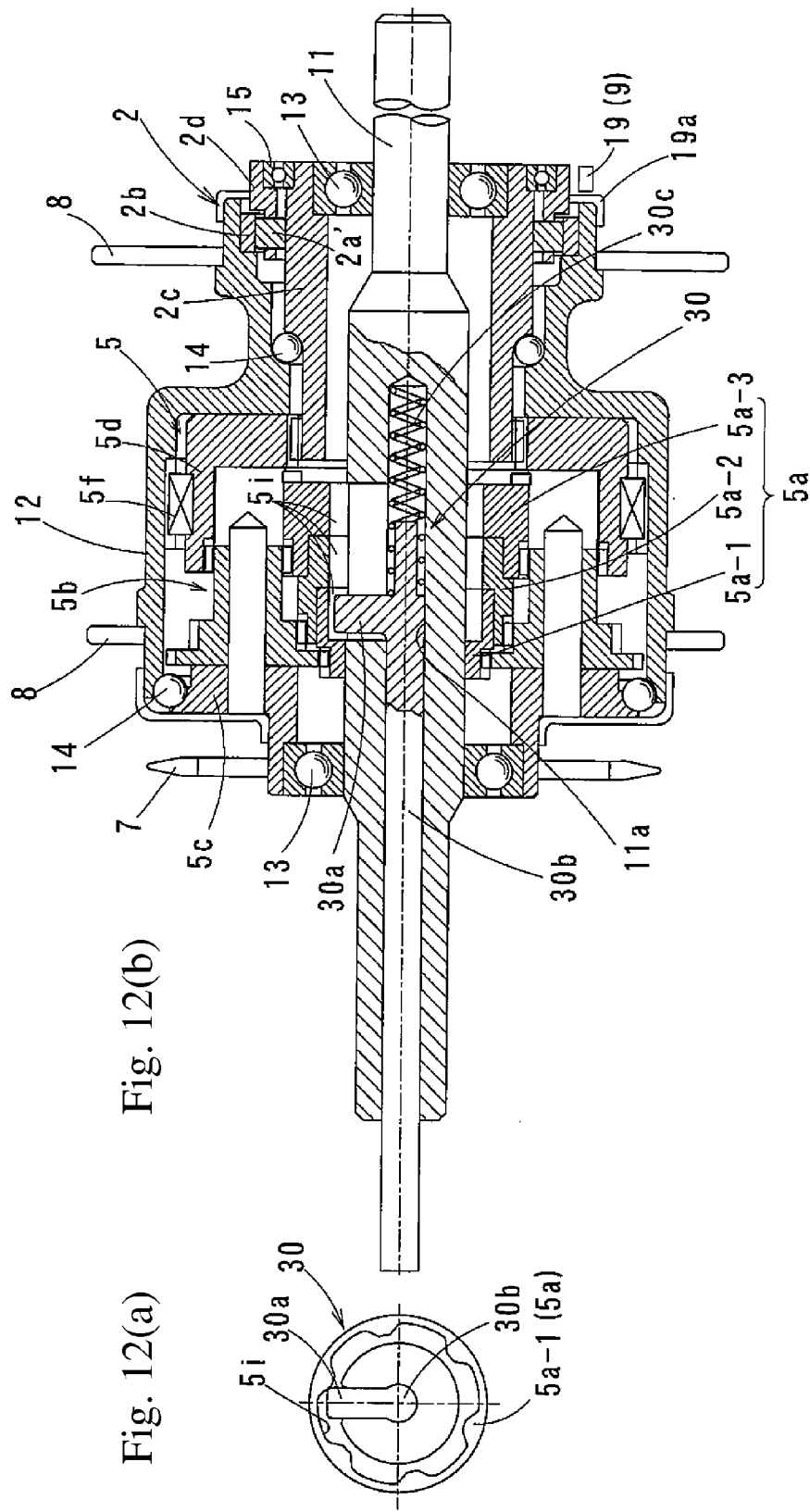

While the bicycle is traveling in the forward direction without being driven (e.g. while the bicycle is going down a slope with no force applied to the pedals; state of FIGS. 12(a) and 12(b)), reverse input torque is applied to the rear hub 1 from the wheel. Since the speed changing one-way clutch 5f idles in this state, the reverse input torque cannot be transmitted through the speed changing one-way clutch 5f.

In this normal state (i.e. the state in which no external force is applied to the retainer 2d), since the elastic member 2e is biasing the rollers 2a' toward the deep portions of the grooves 2f (wide portions of the wedge-shaped spaces) through the retainer 2d, the one-way clutch 2 for reverse input is idling.

When the brakes are applied by the driver in this state, the retainer 2d rotates in the reverse direction relative to the outer ring 2b against the biasing force of the elastic member 2e under the force applied to the retainer 2d from the friction member 19 of the clutch switching device 9.

This moves the rollers 2a' to the stand-by state at the shallow portions of the respective grooves 2f of the outer ring 2b. Since the outer ring 2b is rotating faster than the inner ring 2c (because the bicycle is not being driven), the rollers 2a' wedge into the respective wedge-shaped spaces defined between the inner ring 2c and the respective grooves 2f of the outer ring 2b. Thus, the one-way clutch 2 for reverse input engages, directly coupling the hub case 12 and the rear sprocket 7 together.

As a result, the reverse input torque from the rear drive wheel is transmitted to the motor shaft through the rear sprocket 7 and power transmission member such as chain and used for regeneration.

As shown in FIGS. 11(a) and 11(b), the speed ratio control device 30 of this embodiment comprises a shaft member 30b axially movably inserted in an axial hole 11a formed in the axle 11 and having a radially outwardly extending snap key 30, and an elastic member 30c received in the deep portion of the axial hole 11a. The elastic member 30c of this embodiment is a coil spring.

In the radially inner surface of each of the sun gears 5a-1, 5a-2 and 5a-3, a plurality of circumferentially spaced apart grooves 5i are formed as shown in FIGS. 11(a) and 12(a). The snap key 30a is selectively engageable with one of the grooves 5i of any of the sun gears 5a-1, 5a-2 and 5a-e, thereby selectively rotationally fixing any of the sun gears to the axle 11.

As mentioned above, FIG. 11(a) shows the state in which driving force is being transmitted from the rear sprocket 7, while FIG. 12(a) shows the state in which reverse input is being transmitted from the wheel.

The snap key 30 is locked in one of the grooves 5i of the selected one of the sun gears 5a-1, 5a-2 and 5a-3 when either of the driving force and the reverse input is applied thereto.

When the one-way clutch 2 for reverse input is locked while the bicycle is traveling in the forward direction without being driven, the reverse input from the wheel is transmitted to the rear sprocket 7 through the hub case 12, one-way clutch 2 for reverse input, inner ring 2c, outer ring gear 5d, planetary gears 5b and planetary carrier 5c. The reverse input is then transmitted to the motor shaft through a power transmission member such as a chain and used for regeneration.

Any of the sun gears 5a-1, 5a-2 and 5a-3, which mesh with the planetary gears 5b, can be selectively locked to the axle by axially moving the shaft member 30b relative to the axle 11 until the snap key 30a engages the selected one of the sun gears 5a-1, 5a-2 and 5a-3.

Eighth Embodiment

Figure 13:
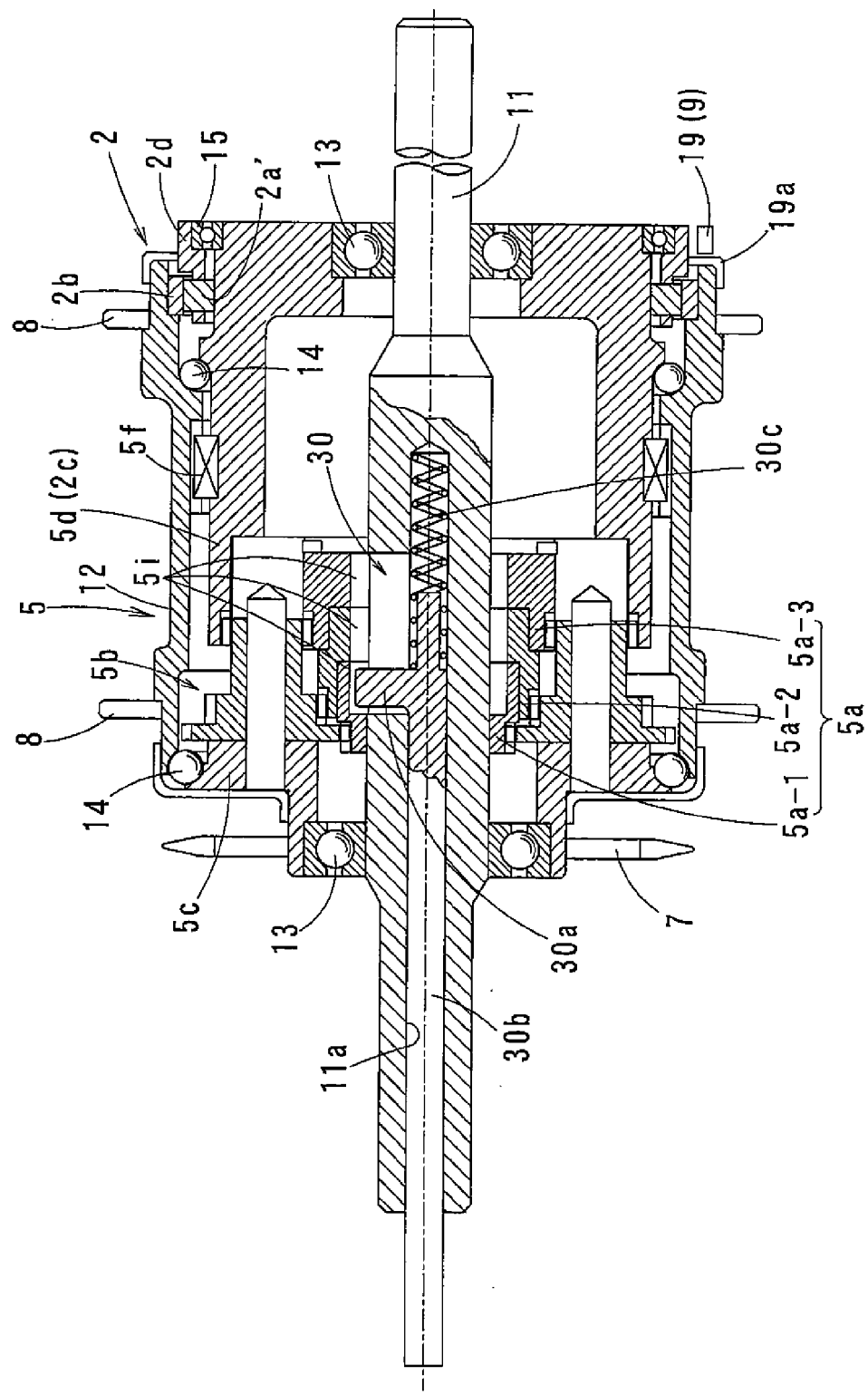
FIG. 13 is a side view of an eighth embodiment.

FIG. 13 shows the eighth embodiment, which differs from the seventh embodiment in that the outer ring gear 5d and the inner ring 2c of the one-way clutch 2 for reverse input are formed of a single integral body. Otherwise, this embodiment is basically identical in operation to the seventh embodiment.

Ninth Embodiment

Figure 14:
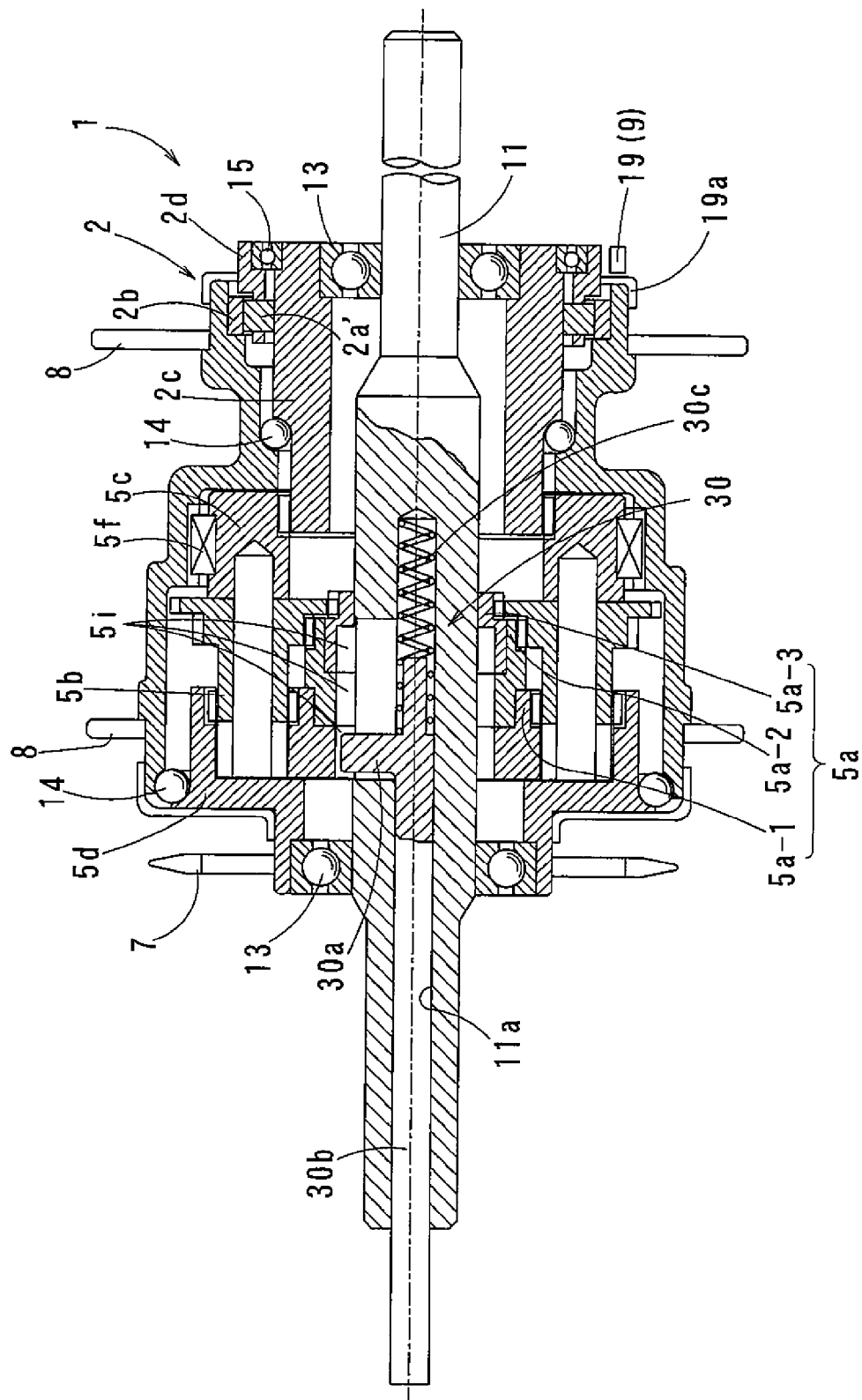
FIG. 14 is a side view of a ninth embodiment.

FIG. 14 shows the ninth embodiment, in which the transmission 5 comprises a planetary gear mechanism having three speed reduction ratios, while the one-way clutch 2 for reverse input comprises a roller clutch disposed between the hub case 12 and the inner ring 2c.

The inner ring 2c is rotationally fixed to the planetary carrier 5c through splines. In this case, driving force applied to the pedals is transmitted to the hub case 12 through the rear sprocket 7 of the rear hub 1, outer ring gear 5d, planetary gears 5e, planetary carrier 5c and speed changing one-way clutch 5f. Otherwise, this embodiment is basically identical in operation to the seventh embodiment.

10th Embodiment

Figure 15:
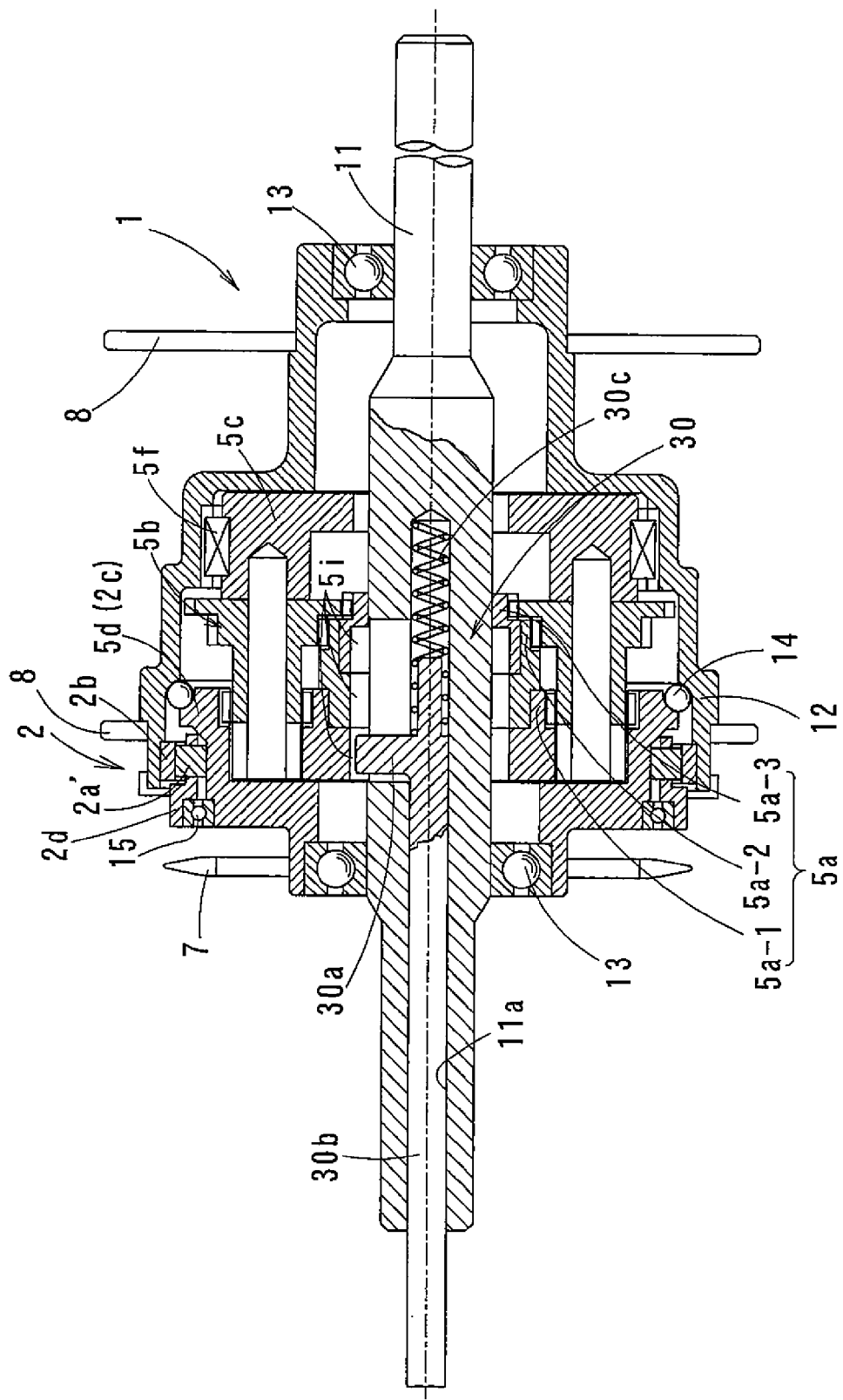
FIG. 15 is a side view of a 10th embodiment.

FIG. 15 shows the 10th embodiment of this invention, in which, as in the ninth embodiment, the transmission 5 comprises a planetary gear mechanism having three speed reduction ratios, while the one-way clutch 2 for reverse input comprises a roller clutch disposed between the hub case 12 and the outer ring gear 5d. Otherwise, this embodiment is basically identical in operation to the seventh embodiment. In FIG. 15, the friction member 19 as the clutch switching device 9 is not shown.

11th Embodiment

The 11th embodiment of the present invention is now described with reference to FIGS. 16(a) to 18. The power-assisted bicycle of this embodiment is of the center-motor type in which a secondary battery and a drive-assisting motor (center motor unit) are mounted on a frame connecting the front and rear wheels together at around the center between the front and rear wheels.

Manual force applied through the pedals and the crankshaft, or this manual force and the output of the motor are transmitted to the rear wheel through a power transmission member such as a chain which connects the crank sprocket of the center motor unit (not shown) and the rear sprocket 7 of the rear wheel as the drive wheel. The center motor unit carries therein a regenerative mechanism for returning regenerated power generated by reverse input applied to the output shaft of the motor from a rear hub 1 of the rear wheel to the secondary battery in the center motor unit while the bicycle is not being driven.

Figure 16A:
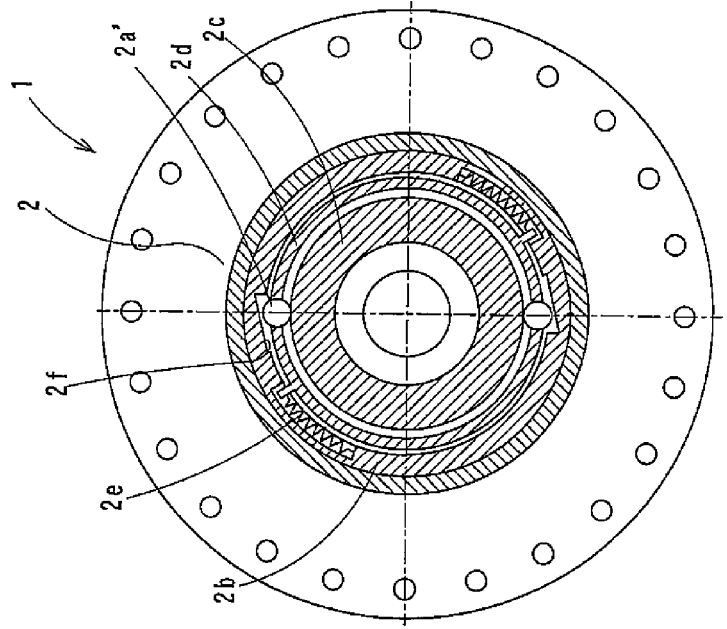
Figure 16B:
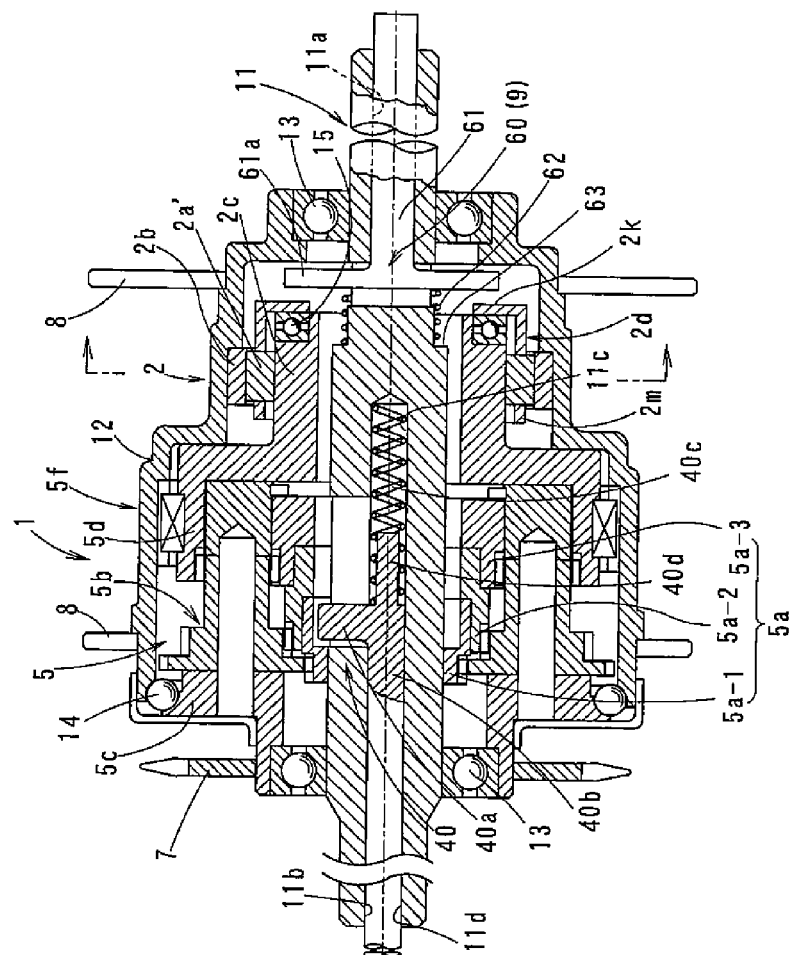

As shown in FIGS. 16(a) and 16(b), the rear hub 1 includes a hub case 12 arranged coaxially with the axle 11 of the rear wheel. The hub case 12 carries therein a transmission 5, a one-way clutch 2 for reverse input, and a rotational resistance imparting means 60 as a clutch switching means 9 for selectively engaging and disengaging the one-way clutch 2 for reverse input. Numeral 8 in FIG. 16(b) indicates a hub flange.

The one-way clutch 2 for reverse input may comprise a known clutch including engaging elements. In this embodiment, the clutch 2 is a roller clutch as shown in FIGS. 16(a) and 16(b) which comprises an inner ring 2c and an outer ring 2b which are coaxial with each other and rotatable relative to each other about the common axis, and rollers 2a' disposed in respective wedge-shaped spaces defined between the outer periphery of the inner ring 2c and respective grooves 2f of the outer ring 2b. The rollers 2a' are retained circumferentially by an annular retainer 2d, and are biased by elastic members 2e toward the wide ends of the respective wedge-shaped spaces.

The retainer 2d of this embodiment comprises an annular portion 2m formed with circumferentially spaced apart pockets in which the rollers 2a' are received, respectively, and a flange-shaped end plate 2k extending radially inwardly from the annular portion 2m over the entire circumference of the annular portion 2m. A bearing 15 is disposed between the axially inner surface of the end plate 2k of the retainer 2d and the end surface of the inner ring 2c to axially support the retainer 2d and the inner ring 2c so as to be rotatable relative to each other about the common axis.

Bearings 13 are disposed between the hub case 12 and the axle 11 at their respective axial ends to support the hub case and the axle so as to be rotatable relative to each other about the common axis. The outer ring gear 5d is rotationally fixed to the rear sprocket 7 and a bearing 14 is disposed between the outer ring gear 5d and the hub case 12 so that the outer ring gear 5d and the hub case 12 are rotatable relative to each other. The outer ring gear 5d is a component part of the transmission 5.

As shown in FIGS. 16(a) and 16(b), the transmission 5 comprise a planetary gear mechanism having three speed increase ratios, and including three sun gears 5a-1, 5a-2 and 5a-3 that are rotatably and coaxially arranged around the axle 11, planetary gears 5b having teeth in three rows, each row meshing with one of the sun gears 5a-1, 5a-2 and 5a-3, a planetary carrier 5c retaining the planetary gears 5b, and the outer ring gear 5d meshing with the planetary gears 5b.

In this embodiment, the inner ring 2c of the one-way clutch 2 for reverse input is rotationally fixed to the outer ring gear 5d of the transmission 5. Its outer ring 2b is fixedly pressed into the hub case 12. In this embodiment, the outer ring gear 5d and the inner ring 2c are formed of a single integral body.

A speed changing one-way clutch 5f is mounted between the planetary gears 5b and the hub case 12. In this embodiment, the one-way clutch 5f is a ratchet clutch. But it may be a different type of one-way clutch such as a roller clutch or a sprag clutch.

By operating a transmission control mechanism 40, any of the sun gears 5a-1, 5a-2 and 5a-3 can be selectively rotationally fixed to the axle 11, thereby selecting one of the speed ratios.

For example, when the third sun gear 5a-3 is rotationally fixed to the axle 11, the speed increase ratio between the planetary carrier 5c and the outer ring gear 5d will be:

$$(a+d)/d$$

where a is the number of teeth of the third sun gear 5a-3, and d is the number of teeth of the outer ring gear 5d.
In this state, the other sun gears 5a-1 and 5a-2 are idling and are not involved in the transmission of torque.

Needless to say, the sun gears 5a-1, 5a-2 and 5a-3 have different numbers of teeth from each other so that the speed increase ratio can be changed by selectively rotationally fixing one of the sun gears to the axle 11.

The transmission control mechanism 40 comprises an operating shaft 40b inserted in an axial hole 11b formed in the axle 11 and having a snap key 40a, and an elastic member 40c. The snap key 40a extends radially outwardly from the outer periphery of the operating shaft 40. The elastic member 40c is received in the deep portion 11c of the axial hole 11b and engages an engaging portion 40d of the operating shaft 40b at one end thereof.

The operating shaft 40b and thus the snap key 40a are axially biased from the deep portion 11c of the axial hole 11b toward its opening 11d (i.e. from right to left in FIG. 16(b)) by the elastic member 40c.

Any of the sun gears 5a-1, 5a-2 and 5a-3, which mesh with the planetary gears 5b, can be selectively locked to the axle 11 by axially moving the snap 40a from outside through the operating shaft.

By axially moving the snap key 40a through the operating shaft 40b from outside until the snap key 40a meshes with one of the sun gears 5a-1, 5a-2 and 5a-3, it is possible to rotationally fix the selected sun gear 5a to the axle 11.

Thus, for either driving force or reverse input, any one of the sun gears 5a-1, 5a-2 and 5a-3 can be rotationally fixed to the axle 11.

When driving force is applied to the rear sprocket 7, torque is transmitted to the hub case 12 through the planetary carrier 5c, planetary gears 5b, outer ring gear 5d and speed changing one-way clutch 5f. In this state, the one-way clutch 2 for reverse input is idling.

When the rear sprocket 7, planetary carrier 5c, planetary gears 5b, outer ring gear 5d and inner ring 2c rotate in the reverse direction relative to the outer ring 2b and the hub case 12, the rollers 2a' of the one-way clutch 2 for reverse rotation moves toward the narrow ends of the respective wedge-shaped spaces, thereby coupling and locking the inner and outer rings 2c and 2b together. In this state, the speed changing one-way clutch 5f is idling.

When the rear sprocket 7, planetary carrier 5c, planetary gears 5b, outer ring gear 5d and inner ring 2c again begin to rotate in the forward direction relative to the outer ring 2b and the hub case 12, the one-way clutch 2 for reverse input disengages.

Thus, the one-way clutch 2 for reverse input does not transmit torque applied to the rear sprocket 7 in the forward direction, but transmits torque in the reverse direction (including reverse input torque applied while the bicycle is traveling in the forward direction without being driven).

In the normal state (i.e. while no external force is being applied to the retainer 2d), the one-way clutch 2 for reverse input is never locked for toque input in either direction because the rollers 2a' are biased and pushed toward the wide ends of the respective wedge-shaped spaces by the elastic members 2e through the retainer 2d.

But when external force, i.e. rotational resistance is applied to the retainer 2d through the rotational resistance imparting means 60 in the hub case 12, and the retainer 2d is rotated in the reverse direction relative to the outer ring 2b against the biasing force of the elastic members 2e, the rollers 2a' are moved to the stand-by position near the narrow ends of the respective wedge-shaped spaces. When reverse input is applied from the wheel in this state, the rollers 2a' are wedged into between the inner ring 2c and the respective grooves 2f of the outer ring 2b, thereby coupling and locking together the inner and outer rings 2c and 2b of the one-way clutch 2 for reverse input.

Figures 17A, 17B:
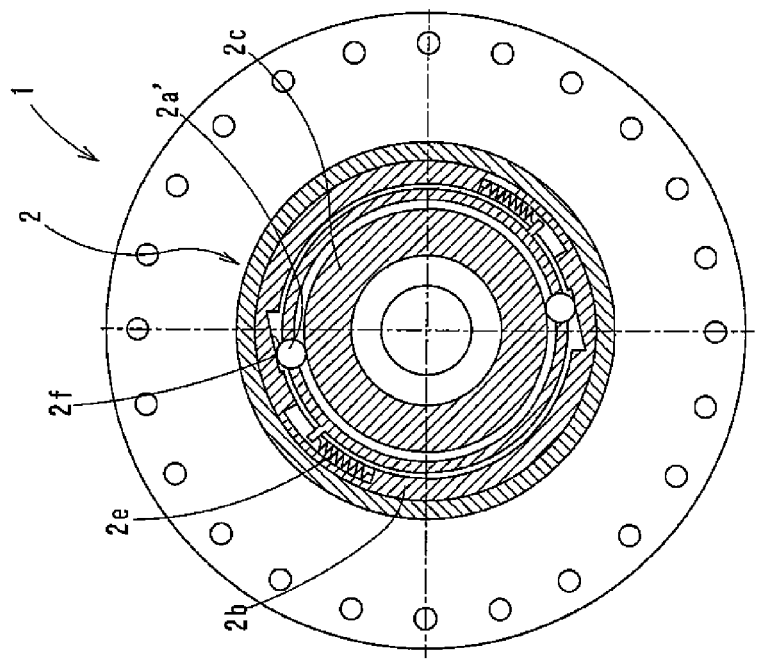
Figure 18:
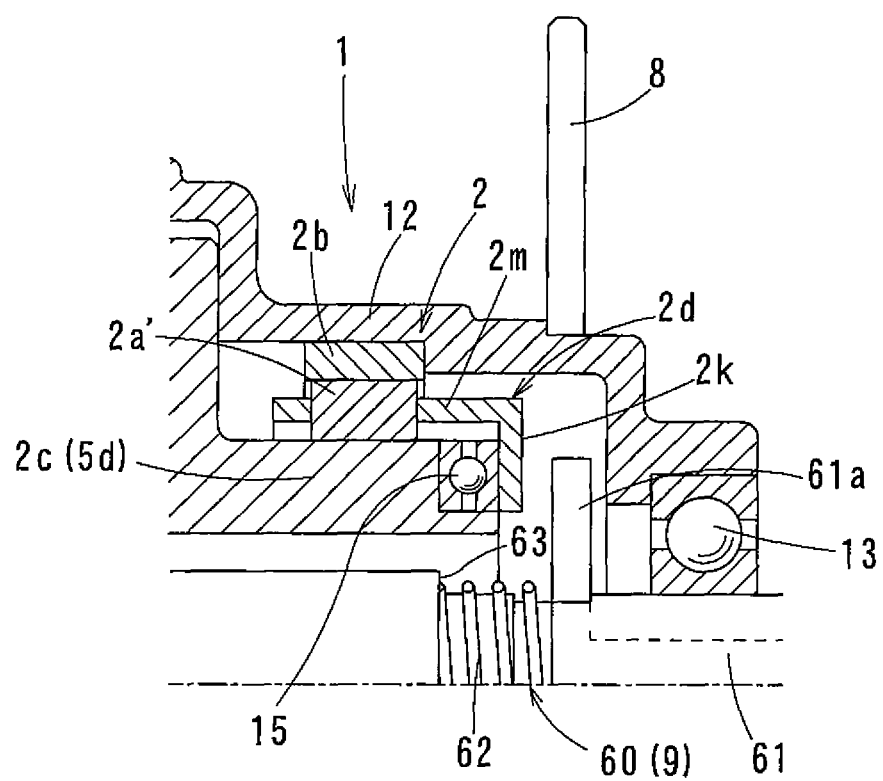
FIG. 18 is a partial enlarged view of FIG. 16(a).

The rotational resistance imparting means 60 of this embodiment is shown in FIGS. 16(b), 17(a) and 17(b), and includes an engaging portion 63 provided on the outer periphery of the axle 11, and a friction portion 61a comprising a flange-shaped member protruding radially outwardly over the entire circumference (hereinafter referred to as "friction plate 61a") so as to be axially spaced apart from the engaging portion 63. In this embodiment, the engaging portion 63 is a shoulder but may be a radially outwardly protruding flange.

An elastic member 62 is mounted between the engaging portion 63 and the friction plate 61a. In this embodiment, the elastic member 62 is a coil spring which is fitted around the axle 11 between the engaging portion 63 and the friction plate 61a. But the elastic member is not limited to a compression spring, and may be mounted in an axial hole 11a formed in the axle 11. Instead of the friction portion 61a of the embodiment, which is in the shape of a radially outwardly protruding flange over the entire circumference, a rod-shaped friction portion may be used, provided such a rod-shaped friction portion can apply rotational resistance large enough to overcome the biasing force of the elastic members 2e.

The friction plate 61a is provided at one axial end of a shaft-shaped operating member 61 axially movably inserted through the axial hole 11a formed in the axle 11. In this embodiment, the friction plate 61a and the operating member 61 are integral with each other. But they may be separate members fixed to each other. The operating member 61 is preferably inserted in the hole 11a without a play. The operating member 61 is coaxial with the axle 11.

The operating member 61 can be axially moved relative to the axle 11 by operating a clutch switching device (not shown) provided outside the axle 11

When the operating member 61 is axially moved relative to the axle 11 toward the one-way clutch 2 for reverse input until the end surface of the friction plate 61a, which is provided at one axial end of the operating member 61, contacts the axially outer surface of the end plate 2k of the retainer 2d, which protrudes radially inwardly from the annular portion 2m of the retainer 2d, the friction between the friction plate 61a and the end plate 2k resists the rotation of the retainer 2d.

This reduces the rotational speed of the retainer 2d, allowing the retainer 2d to rotate in the reverse direction relative to the outer ring 2b against the biasing force of the elastic members 2e and thus moving the rollers 2a' to the stand-by position (near the narrow ends of the wedge-shaped spaces).

The clutch switching device is configured to axially move the operating member 61 toward the one-way clutch when the driver applies the brakes of the bicycle. When the brakes are actually applied by e.g. gripping the brake levers, the clutch switching device applies pushing force to the operating member 61, thus moving the operating member 61 and the friction plate 61a toward the one-way clutch 2 for reverse input until the end surface of the friction plate 61a contacts the retainer 2d. When the brake levers are released (and the brakes are actually released), the pushing force applied to the operating member 61 is removed, so that the friction plate 61a separates from the retainer 2d under the biasing force of the elastic member 62. Thus, the frictional resistance disappears.

The clutch switching device for axially moving the operating member 61 relative to the axle 11 may be any known means which can apply pushing force to the operating member 61, which is a shaft-shaped member inserted in the axle 11.

For example, the clutch switching device may comprise a shaft member extending radially outwardly from the operating member through an axially elongated hole formed in the axle 11 to extend radially from the hole 11a to the outer periphery of the axle 11 and protruding from the axle 11, and means for axially pushing the protruding end of the shaft portion relative to the axle 11 until the friction plate 61a contacts the retainer 2d. By continuously applying the pushing force to the shaft portion with the friction plate 61a in contact with the retainer 2d, the friction plate 61 and the retainer 2d can be kept in contact with each other.

When the pushing force is removed, the operating member 61 is axially moved away from the retainer 2d under the biasing force of the elastic member 62.

Instead of the shaft member as described above, the clutch switching device may comprise a shaft member provided at the other axial end of the operating member 61 and protruding from the other axial end of the axle 11 so that the pushing force is applied to the protruding end of this shaft member.

In this embodiment, since the elastic member 62 is disposed between the engaging portion 63 and the friction plate 61a, the friction plate 61a separates from the retainer 2d under the biasing force of the elastic member. But the elastic member 62 may be omitted, and instead, the clutch switching device may have the function of pushing the operating member 61 in the direction to separate the friction plate 61a from the retainer 2d.

With this arrangement, the one-way clutch 2 for reverse input idles while the bicycle is being driven in the forward direction. When the brakes are applied while the bicycle is traveling in the forward direction without being driven, the rotational resistance imparting means 60 is activated to transmit reverse input torque from the wheel to the rear sprocket 7 through the one-way clutch 2 for reverse input.

When the one-way clutch 2 for reverse input engages with the first sun gear 5a-1 fixed to the axle while the bicycle is not being driven, the speed reduction ratio between the outer ring gear 5d and the planetary carrier 5c will be:

$$(a+d)/d$$

where a is the number of teeth of the first sun gear 5a-1 and d is the number of teeth of the outer ring gear 5d.

Thus, rotation is transmitted from the hub case 12 to the rear sprocket 7 through the outer ring gear 5d and the planetary carrier 5c in the above speed reduction ratio.

Thus the transmission 5 of this embodiment is a speed increasing mechanism with one of the sun gears 5a-1, 5a-2 and 5a-3 as a fixed member, the outer ring gear 5d as an input member and the planetary gears 5e and the planetary carrier 5c as output members, and with the three rows of teeth of the planetary gears 5b meshing with the respective sun gears 5a-1, 5a-2 and 5a-3 in three different ratios of the number of teeth meshing with each other.

With this arrangement, reverse input torque from the wheel is transmitted to the rear sprocket 7 in a reduced speed ratio and then transmitted to the motor shaft through a power transmission member such as a chain, and used for regeneration.

While the bicycle is being driven, the transmission 5 transmits input from the sprocket 7 to the hub case 12 in the selected speed increase ratio.

In this arrangement, the rotational resistance imparting means 60 provided in the hub case 12 selectively imparts rotational resistance to the retainer 2d of the one-way clutch 2 for reverse input, thereby selectively engaging and disengaging the one-way clutch 2. Thus, all the component parts are mounted in the hub case 12, so that it is possible to prevent corrosion of the retainer 2d of the clutch due to water and mud from outside, or damage to or deformation of the retainer 2d due to unnecessary external force.

Now more detailed description is made of the operation of the one-way clutch 2 for reverse input and the rotational resistance imparting means 60.

Suppose now that the one-way clutch 2 for reverse input, which is mounted between the inner ring 2c and the hub case 12, is idling with the rollers 2a' biased and pushed toward the deep ends of the respective grooves 2f (wide ends of the respective wedge-shaped spaces) by the elastic members 2e through the retainer 2d.

In this state, when the brakes are applied by the driver and rotational resistance is applied to the retainer 2d from the rotational resistance imparting means 60, the retainer 2d rotates in the reverse direction relative to the outer ring 2b against the biasing force of the elastic members 2d.

This relative rotation of the retainer moves the rollers 2a' to the stand-by position where the rollers are at the shallow portions of the grooves 2f of the outer ring 2b. But even at this position, as long as the inner ring 2c is rotating faster than the outer ring 2b, the rollers 2a' do not wedge into the wedge-shaped spaces, which are defined between the inner ring 2c and the respective grooves 2f of the outer ring 2b, and thus the one-way clutch 2 for reverse input does not engage.

While the bicycle is being driven in the forward direction, driving torque applied to the rear sprocket 7 in the forward direction is transmitted to the hub case 12 through the outer ring gear 5d and the speed changing one-way clutch in the selected speed reduction ratio. In this state, the one-way clutch 2 for reverse input does not engage because its rollers 2a' are being biased and pushed toward the deep ends of the respective grooves 2f by the elastic members 2e through the retainer 2d.

While the bicycle is traveling forward without being driven (such as while the bicycle is going down a slope without applying force to the pedals), reverse input torque is applied to the rear hub 1 from the wheel. In this state, the reverse input torque cannot be transmitted because the speed changing one-way clutch 5f is idling.

Also in this state, the one-way clutch 2 for reverse input is also idling in a normal state (i.e. while no external force is being applied to the retainer 2d) because the rollers 2a' are being biased and pushed toward the deep ends of the respective grooves 2f (wide ends of the wedge-shaped spaces) by the elastic members 2e through the retainer 2d.

When the brakes are applied by the driver and rotational resistance is applied to the retainer 2d from the rotational resistance imparting means 60, thus moving the rollers 2a' to the stand-by position where the rollers are at the shallow portions of the grooves 2f of the outer ring 2b, since the outer ring 2b is rotating faster than the inner ring 2c (while the bicycle is not being driven), the rollers 2a' wedge into the wedge-shaped spaces defined between the inner ring 2c and the grooves 2f of the outer ring 2b, thus locking the one-way clutch 2 for reverse input. Reverse input torque from the wheel is transmitted to the rear sprocket 7 through the hub case 12, one-way clutch 2 for reverse input, planetary carrier 5c, planetary gears 5e and outer ring gear 5d. The reverse input torque is transmitted after being reduced by the transmission 5.

Thus, reverse input torque from the rear drive wheel is transmitted to the motor shaft through the rear sprocket 7 and a power transmission member such as a chain and used for regeneration.

While not shown, a center one-way clutch is provided between the crankshaft and the crank sprocket which is configured to engage when driving force is applied and disengage and idle when reverse input is applied. Thus, reverse input is not transmitted to the crankshaft and pedals. The center one-way clutch may be any known one-way clutch including a roller clutch, a sprag clutch or a ratchet clutch.

While the bicycle is being moved backward (with e.g. the driver dismounted from the bicycle), although the rear sprocket 7 and the hub case 12 rotate, relative to the ground, in the direction opposite to the direction in which they rotate while the bicycle is being driven forward, their rotational directions relative to each other are the same as while the bicycle is being driven forward.

12th Embodiment

FIGS. 19 and 20 show the 12th embodiment of this invention, which differs from the 11th embodiment in that a ratchet clutch is used for the one-way clutch 2 for reverse input instead of the roller clutch.

Otherwise, this embodiment is basically identical in structure to the 11th embodiment, including the structure of e.g. the transmission 5. Thus, description is mainly made of the one-way clutch 2 for reverse input and the rotational resistance imparting means 60, which serves as the clutch switching means 9.

As shown in FIGS. 19(a) and 19(b), the one-way clutch 2 for reverse input comprises an inner ring 2c which is integral with the outer ring gear 5d and formed with ratchet grooves 21, an outer ring 2b integral with the hub case 12, and a clutch pawl (ratchet pawl) 20 as a engaging element pivotally mounted on a pivot shaft 23. When the ratchet pawl 20 pivots about the pivot shaft 23 in one direction, the ratchet pawl 20 is configured to be engaged in one of the ratchet grooves 21, thereby coupling the inner and outer rings 2c and 2b together. When the ratchet pawl 20 pivots in the opposite direction, the ratchet pawl 20 disengages from the ratchet groove 21.

A shutter 22 as an engaging element retaining means is disposed in an annular space defined between the inner and outer rings 2c and 2b.

The shutter 22 comprises a circumferentially extending portion 22a which can be moved in and out between the clutch pawl 20 and one of the ratchet grooves 21, and a protrusion 22b radially outwardly extending from the circumferentially extending portion 22a. As shown in FIG. 19(a), the circumferentially extending portion 22a has a cross-section (i.e. a section taken along a plane perpendicular to its axis) in the shape of the capital letter C, i.e. a partially cutaway ring, and has a predetermined axial length. But as long as the circumferentially extending portion 22a can perform the above-mentioned function, it may have a different shape.

The shutter 22 is normally biased to a position where the circumferentially extending portion 22a is disposed between the clutch pawl 20 and the opposed ratchet groove 21, so that the clutch pawl 20 cannot engage any of the ratchet groove 21, by an elastic member 24 received in a recess 25 formed in the inner periphery of the outer ring 2b through the protrusion 22b.

The rotational resistance imparting means 60 is basically identical in structure to that of the previous embodiment, and includes an engaging portion 63 provided on the outer periphery of the axle 11, and a friction portion 61a comprising a flange-shaped member protruding radially outwardly over the entire circumference (hereinafter referred to as "friction plate 61a") so as to be axially spaced apart from the engaging portion 63.

An elastic member 62 is mounted between the engaging portion 63 and the friction plate 61a. The friction plate 61a is provided at one axial end of a shaft-shaped operating member 61 axially movably inserted through the axial hole 11a formed in the axle 11.

The operating member 61 can be axially moved relative to the axle 11 by operating a clutch switching device (not shown) provided outside the axle 11

When the operating member 61 is axially moved relative to the axle 11 toward the one-way clutch 2 for reverse input until the end surface of the friction plate 61a, which is provided at one axial end of the operating member 61, contacts the axially outer surface of an end plate 22c radially inwardly extending from the circumferentially extending portion 22a of the shutter 22, the friction between the friction plate 61a and the end plate 22c resists the rotation of the shutter 22.

Rotational resistance applied to the shutter 22 by the friction plate 61a while the bicycle is traveling forward without being driven delays the rotation of the shutter 22 relative to the hub case 12.

Figures 20A, 20B:
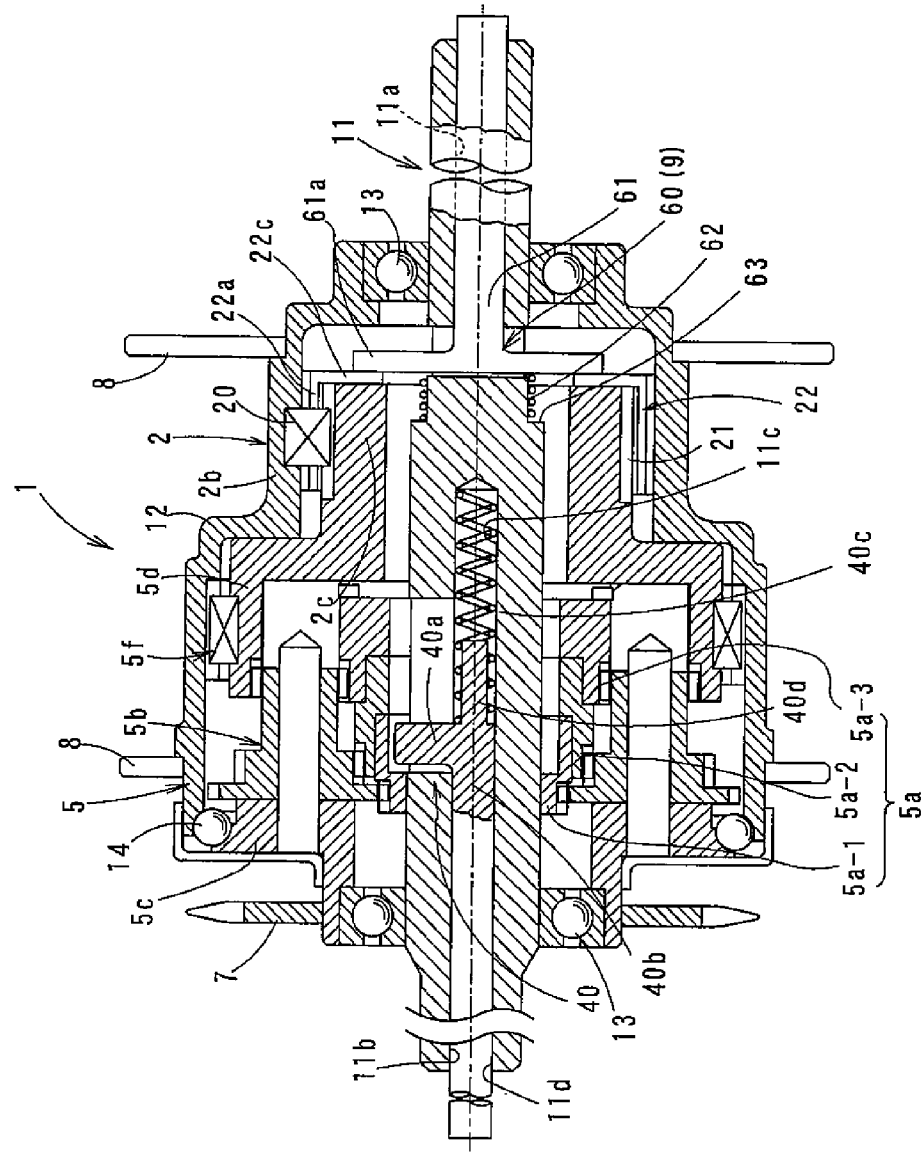
FIGS. 20(a) and 20(b) are a side view and a front view, respectively, of the 12th embodiment, showing the state in which the ratchet clutch is prevented from engaging.

When the rotational resistance applied by the friction plate 61a overcomes the elastic force of the elastic member 24, the shutter 22 opens, i.e. moves away from between the clutch pawl 20 and the ratchet groove 21 (as shown in FIG. 20(a)), allowing the clutch pawl 20 to be engaged in the ratchet groove 21. Reverse input from the wheel is thus transmitted to the rear sprocket 7 through the hub case 12, one-way clutch 2 for reverse input, outer ring gear 5d, planetary gears 5e and planetary carrier 5c. The reverse input is then transmitted to the motor through the chain and used for regeneration.

When the rotational resistance applied to the shutter 22 decreases or disappears and the elastic force of the elastic member 24 overcomes the rotational resistance, the shutter 22 is biased by the elastic member 24 and moves into between the clutch pawl 20 and the ratchet groove 21 (see FIG. 19(a)). In this state, since the ratchet pawl 20 cannot engage in any of the ratchet grooves 21, the one-way clutch 2 for reverse input idles.

13th Embodiment

Figure 21:
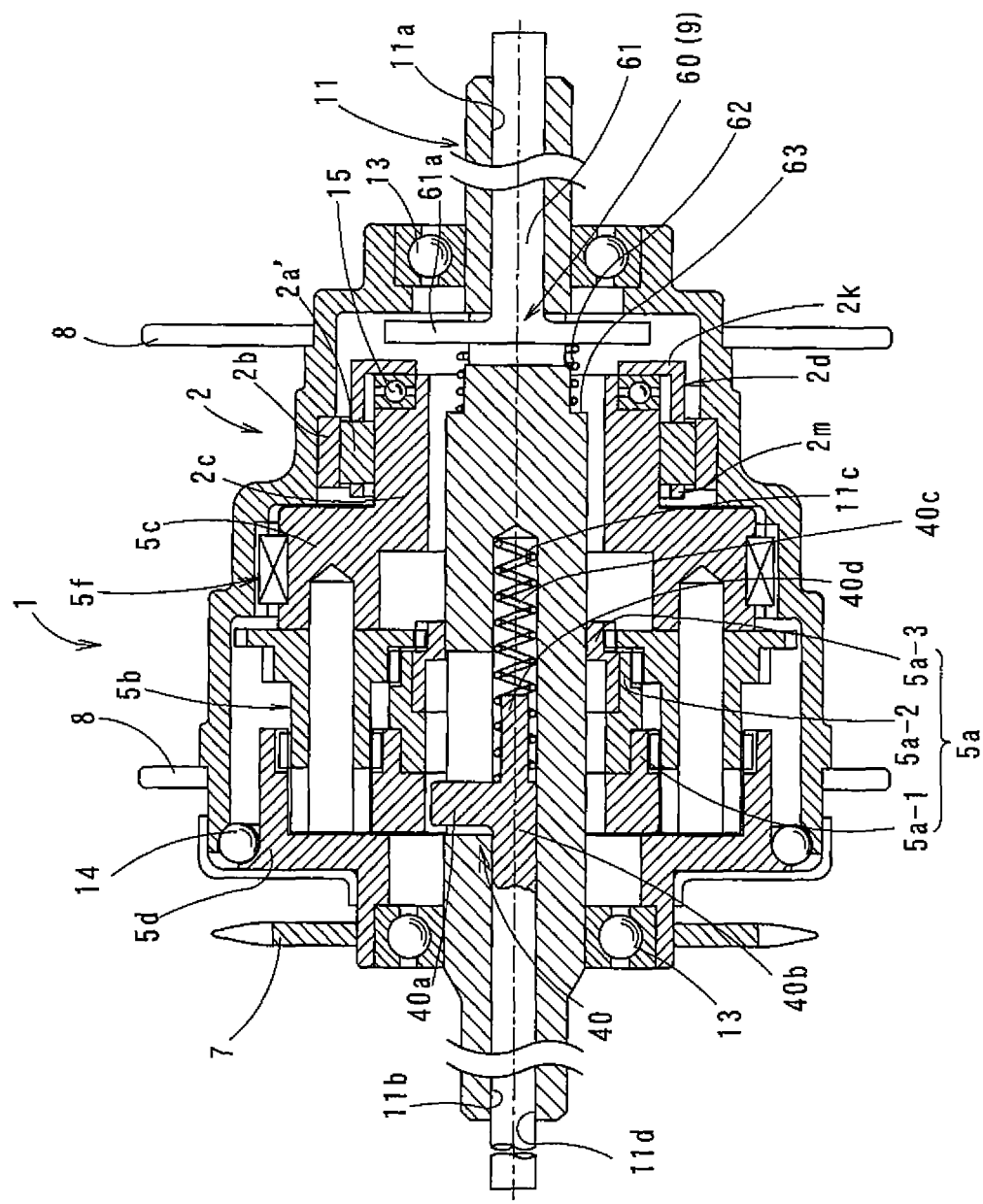
FIG. 21 is a front view of a 13th embodiment.

FIG. 21 shows the 13th embodiment of this invention, of which the transmission 5 comprises a planetary gear mechanism having three speed reduction ratios. Thus the transmission 5 includes three sun gears 5a-1, 5a-2 and 5a-3 coaxially and rotatably mounted around the axle 11, planetary gears 5b having three rows of teeth, each row meshing with one of the sun gears 5a-1, 5a-2 and 5a-3, a planetary carrier 5c retaining the planetary gears 5b, and an outer ring gear 5d meshing with the planetary gears 5b.

The one-way clutch 2 for reverse input comprises a roller clutch disposed between the hub case 12 and the outer ring gear 5d.

But the one-way clutch 2 for reverse input may comprise a sprag clutch instead, or may comprise the ratchet clutch used in the 12th embodiment.

Bearings 13 are disposed between the hub case 12 and the axle 11 at their respective axial ends so as to rotatably support the hub case and the axle, in exactly the same manner as in the 11th and 12th embodiments.

Also as in these previous embodiments, the speed changing one-way clutch 5f is mounted between the planetary gears 5b and the hub case 12. For this speed changing one-way clutch 5f too, a one-way clutch other than the ratchet clutch as shown, such as a roller clutch or a sprag clutch, may be used.

The 13th embodiment differs from the 11th and 12th embodiments in that the outer ring gear 5d is rotationally fixed to the rear sprocket 7 and a bearing 14 is disposed between the outer ring gear 5d and the hub case 12 so that the outer ring gear 5d and the hub case 12 are rotatable relative to each other. The outer ring gear 5d is a component part of the transmission 5.

By operating a transmission control mechanism 40, any of the sun gears 5a-1, 5a-2 and 5a-3 can be selectively rotationally fixed to the axle 11 for speed change. Since the transmission control mechanism 40 of this embodiment is of the same structure as those of the previous embodiments, its description is omitted here.

When driving force is applied to the rear sprocket 7, torque is transmitted to the hub case 12 through the outer ring gear 5d, planetary gears 5b, planetary carrier 5c and speed changing one-way clutch 5f. In this state, the one-way clutch 2 for reverse input is idling.

When resistance is applied to the retainer 2d from the rotational resistance imparting means 60 as the clutch switching means 9 while the bicycle is not being driven, the rollers 2a' move in the grooves 2f toward the narrow ends of the wedge-shaped spaces, thereby coupling and locking the inner and outer rings 2c and 2b together. In this state, the speed changing one-way clutch 5f is idling. The rotational resistance imparting means 60 is of the same structure as those of the previous embodiments. Thus, its description is omitted here.

When the rear sprocket 7, outer ring gear 5d, planetary gears 5b, planetary carrier 5c and inner ring 2c begin to again rotate in the forward direction relative to the outer ring 2b and the hub case 12, the one-way clutch for reverse input disengages.

Thus, the one-way clutch 2 for reverse input does not transmit torque in the forward direction applied to the rear sprocket 7 but transmits torque in the reverse direction (including reverse input torque while the bicycle is traveling forward without being driven).

Otherwise, this embodiment is basically identical both in structure and operation to the 11th and 12th embodiments. Thus further detailed description of this embodiment is omitted.

In the above embodiments, as the external force to be applied to the retainer 2d as the engaging element retaining means or the shutter, frictional resistance produced between e.g. the friction plate 31a and the retainer 4 by the rotational resistance imparting means 60 is used, and the frictional force is adapted to be produced when the driver applies the brakes. But instead, the frictional force may be adapted to be produced by other means. For example, the frictional force may be adapted to be produced when the driver performs a manual operation other than the application of the brakes.

14th Embodiment

FIGS. 22 and 23 show the 14th embodiment of the present invention The power-assisted bicycle of this embodiment is of the center-motor type in which a secondary battery and a drive-assisting motor (center motor unit) are mounted on a frame connecting the front and rear wheels together at around the center between the front and rear wheels.

Manual force applied through the pedals and the crankshaft, or this manual force and the output of the motor are transmitted to the rear wheel through a power transmission member such as a chain which connects the crank sprocket of the center motor unit (not shown) and the rear sprocket 7 of the rear wheel as the drive wheel. The center motor unit carries therein a regenerative mechanism for returning regenerated power generated by reverse input applied to the output shaft of the motor from a rear hub 1 of the rear wheel to the secondary battery in the center motor unit while the bicycle is not being driven.

As shown in FIGS. 22(a) and 22(b), the rear hub 1 includes a hub case 12 arranged coaxially with the axle 11 of the rear wheel. The hub case 12 carries therein a transmission 5, a transmission control mechanism 40, a two-way clutch for transmitting driving force and reverse input, and a rotational resistance imparting means 60 as a clutch switching means 9 having the function of engaging and disengaging the two-way clutch 50. Numeral 8 in the figures indicates a hub flange.

The two-way clutch 50 may comprise a known engagement element clutch. In this embodiment, as shown in FIGS. 22(a) and 22(b), the clutch 50 is a roller clutch comprising inner and outer rings 50c and 50b which are coaxial with each other and rotatable relative to each other about a common axis, and rollers 50a received in respective wedge-shaped spaces defined between the outer periphery of the inner ring 50c and grooves 50f formed in the outer ring 50, each wedge-space narrowing toward both circumferential ends.

In this embodiment, the grooves 50f of the outer ring 50b have a radially outwardly concave, substantially V-shaped cross-section. Thus, the radial dimension of each wedge-shaped space gradually decreases from the bottom of the V-shaped groove 50f, i.e. from its circumferential center both in the forward and reverse rotational directions.

The rollers 50a are circumferentially held in position by an annular retainer 50d, and biased by elastic members 50e through the retainer 50d in the forward direction (direction which allows transmission of driving force to the rear wheel) toward one of the narrow circumferential ends of the respective wedge-shaped spaces.

The retainer 50d of this embodiment comprises an annular portion 50m formed with circumferentially spaced apart pockets in which the rollers 50a are received, respectively, and a flange-shaped end plate 50k extending radially inwardly from the annular portion 50m over the entire circumference of the annular portion 50m. A bearing 15 is disposed between the axially inner surface of the end plate 50k of the retainer 50d and the end surface of the inner ring 50c to axially support the retainer 50d and the inner ring 50c so as to be rotatable relative to each other about the common axis.

Bearings 13 are disposed between the hub case 12 and the axle 11 at their respective axial ends to support the hub case and the axle so as to be rotatable relative to each other about the common axis. The planetary carrier 5c is rotationally fixed to the rear sprocket 7 and a bearing 14 is disposed between the planetary carrier 5c and the hub case 12 so that the planetary carrier 5c and the hub case 12 are rotatable relative to each other. The planetary carrier 5c is a component part of the transmission 5.

As shown in FIGS. 22(a) and 22(b), the transmission 5 comprise a planetary gear mechanism having three speed increase ratios, and including three sun gears 5a-1, 5a-2 and 5a-3 that are rotatably and coaxially arranged around the axle 11.

The transmission 5 further includes planetary gears 5b having teeth in three rows, each row meshing with one of the sun gears 5a-1, 5a-2 and 5a-3, the planetary carrier 5c retaining the planetary gears 5b, and an outer ring gear 5d meshing with the planetary gears 5b.

The two-way clutch 50 is mounted between the outer ring gear 5d and the hub case 12. The inner ring 50c of the two-way clutch 50 is integral with the outer ring gear 5d. The outer ring 50b of the two-way clutch 50 is fixedly pressed into the hub case 12.

By operating a transmission control mechanism 40, any of the sun gears 5a-1, 5a-2 and 5a-3 can be selectively rotationally fixed to the axle 11, thereby selecting one of the speed ratios.

For example, when the third sun gear 5a-3 is rotationally fixed to the axle 11, the speed increase ratio between the planetary carrier 5c and the outer ring gear 5d will be:

$$(a+d)/d$$

where a is the number of teeth of the third sun gear 5a-3, and d is the number of teeth of the outer ring gear 5d.

In this state, the other sun gears 5a-1 and 5a-2 are idling and are not involved in the transmission of torque.

Needless to say, the sun gears 5a-1, 5a-2 and 5a-3 have different numbers of teeth from each other so that the speed increase ratio can be changed by selectively rotationally fixing one of the sun gears to the axle 11.

The transmission control mechanism 40 comprises an operating shaft 40b inserted in an axial hole 11b formed in the axle 11 and having a snap key 40a, and an elastic member 40c. The snap key 40a extends radially outwardly from the outer periphery of the operating shaft 40. The elastic member 40c is received in the deep portion 11c of the axial hole 11b and engages an engaging portion 40d of the operating shaft 40b at one end thereof.

The operating shaft 40b and thus the snap key 40a are axially biased from the deep portion 11c of the axial hole 11b toward its opening 11d (i.e. from right to left in FIG. 22(b)) by the elastic member 40c.

Any of the sun gears 5a-1, 5a-2 and 5a-3, which mesh with the planetary gears 5b, can be selectively locked to the axle 11 by axially moving the snap 40a from outside through the operating shaft.

By axially moving the snap key 40a through the operating shaft 40b from outside until the snap key 40a meshes with one of the sun gears 5a-1, 5a-2 and 5a-3, it is possible to rotationally fix the selected sun gear 5a to the axle 11.

Thus, for either driving force or reverse input, any one of the sun gears 5a-1, 5a-2 and 5a-3 can be rotationally fixed to the axle 11.

When driving force is applied to the rear sprocket 7, torque is transmitted to the inner ring 50c of the two-way clutch 50 through the planetary carrier 5c, planetary gears 5b, and outer ring gear 5d.

In this state, the driving force from the rear sprocket 7 rotates the inner ring 50c of the two-way clutch 50 in the forward rotational direction, i.e. clockwise in FIG. 22(a), relative to its outer ring 50b.

Since the rollers 50a are biased toward the narrow circumferential end of each wedge-shaped space in the forward rotational direction (on the right-hand side of the figures) by the elastic members 50e, when the inner ring 50c rotates in the forward rotational direction relative to the outer ring 50b, the rollers 50a wedge into the narrow ends of the wedge-shaped spaces, thus coupling and locking the inner and outer rings 50c and 50b together.

Thus, the driving force from the rear sprocket 7 is transmitted to the rear drive wheel.

When the outer ring 50b and the hub case 12 rotates in the forward direction relative to the rear sprocket 7, outer ring gear 5d, planetary gears 5b, planetary carrier 5c and inner ring 50c (while the bicycle is traveling in the forward direction without being driven), the rollers 50a of the two-way clutch 50 moves in the respective grooves 50f toward the wide portions of the wedge-shaped spaces, thereby uncoupling the inner and outer rings 50c and 50b from each other and unlocking the clutch 50.

The state in which the outer ring 50b is rotating in the reverse rotational direction relative to the inner ring 50c is equivalent to the state in which the inner ring 50c is rotating in the forward direction relative to the outer ring 50b. Thus, in either case, the two-way clutch 50 locks up and torque is transmitted therethrough.

Thus in the normal state, two-way clutch 50 acts as a one-way clutch to transmit driving force applied to the rear sprocket 7.

But when external force, i.e. rotational resistance is applied to the retainer 50d through the rotational resistance imparting means 60 in the hub case 12, and the retainer 50d is rotated in the reverse direction relative to the outer ring 50b against the biasing force of the elastic members 50e, the rollers 50a are moved to the stand-by position near the narrow circumferential ends of the respective wedge-shaped spaces in the reverse rotational direction (on the left-hand side of FIG. 23(a)). When reverse input is applied from the wheel in this state, the rollers 50a are wedged into between the inner ring 50c and the respective grooves 50f of the outer ring 50b, thereby coupling and locking together the inner and outer rings 50c and 50b of the two-way clutch 50.

Thus, the two-way clutch 50 transmits driving force to the rear wheel while the bicycle is being driven in the forward direction, and also transmits reverse input torque from the wheel to the rear sprocket 7 while the bicycle is traveling in the forward direction without being driven (such as when the bicycle is going down a slope without applying manual force to the pedals) with rotational resistance being applied from the rotational resistance imparting means 60 to the retainer 50d.

The rotational resistance imparting means 60 of this embodiment is shown in FIGS. 22 and 23, and includes an engaging portion 63 provided on the outer periphery of the axle 11, and a friction portion 61a comprising a flange-shaped member protruding radially outwardly over the entire circumference (hereinafter referred to as "friction plate 61a") so as to be axially spaced apart from the engaging portion 63. In this embodiment, the engaging portion 63 is a shoulder but may be a radially outwardly protruding flange.

An elastic member 62 is mounted between the engaging portion 63 and the friction plate 61a. In this embodiment, the elastic member 62 is a coil spring which is fitted around the axle 11 between the engaging portion 63 and the friction plate 61a. But the elastic member is not limited to a compression spring, and may be mounted in an axial hole 11a formed in the axle 11. Instead of the friction portion 61a of the embodiment, which is in the shape of a radially outwardly protruding flange over the entire circumference, a rod-shaped friction portion may be used, provided such a rod-shaped friction portion can apply rotational resistance large enough to overcome the biasing force of the elastic members 50e.

The friction plate 61a is provided at one axial end of a shaft-shaped operating member 61 axially movably inserted through the axial hole 11a formed in the axle 11. In this embodiment, the friction plate 61a and the operating member 61 are integral with each other. But they may be separate members fixed to each other. The operating member 61 is preferably inserted in the hole 11a without a play. The operating member 61 is coaxial with the axle 11.

The operating member 61 can be axially moved relative to the axle 11 by operating a clutch switching device (not shown) provided outside the axle 11

When the operating member 61 is axially moved relative to the axle 11 toward the two-way clutch 50 until, as shown in FIG. 23(b), the end surface of the friction plate 61a, which is provided at one axial end of the operating member 61, contacts the axially outer surface of the end plate 50k of the retainer 50d, which protrudes radially inwardly from the annular portion 50m of the retainer 50d, the friction between the friction plate 61a and the end plate 50k resists the rotation of the retainer 50d.

This reduces the rotational speed of the retainer 50d, allowing the retainer 50d to rotate in the reverse direction relative to the outer ring 50b against the biasing force of the elastic members 50e and thus moving the rollers 50a to the stand-by position (near the narrow ends of the wedge-shaped spaces in the reverse rotation direction).

The clutch switching device is configured to axially move the operating member 61 toward the two-way clutch when the driver applies the brakes of the bicycle. When the brakes are actually applied by e.g. gripping the brake levers, the clutch switching device applies pushing force to the operating member 61, thus moving the operating member 61 and the friction plate 61a toward the two-way clutch 50 until the end surface of the friction plate 61a contacts the retainer 50d. When the brake levers are released (and the brakes are actually released), the pushing force applied to the operating member 61 is removed, so that the friction plate 61a separates from the retainer 50d under the biasing force of the elastic member 62. Thus, the frictional resistance disappears.

The clutch switching device for axially moving the operating member 61 relative to the axle 11 may be any known means which can apply pushing force to the operating member 61, which is a shaft-shaped member inserted in the axle 11.

For example, the clutch switching device may comprise a shaft member extending radially outwardly from the operating member through an axially elongated hole formed in the axle 11 to extend radially from the hole 11a to the outer periphery of the axle 11 and protruding from the axle 11, and means for axially pushing the protruding end of the shaft portion relative to the axle 11 until the friction plate 61a contacts the retainer 50d. By continuously applying the pushing force to the shaft portion with the friction plate 61a in contact with the retainer 50d, the friction plate 61 and the retainer 50d can be kept in contact with each other.

When the pushing force is removed, the operating member 61 is axially moved away from the retainer 50d under the biasing force of the elastic member 62.

Instead of the shaft member as described above, the clutch switching device may comprise a shaft member provided at the other axial end of the operating member 61 and protruding from the other axial end of the axle 11 so that the pushing force is applied to the protruding end of this shaft member.

In this embodiment, since the elastic member 62 is disposed between the engaging portion 63 and the friction plate 61a, the friction plate 61a separates from the retainer 50d under the biasing force of the elastic member 62. But the elastic member 62 may be omitted, and instead, the clutch switching device may have the function of pushing the operating member 61 in the direction to separate the friction plate 61a from the retainer 50d.

With this arrangement, when driving force is applied to the rear sprocket 7 while the bicycle is being driven in the forward direction, torque is transmitted to the hub case 12 through the planetary carrier 5c, planetary gears 5b, outer ring gear 5d and two-way clutch 50 (inner ring 50c, rollers 50a and outer ring 50b).

When the rotational resistance imparting means 60 is activated as a result of e.g. the application of the brakes while the bicycle is traveling without being driven, reverse input torque from the wheel is transmitted to the rear sprocket 7 through the hub case 12, two-way clutch 50 (outer ring 50b, rollers 50a and inner ring 50c), outer ring gear 5d, planetary gears 5b and planetary carrier 5c.

If e.g. the third sun gear 5a-3 is rotationally fixed to the axle, when the two-clutch 50 is locked while the bicycle is traveling forward without being driven, the rotation is transmitted from the outer ring gear 5d to the planetary carrier in the following speed reduction ratio:

$$(a+d)/d$$

where a is the number of teeth of the third sun gear 5a-3 and d is the number of teeth of the outer ring gear 5d.

Thus, rotation is transmitted from the hub case 12 to the rear sprocket 7 through the outer ring gear 5d, planetary gears 5b and the planetary carrier 5c in the above speed reduction ratio.

Thus the transmission 5 of this embodiment is a speed increasing mechanism with the planetary gears 5b and the planetary carrier 5c as input members, the outer ring gear 5d as an output member, and one of the sun gears 5a-1, 5a-2 and 5a-3 as a fixed member, and with the three rows of teeth of the planetary gears 5b meshing with the respective sun gears 5a-1, 5a-2 and 5a-3 in three different ratios of the number of teeth meshing with each other.

With this arrangement, driving force from the rear sprocket 7 is transmitted to the wheel in an increased speed ratio, while reverse input torque from the wheel is transmitted to the rear sprocket 7 in a reduced speed ratio and then transmitted to the motor shaft through a power transmission member such as a chain, and used for regeneration.

In this embodiment, the rotational resistance imparting means 60 provided in the hub case 12 selectively imparts rotational resistance to the retainer 50d of the two-way clutch 50, thereby selectively engaging and disengaging the two-way clutch 50. Thus, all the component parts are mounted in the hub case 12, so that it is possible to prevent corrosion of the retainer 50d of the clutch due to water and mud from outside, or damage to or deformation of the retainer 50d due to unnecessary external force.

While not shown, a center one-way clutch is provided between the crankshaft and the crank sprocket which is configured to engage when driving force is applied and disengage and idle when reverse input is applied. Thus, reverse input is not transmitted to the crankshaft and pedals. The center one-way clutch may be any known one-way clutch including a roller clutch, a sprag clutch or a ratchet clutch.

While the bicycle is being moved backward (with e.g. the driver dismounted from the bicycle), although the rear sprocket 7 and the hub case 12 rotate, relative to the ground, in the direction opposite to the direction in which they rotate while the bicycle is being driven forward, their rotational directions relative to each other are the same as while the bicycle is being driven forward.

15th Embodiment

Figure 24:
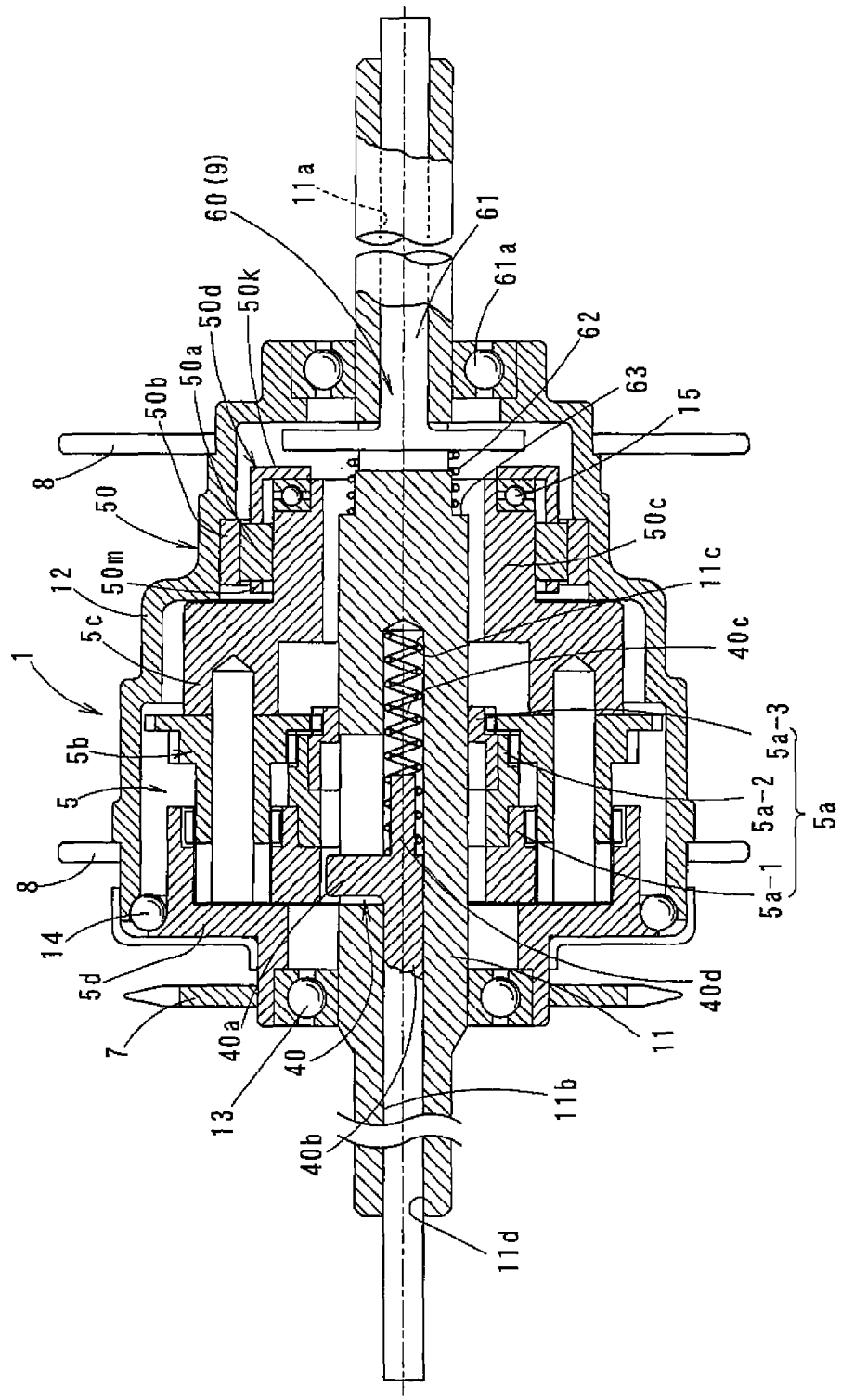
FIG. 24 is a front view of a 15th embodiment.

FIG. 24 shows the 15th embodiment of which the transmission 5 comprises a planetary gear mechanism which provides three speed reduction ratios and in which the two-way clutch 50 for transmitting both driving force and reverse input comprises a roller clutch disposed between the hub case 12 and the planetary carrier 5c (which is rotationally fixed to the inner ring 50c).

But as in the 14th embodiment, the two-way clutch 50 is not limited to a roller clutch but may be any other two-way clutch such as a sprag clutch.

As in the 14th embodiment, a bearing 13 is disposed between the hub case 12 and the axle 11, supporting the hub case and the axle so as to be rotatable relative to each other.

But this embodiment differs from the 14th embodiment in that a bearing 14 is disposed between the outer ring gear 5d, which is rotationally fixed to the rear sprocket 7, and the hub case 12, supporting the outer ring gear and the rear sprocket so as to be rotatable relative to each other. The outer ring gear 5d is a component part of the transmission 5.

The transmission 5 includes planetary gears 5b having three rows of teeth, each row of teeth meshing with one of the sun gears 5a-1, 5a-2 and 5a-3, the planetary carrier 5c, which retains the planetary gears 5b, and the outer ring gear 5d, which meshes with the planetary gears 5b.

A transmission control mechanism 40 selectively rotationally fixes one of the sun gears 5a-1, 5a-2 and 5a-3 to the axle 11 to provide a desired speed ratio. The transmission control mechanism 40 is of the same structure as that used in the 14th embodiment.

In this embodiment, the inner ring 50c of the two-way clutch 50 is rotationally fixed to the planetary carrier 5c of the two-way clutch 50, and its outer ring 50b is pressed into and fixed to the hub case 12. Its engaging elements comprise rollers 50a disposed between the inner ring 2c and the outer ring 2b. Further in this embodiment, the planetary carrier 5c and the inner ring 50c are integral with each other.

When driving force is applied to the rear sprocket 7, torque is transmitted to the hub case 12 through the outer ring gear 5d, planetary gears 5b, planetary carrier 5c and two-way clutch 50 (inner ring, rollers 50a and outer ring 50b).

When resistance is applied to the retainer 50d by the rotational resistance imparting means 60 as the clutch switching means 9 while the bicycle is not being driven, the rollers 50a of the two-way clutch are moved in the respective grooves 50b toward the narrow ends of the wedge-shaped spaces in the reverse rotational direction, thereby coupling and locking together the inner ring 50c and the outer ring 50b. Reverse rotational input is thus transmitted to the rear sprocket 7.

Thus the two-way clutch 50 can transmit torque in the forward direction applied to the rear sprocket 7 to the wheel, and also can transmit torque in the reverse direction (including reverse input torque while the bicycle is traveling forward without being driven) to the rear sprocket 7 when resistance is being applied to the retainer 50d by the rotational resistance imparting means 60.

Otherwise, this embodiment is basically identical in structure and operation to the 14th embodiment. Thus no further description is omitted.

16th and 17th Embodiments

Figure 25:
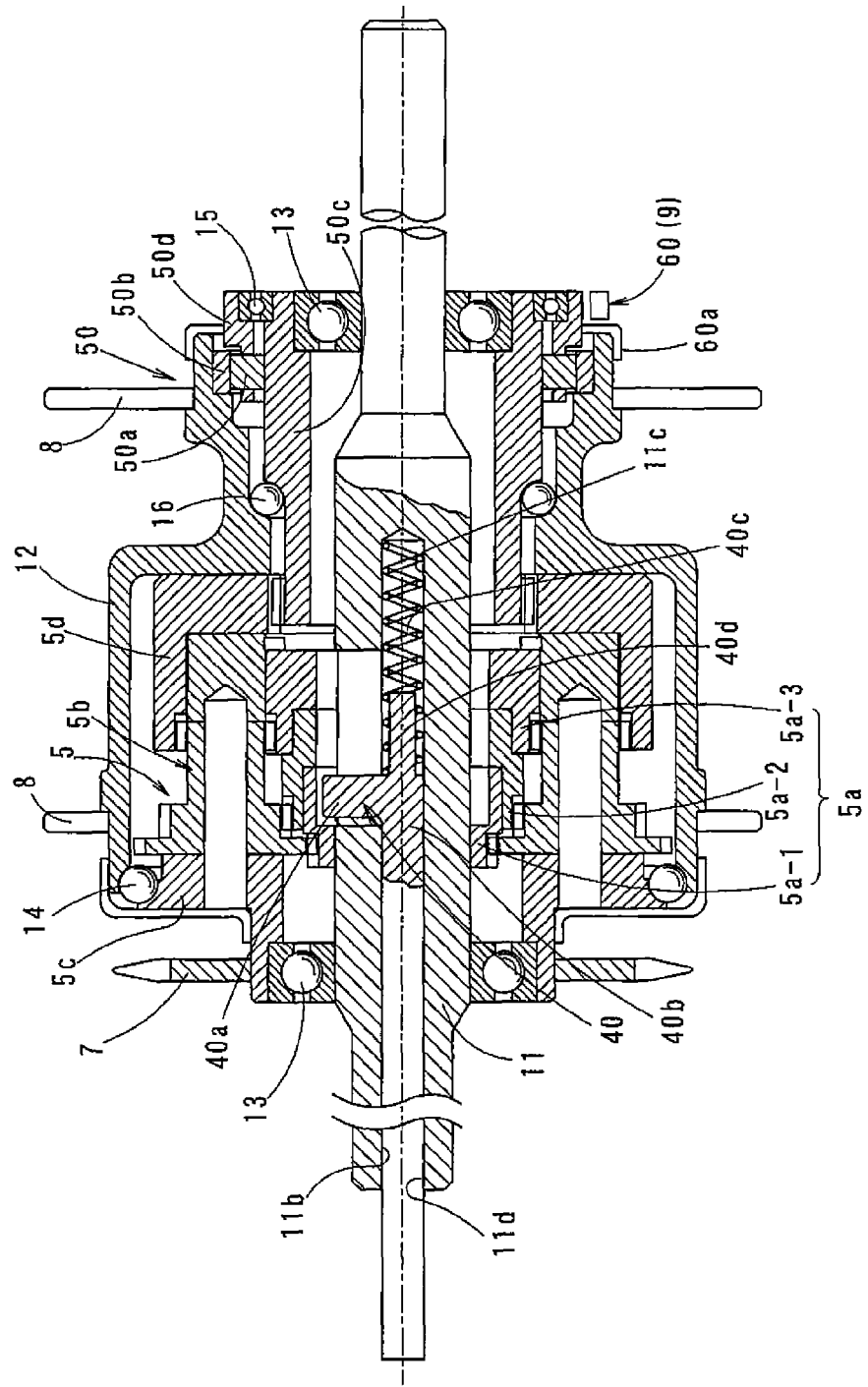
FIG. 25 is a front view of a 16th embodiment.
Figure 26:
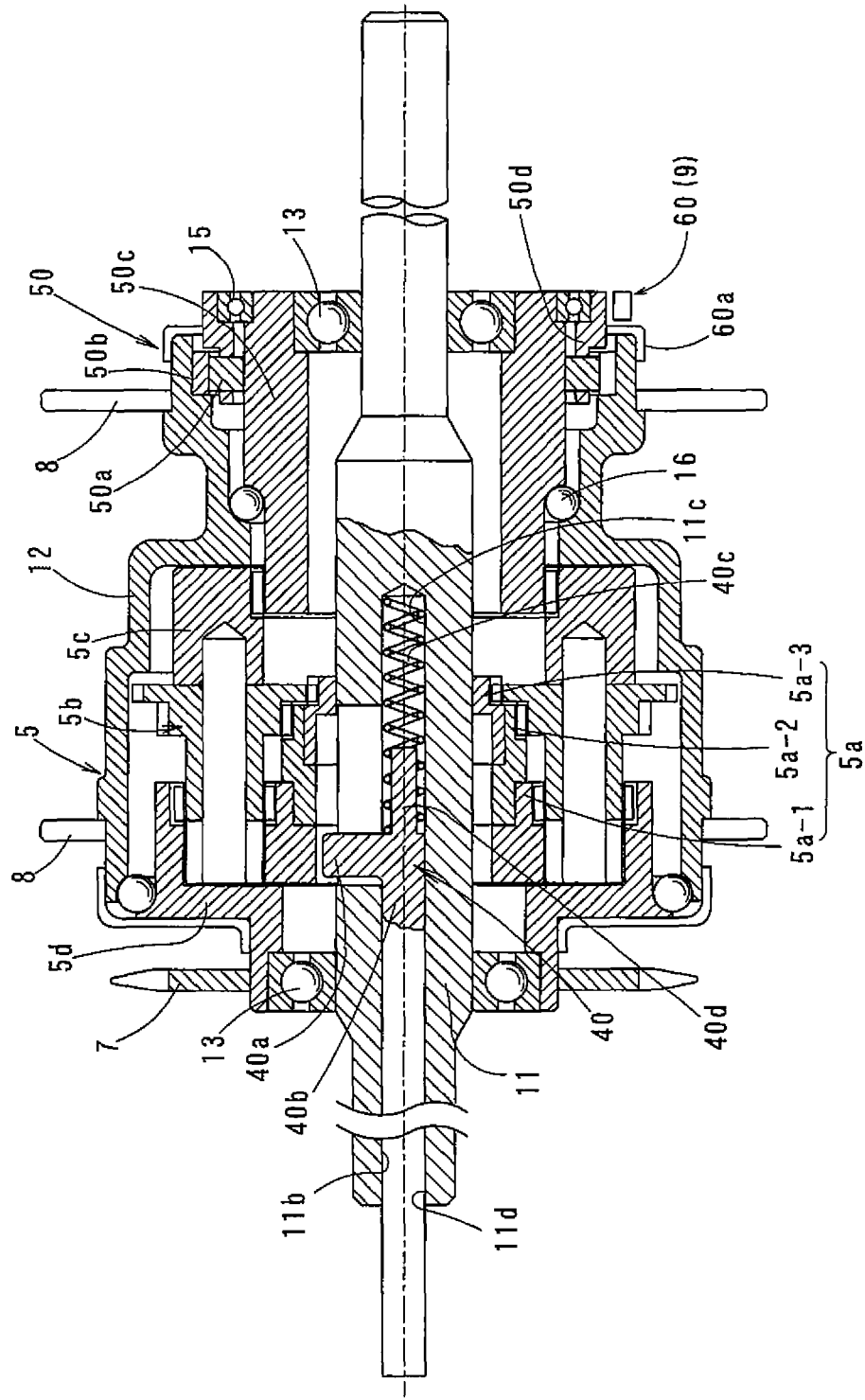
FIG. 26 is a front view of a 17th embodiment.

FIGS. 25 and 26 show the 16th and 17th embodiments of this invention, respectively. The 16th and 17th embodiments are basically identical to the 14th and 15th embodiments, respectively, regarding the structures of the transmission 5, two-way clutch 50 and transmission control mechanism 40.

Description is now made mainly of the differences between the 14th and 15th embodiments and the 16th and 17th embodiments. In the 16th embodiment, shown in FIG. 25, the inner ring 50c of the two-way clutch 50 for transmitting driving force and reverse input is a separate member from the outer ring gear 5d of the transmission 5 and meshes with the outer ring gear 5d so as to rotate in unison with the outer ring gear 5d. In the 17th embodiment, shown in FIG. 26, the inner ring 50c of the two-way clutch 50 for transmitting driving force and reverse input is a separate member from the planetary carrier 5c of the transmission 5 and meshes with the planetary carrier 5c so as to rotate in unison with the planetary carrier 5c.

Both in the 16th and 17th embodiments, a bearing 16 is disposed between the inner ring 50c of the two-way clutch 50 and the hub case 12 to support the inner ring 50c so as to be rotatable relative to the hub case 12.

The retainer 50d of the two-way clutch 50, which retains the engaging elements 50a (such as rollers), has an axial end protruding from the hub case 12 and supported by the inner ring 50c through a bearing 15 disposed between the retainer 50d and the inner ring 50c so as to be rotatable relative to the inner ring 50c.

Since the retainer 50d protrudes from the hub case 12, it is possible to provide the rotational resistance imparting means 60 (such as the above-mentioned friction portion 61a) for applying external force, i.e. rotational resistance to the retainer 50d outside of the hub case 12. Numeral 60a in FIGS. 25 and 26 indicates a seal. In FIGS. 25 and 26, by operating the rotational resistance imparting means 60 as the clutch switching means 9 from outside, the means 60 can be moved into and out of contact with the retainer 50d. The clutch switching means for actuating the rotational resistance imparting means 60 may be any known structure which can either radially or axially move the rotational resistance imparting means 60 toward the retainer 50d until the former contacts the latter, and may be any of those shown in the previous embodiments.

In these embodiments, as the external force (rotational resistance) to be applied to the retainer 50d, frictional resistance produced between the friction plate and the retainer 50d by the rotational resistance imparting means 60 is used, and the frictional resistance is adapted to be produced when the driver applies the brakes. But instead, the frictional force may be adapted to be produced by other means. For example, the frictional force may be adapted to be produced when the driver performs a manual operation other than the application of the brakes.

What is claimed is:

1. A power-assisted bicycle comprising:
   a front wheel and a rear wheel, one of the front and rear wheels being a drive wheel and having a hub (1);
   a frame connecting the front and rear wheels;
   a secondary battery and a motor that are mounted on the frame;
   a crankshaft to which a manual force is to be applied;
   a sprocket (7) arranged such that driving force due to manual force applied to the crankshaft and/or an output of the motor can be transmitted to the drive wheel through the sprocket (7); and
   a transmission (5) and a one-way clutch (2) for reverse input mounted in the hub (1);
   wherein the transmission (5) is operably coupled to the sprocket (7) and the drive wheel so as to be capable of transmitting the driving force from the sprocket (7) to the drive wheel;
   wherein the one-way clutch (2) for reverse input is configured to idle while the drive wheel is being driven by manual force applied to the crankshaft and/or the output of the motor and to transmit reverse input from the drive wheel to the sprocket (7) while the drive wheel is not being driven via the motor and is not being driven via the crankshaft but the drive wheel is being rotated by forward travel of the bicycle so that reverse input from the drive wheel can be transmitted to an output shaft of the motor; and
   wherein a regenerative mechanism is arranged to convert the reverse input applied to the output shaft of the motor to electric power and store the electric power in the secondary battery.

2. The power-assisted bicycle of claim 1, wherein
   the transmission (5) comprises a two-speed planetary gear speed reduction mechanism comprising a sun gear (5a) mounted around an axle (11) of the drive wheel, planetary gears (5b) meshing with the sun gear (5a), a planetary carrier (5a) retaining the planetary gears (5b), and an outer gear ring (5d) meshing with the planetary gears (5b); and
   the sun gear (5a) is fixed, and the outer ring gear (5d) and the planetary carrier (5c) are used as input and output members, respectively, to provide a reduced speed ratio, and the outer ring gear (5d) is used as both input and output members to provide a one-to-one speed ratio.

3. The power-assisted bicycle of claim 1, wherein
   the transmission comprises a speed reduction transmission;
   there are a plurality of sun gears (5a: 5a-1, 5a-2 and 5a-3) each having teeth of which the number differs from the numbers of teeth of the other sun gears;
   the bicycle further comprises a transmission control mechanism (30) capable of fixing any of the sun gears (5a: 5a-1, 5a-2 and 5a-3); and
   one of the sun gears (5a: 5a-1, 5a-2 and 5a-3) is selectively fixed, and the outer ring gear (5d) and the planetary carrier (5c) are used as input and output members, respectively, thereby selecting a speed reduction ratio.

4. The power-assisted bicycle of claim 3, wherein
   the transmission control mechanism (30) is capable of rotationally fixing any one of the sun gears (5a: 5a-1, 5a-2 and 5a-3) to an axle (11) of the drive wheel while either the driving force or the reverse input is being applied, thereby changing the speed ratio.

5. The power-assisted bicycle of claim 1, wherein
   the transmission comprises a speed increasing transmission;
   there are a plurality of sun gears (5a: 5a-1, 5a-2 and 5a-3) each having teeth of which the number differs from the numbers of teeth of the other sun gears;
   the bicycle further comprises a transmission control mechanism (30) capable of fixing any of the sun gears (5a: 5a-1, 5a-2 and 5a-3); and
   one of the sun gears (5a: 5a-1, 5a-2 and 5a-3) is selectively fixed, and a planetary carrier (5c) and an outer ring gear (5d) are used as input and output members, respectively, thereby selecting a speed increase ratio.

6. The power-assisted bicycle of claim 5, wherein
   the transmission control mechanism (30) is capable of rotationally fixing any one of the sun gears (5a: 5a-1, 5a-2 and 5a-3) to an axle (11) of the drive wheel while either the driving force or the reverse input is being applied, thereby changing the speed ratio.

7. The power-assisted bicycle of claim 1, wherein
   the one-way clutch (2) for reverse input is configured to engage when brakes of the bicycle are operated.

8. The power-assisted bicycle of claim 1, wherein
   the transmission (5) comprises a planetary gear mechanism including at least one sun gear (5a) and is capable of transmitting the driving force from the sprocket (7) to the drive wheel, said bicycle further comprising a speed change mechanism (10) for selectively rotationally fixing the sun gear (5*a*) to an axle (11) of the drive wheel or uncoupling the sun gear (5*a*) from the axle (11), thereby transmitting the driving force from the sprocket (7) to the drive wheel in different speed ratios; and the one-way clutch (2) for reverse input is disposed between the sun gear (5*a*) and the axle (11), said clutch switching device (9) being configured to switch over the one-way clutch (2), while the reverse input is being applied from the drive wheel, between a first position in which the sun gear (5*a*) is rotationally fixed to the axle (11) through the one-way clutch (2) and a second position in which the sun gear (5*a*) is not rotationally fixed to the axle (11) through the one-way clutch (2);

whereby while the bicycle is being driven, the driving force from the sprocket (7) is transmitted to the drive wheel through the transmission (5), and while the bicycle is traveling in the forward direction without being driven, the reverse input from the drive wheel is transmitted to the sprocket (7) when the one-way clutch (2) for reverse input is in said first position.

9. The power-assisted bicycle of claim 8, wherein the one-way clutch (2) for reverse input comprises a ratchet clutch.

10. The power-assisted bicycle of claim 8, wherein the clutch switching device (9) includes a rod-shaped operating member (9*a*) extending through the axle (11) and having an end protruding from the axle (11), whereby by acting on said end of the operating member (9*a*) from outside, the operating member (9*a*) can be axially moved, thereby switching over the one-way clutch (2) for reverse input between said first and second positions.

11. The power-assisted bicycle of claim 8, wherein the clutch switching device (9) includes a rotary member (9*d*) rotatably mounted around the axle (11) and having a portion protruding from the hub case (12), whereby by acting on the portion of the rotary member (9*d*) protruding from the hub case (12), the rotary member (9*d*) can be rotated around the axle (11), thereby switching over the one-way clutch (2) for reverse input between said first and second positions.

12. The power-assisted bicycle of claim 8, wherein the one-way clutch (2) for reverse input is a roller clutch which includes engaging elements (2*a*') in the form of rollers.

13. The power-assisted bicycle of claim 8, wherein the one-way clutch (2) for reverse input is a sprag clutch which includes engaging elements (2*a*') in the form of sprags.

14. The power-assisted bicycle of claim 1, wherein the drive wheel has a hub (1) in which a transmission (5), a one-way clutch (2) for reverse input, and a rotational resistance imparting means (60) are mounted, the rotational resistance imparting means (60) serving as a clutch switching device (9);

the transmission (5) comprises a planetary gear mechanism including sun gears (5*a*: 5*a*-1, 5*a*-2 and 5*a*-3), and a transmission control mechanism (40) capable of rotationally fixing any one of the sun gears (5*a*: 5*a*-1, 5*a*-2 and 5*a*-3) to an axle (11) of the drive wheel, while keeping the other sun gears rotatable relative to the axle, while either the driving force or the reverse input is being applied, thereby providing two or more speed ratios, whereby the transmission (5) is capable of transmitting the driving force applied to the sprocket (7) due to the manual force and/or the output of the motor to the drive wheel;

the one-way clutch (2) for reverse input is configured to idle while the drive wheel is being driven by the manual force and/or the output of the motor, and is capable of transmitting the reverse input from the drive wheel to the sprocket (7) while the drive wheel is not being driven; and the rotational resistance imparting means (60) is capable of applying rotational resistance to an engaging element retaining means of the one-way clutch (2) for reverse input that is large enough to move engaging elements of the one-way clutch (2) for reverse input to an engageable position, and thereby engage the one-way clutch (2).

15. The power-assisted bicycle of claim 14, wherein the rotational resistance imparting means (60) comprises an operating member (61) axially movable relative to the axle (11) and a friction portion (61*a*) axially movable together with the operating member (61); and the friction portion (61*a*) is configured to contact the engaging element retaining means, thereby producing the rotational resistance, when the operating member (61) moves axially in one direction relative to the axle (11) together with the friction portion (61*a*).

16. The power-assisted bicycle of claim 15, wherein the friction portion (61*a*) is a flange-shaped member protruding radially outwardly from an outer periphery of the axle (11).

17. The power-assisted bicycle of claim 14, wherein the operating member (61) is inserted in an axial hole (11*a*) formed in the axle (11) so as to be coaxial with the axle (11).

18. The power-assisted bicycle of claim 14, wherein the one-way clutch (2) for reverse input is a roller clutch comprising rollers as the engaging elements (2*a*'), and an annular retainer (2*d*) as the engaging element retaining means, said annular retainer (2*d*) circumferentially retaining the rollers.

19. The power-assisted bicycle of claim 14, wherein the one-way clutch (2) for reverse input is a ratchet clutch including a ratchet pawl (20) as the engaging element, and a ratchet groove (21) in which the ratchet pawl (20) is engageable; and said engaging element retaining means is a shutter (22) which is movable into and out of between the ratchet pawl (20) and the ratchet groove (21).

20. The power-assisted bicycle of claim 1, further comprising a crank sprocket, and a center one-way clutch provided between the crankshaft and the crank sprocket and configured to lock up when driving force is applied thereto that tends to drive the drive wheel and get unlocked when reverse input is applied from the drive wheel.

21. A power-assisted bicycle comprising:

a front wheel and a rear wheel, one of the front and rear wheels being a drive wheel;

a frame connecting the front and rear wheels;

a secondary battery and a motor that are mounted on the frame;

a crankshaft to which a manual force is applied;

a sprocket (7) arranged such that driving force due to manual force applied to the crankshaft and/or the output of the motor can be transmitted to the drive wheel through the sprocket (7), and wherein reverse input from the drive wheel while the bicycle is not being driven can be transmitted to an output shaft of the motor; and a regenerative mechanism for converting the reverse input applied to the output shaft of the motor to electric power and storing the electric power in the secondary battery;

wherein the drive wheel has a hub (1) carrying a transmission (5), a two-way clutch (50) including engaging elements (50a) and a retainer (50d) circumferentially retaining the engaging elements (50a), and a rotational resistance imparting means (60);

wherein the transmission (5) comprises a planetary gear mechanism including sun gears (5a: 5a-1, 5a-2 and 5a-3), and a transmission control mechanism (40) capable of rotationally fixing any one of the sun gears (5a: 5a-1, 5a-2 and 5a-3) to an axle (11), while keeping the other sun gears rotatable relative to the axle, while either the driving force or the reverse input is being applied, thereby providing two or more speed ratios, whereby the transmission (5) is capable of transmitting the driving force applied to the sprocket (7) due to the manual force and/or the output of the motor to the drive wheel;

wherein the two-way clutch (50) is configured to engage and transmit the driving force due to manual force and/or the output of the motor to the drive wheel, and is capable of transmitting the reverse input from the drive wheel to the sprocket (7) while the drive wheel is not being driven; and wherein the rotational resistance imparting means (60) is capable of applying rotational resistance to the retainer (50d) of the two-way clutch (50) that is large enough to engage the two-way clutch (50).

22. The power-assisted bicycle of claim 21, wherein
the rotational resistance imparting means (60) comprises an operating member (61) axially movable relative to the axle (11) and a friction portion (61a) axially movable together with the operating member (61); and
the friction portion (61a) is configured to contact the retainer (50d), thereby producing the rotational resistance, when the operating member (61) moves axially in one direction relative to the axle (11) together with the friction portion (61a).

23. The power-assisted bicycle of claim 22, wherein
the operating member (61) is inserted in an axial hole (11a) formed in the axle (11) so as to be coaxial with the axle (11).

24. The power-assisted bicycle of claim 22, wherein
the friction portion (61a) is a flange-shaped member protruding radially outwardly from an outer periphery of the axle (11).

25. The power-assisted bicycle of claim 22, wherein
the retainer (50d) comprises an annular portion (50m) having a plurality of circumferentially spaced apart pockets in which the engaging elements (50a) are received, respectively, and an end plate (50k) radially extending from the annular portion (50m); and
the friction portion (61a) is configured to contact the end plate (50k).

26. The power-assisted bicycle of claim 21, wherein
the two-way clutch (50) is a roller clutch of which the engaging elements (50a) are rollers, and the retainer (50d) is an annular retainer circumferentially retaining the rollers.

27. The power-assisted bicycle of claim 21, wherein
the two-way clutch (50) is a sprag clutch of which the engaging elements (50a) are sprags, and the retainer (50d) is an annular retainer circumferentially retaining the sprags.

* * * * *